US012710601B2

(12) United States Patent
Takeuchi et al.

(10) Patent No.: US 12,710,601 B2
(45) Date of Patent: Aug. 18, 2026

(54) INTELLIGENT PANEL SYSTEM

(71) Applicant: Go!Foton Holdings, Inc., Somerset, NJ (US)

(72) Inventors: Kenichiro Takeuchi, North Brunswick, NJ (US); David Zhi Chen, Dallas, TX (US); Chi Kong Paul Ng, Princeton, NJ (US); Edward M. Jack, Ashby, MA (US)

(73) Assignee: Go!Foton Holdings, Inc., Somerset, NJ (US)

( * ) Notice: Subject to any disclaimer, the term of this patent is extended or adjusted under 35 U.S.C. 154(b) by 501 days.

(21) Appl. No.: 17/333,324

(22) Filed: May 28, 2021

(65) Prior Publication Data

US 2021/0356681 A1 Nov. 18, 2021

Related U.S. Application Data

(63) Continuation of application No. PCT/US2021/021549, filed on Mar. 9, 2021, and a (Continued)

(51) Int. Cl.
*G02B 6/38* (2006.01)
*G02B 6/02* (2006.01)
(Continued)

(52) U.S. Cl.
CPC ....... *G02B 6/3895* (2013.01); *G02B 6/02052* (2013.01); *G02B 6/3825* (2013.01);
(Continued)

(58) Field of Classification Search
CPC .. H04B 10/2507–25253; G02B 6/3895; G02B 6/02052; G02B 6/3825;
(Continued)

(56) References Cited

U.S. PATENT DOCUMENTS 413,245 A 10/1889 Richmond
732,450 A 6/1903 Schiermeyer
(Continued)

FOREIGN PATENT DOCUMENTS

CN 102081202 A 6/2011
CN 102460258 A 5/2012
(Continued)

OTHER PUBLICATIONS

Extended European Search Report issued in Appln. No. 19889245.7 mailed Aug. 29, 2022 (13 pages).
(Continued)

*Primary Examiner* — John Bedtelyon
(74) *Attorney, Agent, or Firm* — Lerner David LLP

(57) ABSTRACT

An optical system includes a connector, an optical filter, an optical receiving device, an optical transmission device, and a central processing and transmission unit. The connector is configured for routing optical signals. The optical filter is configured for routing optical signals to and from the connector. The optical receiving device is configured for receiving optical signals routed from the optical filter via the connector. The optical transmission device is configured for generating the optical signals routed from the optical filter via the connector. The central processing and transmission unit is in electrical communication with the optical receiving device. The central processing and transmission unit is configured for transmitting radio or electrical signals carrying data relating either to the optical signals received by the optical receiving device and routed from the optical filter or to determined optical and optical path characteristics based on the optical signals routed from the optical filter.

33 Claims, 30 Drawing Sheets

Related U.S. Application Data continuation-in-part of application No. PCT/US2019/063749, filed on Nov. 27, 2019, which is a continuation of application No. 16/659,248, filed on Oct. 21, 2019, now Pat. No. 11,531,170.

(60) Provisional application No. 62/987,089, filed on Mar. 9, 2020, provisional application No. 62/772,413, filed on Nov. 28, 2018.

(51) Int. Cl.
*G02B 6/42* (2006.01)
*G02B 6/44* (2006.01)

(52) U.S. Cl.
CPC .......... *G02B 6/4204* (2013.01); *G02B 6/4286* (2013.01); *G02B 6/44526* (2023.05); *G02B 6/44528* (2023.05)

(58) Field of Classification Search
CPC G02B 6/4204; G02B 6/4286; G02B 6/44526; G02B 6/44528
See application file for complete search history.

(56) References Cited

U.S. PATENT DOCUMENTS 983,647 A 2/1911 Romines
3,252,746 A 5/1966 Kafferlin et al.
4,061,371 A 12/1977 Prather et al.
4,254,865 A 3/1981 Pacey et al.
4,549,038 A 10/1985 Masheris et al.
4,789,217 A 12/1988 Mitch
4,805,979 A 2/1989 Bossard et al.
4,808,115 A 2/1989 Norton et al.
4,900,118 A 2/1990 Yanagawa et al.
4,965,414 A 10/1990 Sobotka, Jr. et al.
4,986,762 A 1/1991 Keith
5,005,942 A 4/1991 Barlow et al.
5,189,717 A 2/1993 Larson et al.
5,239,129 A 8/1993 Ehrenfels
5,286,935 A 2/1994 Mina et al.
5,403,976 A 4/1995 Maurice
5,943,151 A * 8/1999 Grasso .............. H04B 10/2519 398/83
6,116,793 A 9/2000 Finzel et al.
6,300,569 B1 10/2001 Mullen, Jr.
6,424,781 B1 7/2002 Puetz et al.
6,527,353 B1 3/2003 Bradfish et al.
6,597,824 B2 * 7/2003 Newberg ................ G02B 6/43 385/16
6,621,951 B1 9/2003 Zhao et al.
6,935,661 B1 8/2005 Farnsworth et al.
7,291,032 B1 11/2007 Carver et al.
7,595,455 B2 9/2009 Robinson
7,794,155 B1 9/2010 Haley et al.
7,881,613 B2 * 2/2011 Kim ................... H04J 14/0246 398/94
7,965,186 B2 6/2011 Downie et al.
8,203,450 B2 6/2012 German et al.
8,313,250 B2 11/2012 Drouard
8,380,036 B2 2/2013 Smith
8,550,722 B2 10/2013 Ringgenberg et al.
8,556,356 B2 10/2013 Anderson et al.
8,596,882 B2 12/2013 Smrha et al.
8,672,428 B2 3/2014 Takeuchi et al.
8,920,050 B2 12/2014 Takeuchi et al.
9,008,484 B2 4/2015 Takeuchi et al.
9,285,552 B2 3/2016 Marcouiller et al.
9,323,020 B2 4/2016 Cao et al.
9,525,483 B2 12/2016 Johnson, IV et al.
9,726,830 B1 8/2017 Gniadek
RE46,780 E 4/2018 Anderson et al.
10,048,452 B1 8/2018 Hangebrauck et al.
10,211,920 B1 2/2019 Khaleghi et al.
10,281,670 B2 5/2019 Vaughn et al.
10,432,302 B1 * 10/2019 Delgado ............... H04B 10/40
10,432,306 B2 10/2019 Eiselt
10,656,361 B2 5/2020 Takeuchi et al.
11,035,753 B2 6/2021 Gagnon et al.
11,271,641 B1 3/2022 Perron
11,405,102 B1 8/2022 Cahill et al.
2003/0103750 A1 6/2003 Laporte et al.
2004/0211774 A1 10/2004 Daoud et al.
2004/0247316 A1 12/2004 Soto et al.
2006/0067637 A1 3/2006 Carpenter et al.
2006/0093303 A1 5/2006 Reagan et al.
2007/0116467 A1 5/2007 Kwon et al.
2007/0189692 A1 8/2007 Zimmel et al.
2008/0226250 A1 9/2008 Gonzales et al.
2009/0060439 A1 3/2009 Cox et al.
2009/0166404 A1 7/2009 German et al.
2010/0038130 A1 2/2010 Zhong et al.
2010/0054685 A1 3/2010 Cooke et al.
2010/0109892 A1 5/2010 Fariello et al.
2010/0183276 A1 7/2010 Smith
2010/0310225 A1 12/2010 Anderson et al.
2010/0322580 A1 12/2010 Beamon et al.
2011/0217017 A1 9/2011 Drouard et al.
2012/0037416 A1 2/2012 Chiou
2012/0051707 A1 3/2012 Barnes et al.
2012/0224823 A1 9/2012 Cox et al.
2012/0281509 A1 11/2012 Liang et al.
2012/0328251 A1 12/2012 Takeuchi et al.
2013/0004136 A1 1/2013 Brower et al.
2013/0008594 A1 1/2013 Takeuchi et al.
2013/0022324 A1 1/2013 Takeuchi et al.
2013/0064506 A1 3/2013 Eberle, Jr. et al.
2013/0101262 A1 4/2013 Wei et al.
2013/0196538 A1 8/2013 Takeuchi et al.
2014/0038462 A1 2/2014 Coffey et al.
2015/0131999 A1 5/2015 Urban et al.
2015/0155696 A1 6/2015 Coenegracht et al.
2015/0234132 A1 8/2015 Guo et al.
2016/0178859 A1 6/2016 Thompson et al.
2017/0003459 A1 1/2017 Takeuchi et al.
2017/0097471 A1 4/2017 Fletcher
2017/0195051 A1 7/2017 Yamamoto et al.
2017/0235067 A1 8/2017 Holmberg et al.
2017/0235076 A1 8/2017 Solheid et al.
2018/0027703 A1 1/2018 Adiletta et al.
2018/0081139 A1 3/2018 Geens et al.
2018/0136410 A1 5/2018 Takeuchi et al.
2018/0157000 A1 6/2018 Bakatsias et al.
2019/0260175 A1 8/2019 Peng et al.
2020/0052789 A1 2/2020 Kim

FOREIGN PATENT DOCUMENTS

CN 104205866 A 12/2014
EP 2677357 A1 12/2013
EP 3617687 A1 3/2020
WO 2015189384 A1 12/2015
WO 2018204864 A1 11/2018
WO 2020091823 A1 5/2020

OTHER PUBLICATIONS

Extended European Search Report issued in Appln. No. 19879838.1 mailed Jun. 9, 2022 (9 pages).
"FieldShield YOURx-Terminal: Installation Manual", Clearfield, Jul. 2017, 33 pages.
"Guide to Fiber Optics & Premises Cabling", The Fiber Optic Association, Inc., http://www.thefoa.org/tech/ref/OSP/term.html, 2015, 27 pages.
"S918A Temporary Fiber Aligner," <http://www.fitel.k2international.net/Fitel_S612_Fixture_files/S612%20Ribbon%20Forming%20Fixture.pdf>, dated Sep. 10, 2008.
"YOURx-Aerial Terminal—Patch and Splice", Clearfield, Aug. 31, 2018, 4 pages.
"YOURx-Aerial Terminal: Installation Manual", Clearfield, Sep. 2018, 29 pages.

(56) References Cited

OTHER PUBLICATIONS

"YOURx-Terminal", Clearfield, Oct. 29, 2018, 7 pages.
Corrected International Search Report with Written Opinion for Application No. PCT/US2019/00063 dated Apr. 7, 2020, 22 pages.
Excerpt of ISE Magazine, vol. 36, Issue 2 (Feb. 2018).
International Search Report for PCT/US18/31219 dated Aug. 1, 2018.
International Search Report with Written Opinion for Application No. PCT/US2019/00063 dated Mar. 10, 2020, 26 pages.
International Search Report with Written Opinion for Application No. PCT/US2019/063749 dated Mar. 24, 2020, 17 pages.
Wellbrock GA, Xia TJ, Huang MF, Chen Y, Salemi M, Huang YK, Ji P, Ip E, Wang T. First field trial of sensing vehicle speed, density, and road conditions by using fiber carrying high speed data. In2019 Optical Fiber Communications Conference and Exhibition (OFC) Mar. 7, 2019 (pp. 1-3). IEEE.
EESR dated Mar. 19, 2024 for Appl No. 21767267.4. 9 pgs.
Wellbrock, G. et al., "Distributed Fiber Sensing Applications for Optical Networks" Verizon, glenn.wellbrock@verizon.com, ECOC'2022 Invited Paper, © 2022, pp. 1-3.
Search Report dated Apr. 15, 2024 from Office Action for Chinese Application No. 201980087764.X issued Apr. 17, 2024. 2 pgs.
Zheng, Ze, Light weight tactical fiber optic cable connector assembly, Optical Fiber & Electric Cable, 1995, 4 pages.
Chinese Search Report from CN Appl. No. 201980087764.X, dated Dec. 17, 2024, pp. 1-2. [See p. 1, categorizing the cited references].

* cited by examiner 600
601
150
632B
632A
110
627
224A
224A
626C
203
601
150
632B
632A
110
627
224A
224A
626C 1040,1002
1014C
1014B
1014A
1070F 1055
1013C
1000
1099
1013B
1012A
1013A

INTELLIGENT PANEL SYSTEM

CROSS-REFERENCE TO RELATED APPLICATIONS

The present application is a continuation of International Application No. PCT/US2021/021549, filed Mar. 9, 2021, which claims the benefit of the filing date of U.S. Provisional Patent Application No. 62/987,089, filed Mar. 9, 2020, the entirety of the disclosures of which are hereby incorporated herein by reference. The present application is also a continuation-in-part of International Application No. PCT/US2019/063749, filed Nov. 27, 2019, and published as International Publication No. WO 2020/113100 A1, which is a continuation of U.S. patent application Ser. No. 16/659,248, filed Oct. 21, 2019, which claims the benefit of the filing date of U.S. Provisional Patent Application No. 62/772,413, filed Nov. 28, 2018, the entirety of the disclosures of which are hereby incorporated herein by reference.

BACKGROUND

Optical fibers are optically connected to respective opposing optical fibers to convey signals between the respective connected fibers, which may occur in the operation of data storage and transmission devices. To establish connections between respective opposing optical fibers, connectors on ends of respective opposing optical fibers are inserted into ports on opposing ends of adapters.

Connections between optical fiber connectors and the adapters are often made using a click-to-lock configuration, as in the case of optical fiber "LC connectors" and "SC connectors." This configuration prevents disconnection of connectors when they are connected to a corresponding adapter, such as by pullout, and also provides a tactile feedback to alert a user attaching connectors to a corresponding adapter that a full connection in which unintended disconnection has been prevented has been made.

Sometimes, incomplete connections are made between a connector and an adapter, which may be undetected by users, such as technicians installing or repairing optical fiber termination systems, such as patch panels and associated optical fiber cables. Additionally, fatigue or other stresses induced through use of the connectors may weaken mechanical connections between connectors or between a connector and an adapter causing connections to be broken or inadequate. Moreover, damage to the optical fibers themselves can disrupt optical signals or cause such signals to be broken. Such incomplete or broken connections or disrupted signals have caused reduced system performance or even complete system failure. Identification of broken connections or signals can be cumbersome, often requiring time-consuming physical, on-site inspection of multiple optical fiber cables and sometimes even physical inspection of multiple optical fiber termination assemblies.

Therefore, there exists a need for quickly identifying broken optical fiber connections and signals.

SUMMARY

In accordance with an aspect, an optical connection identification assembly may include first and second connectors, a first optical filter, a second optical filter, a first photodiode, and a second photodiode. The first and second connectors may be configured for conveying optical signals within and away from the optical connection identification assembly. The first optical filter may be configured for conveying an optical signal to and from the first connector. The second optical filter may be configured for conveying an optical signal to and from the second connector. The first and the second optical filters may be configured for conveying optical signals between each other. The first photodiode may be configured for receiving an optical signal from the first optical filter to confirm the optical connection identification assembly is receiving optical signals. The second photodiode may be configured for receiving an optical signal from the second optical filter to confirm the optical connection identification assembly is receiving optical signals. The first and the second connectors may be configured such that at least a portion of optical signals conveyed to or from either one of the first and the second connectors are conveyed to each of the first and the second optical filters and to each of the first and the second photodiodes.

In some arrangements, the first and the second connectors may be on opposite sides of the combination of each of the first and the second optical filters and each of the first and the second photodiodes.

In some arrangements, the optical connection identification assembly may be used for identifying the status of an optical connection at an intermediate location between two terminals configured for optical communication.

In some arrangements, the first photodiode may be adjacent to the first optical filter such that light is conveyed between the first photodiode and the first optical filter without any interference, i.e., impediment. In some arrangements, the second photodiode may be adjacent to the second optical filter such that light is conveyed between the second photodiode and the second optical filter without any interference.

In some arrangements, the first and the second optical filters and the first and the second photodiodes may define a power monitoring system.

In some arrangements, the optical connection identification assembly may further include a first connector optical fiber extending between the first connector and the first optical filter and a second connector optical fiber extending between the second connector and the second optical fiber. The first connector optical fiber may be configured for conveying optical signals between the first connector and the first optical filter. The second connector optical fiber may be configured for conveying optical signals between the second connector and the second optical filter.

In some arrangements, the optical connection identification assembly may further include third and fourth connectors, a third optical filter, a fourth optical filter, a third photodiode, and a fourth photodiode. The third and the fourth connectors may be configured for conveying optical signals within and away from the optical connection identification assembly. The third optical filter may be configured for conveying an optical signal to or from the third connector. The fourth optical filter may be configured for conveying an optical signal to or from the fourth connector. The third and the fourth optical filters may be configured for conveying optical signals between each other. The third photodiode may be configured for receiving an optical signal from the third optical filter. The fourth photodiode may be configured for receiving an optical signal from the fourth optical filter. The first, the second, the third, and the fourth optical filters and the first, the second, the third, and the fourth photodiodes may be attached to a base. The first and the third connectors may be on a first side of the base and the second and the fourth connectors may be on a second side of the base opposite the first side.

In some arrangements, the optical connection identification assembly may further include a filter optical fiber extending between the first and the second optical filters. The filter optical fiber may be configured for conveying optical signals between the first and the second optical filters.

In some arrangements, the optical connection identification assembly may further include a signal generation unit remote from the first and the second photodiodes. Either one or both of the first photodiode and the second photodiode may convey an electrical signal that when conveyed results in the signal generation unit indicating an optical signal is conveyed from the one or both of the first photodiode and the second photodiode conveying the electrical signal.

In some arrangements, the optical connection identification assembly may further include a first filter base, a second filter base, and a power monitoring base. The first filter base may be attached to and may support the first optical filter. The second filter base may be attached to and may support the second optical filter in which the second filter base may be spaced from the first filter base. The power monitoring base may be attached to and may support the first and the second filter bases.

In some such arrangements, the first filter base may be attached to and may support the first photodiode, and the second filter base may be attached to and may support the second photodiode.

In some arrangements, the optical connection identification assembly may further include a filter base and a power monitoring base. The filter base may be attached to and may support each of the first and the second optical filters. The power monitoring base may be attached to and may support the filter base.

In some such arrangements, the filter base may be attached to and may support the first and the second photodiodes.

In some arrangements, the optical connection identification assembly may further include a first connector optical fiber and a second connector optical fiber. The first connector optical fiber may extend between the first connector and the first optical filter. The second connector optical fiber may extend between the second connector and the second optical filter. The first connector optical fiber may be configured for conveying optical signals from the first connector to the first optical filter such that portions of the optical signals conveyed from the first connector are reflected from the first optical filter and a remaining portion of the optical signals conveyed from the first connector are received by the first photodiode. The second connector optical fiber may be configured for conveying optical signals from the second connector to the second optical filter such that portions of the optical signals conveyed from the second connector are reflected from the second optical filter and remaining portions of the optical signals conveyed from the second connector are received by the second photodiode.

In some arrangements, a majority of the portions of the optical signals conveyed from the first connector may be reflected from the first optical filter. In some arrangements, a majority of the portions of the optical signals conveyed from the second connector may be reflected from the second optical filter.

In some arrangements, an end of the first connector optical fiber may include a first facet defining a plane at an angle transverse to a first longitudinal axis of the first connector optical fiber such that light conveyed form the first connector defining the optical signals conveyed from the first connector may be deflected in a direction away from the first longitudinal axis, the light conveyed from the first connector thereby intersecting the first photodiode. In some arrangements, an end of the second connector optical fiber may include a second facet defining a plane at an angle transverse to a second longitudinal axis of the second connector optical fiber such that light conveyed from the second connector defining the optical signals conveyed from the second connector may be deflected in a direction away from the second longitudinal axis, the light conveyed from the second connector thereby intersecting the second photodiode.

In some arrangements, the optical connection identification assembly may further include an optical filter module, a first connector optical fiber, and a second connector optical fiber. The first optical filter and the second optical filter may be parts of the optical filter module. The first connector optical fiber may extend between the first connector and the optical filter module. The second connector optical fiber may extend between the second connector and the optical filter module. The first and the second connection optical fibers may be configured for conveying portions of optical signals through the optical filter module and between the first connector and the second connector. The remaining portions of the optical signals conveyed from the first connection optical fiber may be received by the first photodiode or the second photodiode and the remaining portions of the optical signals conveyed from the second connection optical fiber may be received by the other of the first and the second photodiode.

In some arrangements, a majority of the portions of the optical signals conveyed from either one or both of the first and the second connectors may be passed through the optical filter module.

In some arrangements, the remaining portions of the optical signals received by the first photodiode may be conveyed from the first optical filter or the second optical filter and the remaining portions of the optical signals received by the second photodiode may be conveyed from the other of the first and the second optical filters.

In some arrangements, the optical connection identification assembly may further include a first filter optical fiber and a second filter optical fiber. The first filter optical fiber may extend between the optical filter module and the first photodiode. The second filter optical fiber may extend between the optical filter module and the second photodiode. The first and the second filter optical fibers may be configured for conveying optical signals from the optical filter module to the first and the second photodiodes, respectively.

In some arrangements, the first and the second connectors and the optical filter module may be aligned to define a linear longitudinal axis that extends through each of the first and the second connectors and the optical filter module.

In some arrangements, the optical fiber connection identification assembly may further include either one or both of (i) a first beam splitter and a third photodiode and (ii) a second beam splitter and a light source. The first beam splitter may be between the first connector and the first optical filter. The third photodiode may be attached to a signal indicator. The first beam splitter may be configured to convey optical signals conveyed from the second beam splitter and the first connector to the third photodiode. The first signal indicator may be configured for indicating the conveyance of optical signals to the first optical filter. The second beam splitter may be between the second connector and the second optical filter. The light source may be configured for emitting optical signals towards the second beam splitter in response to a known electrical signal input.

The second beam splitter may be configured to convey the optical signals emitted from the light source to the second connector and to the first optical filter.

In some arrangements, the signal indicator may be a light-emitting diode (LED).

In accordance with another aspect, an optical fiber connection identification system may include a first optical connection identification assembly, a second optical connection identification assembly, and an intermediate optical fiber. The first optical connection identification assembly may include first and second connectors, a first optical filter, a second optical filter, a first photodiode, and a second photodiode. The first and the second connectors may be configured for conveying optical signals within and away from the first optical connection identification assembly. The first optical filter may be configured for conveying an optical signal to and from the first connector. The second optical filter may be configured for conveying an optical signal to and from the second connector. The first and the second optical filters may be configured for conveying optical signals between each other. The first photodiode may be configured for receiving an optical signal from the first optical filter. The second photodiode may be configured for receiving an optical signal from the second optical filter. The first and the second connectors may be configured such that at least a portion of optical signals conveyed to or from either one of the first and the second connectors are conveyed to each of the first and the second optical filters and to each of the first and the second photodiodes. The second optical filter may convey modulated optical signals to the second connector in response to a known electrical signal input. The second optical connection identification assembly may include third and fourth connectors, a third optical filter, a fourth optical filter, a third photodiode, a fourth photodiode, and an optical signal detection circuit. The third and the fourth connectors may be configured for conveying optical signals within and away from the second optical connection identification assembly. The third optical filter may be configured for conveying an optical signal to and from the third connector. The fourth optical filter may be configured for conveying an optical signal to and from the fourth connector. The third and the fourth optical filters may be configured for conveying optical signals between each other. The third photodiode may be configured for receiving an optical signal from the third optical filter. The fourth photodiode may be configured for receiving an optical signal from the fourth optical filter. The optical signal detection circuit may be configured for receiving the modulated optical signals from the second connector to confirm optical power is being supplied from the first optical connection identification assembly. The third and the fourth connectors may be configured such that at least a portion of optical signals conveyed to or from either one of the third and the fourth connectors are conveyed to of each of the third and the fourth optical filters and to each of the third and the fourth photodiodes. The intermediate optical fiber may be connected to and may extend between the first and the second optical connection identification assemblies.

In some arrangements, the first and the second connectors may be on opposite sides of the combination of each of the first and the second optical filters and each of the first and the second photodiodes. In some arrangements, the third and the fourth connectors may be on opposite sides of the combination of each of the third and the fourth optical filters and each of the third and the fourth photodiodes.

In some arrangements, the known electrical signal input may be generated remotely. In some such arrangements, the electrical signal input may be generated by a signal generator.

In some arrangements, the optical signal conveyed from the first connector may be a test signal. In some arrangements the optical signal conveyed from the first connector may be a signal existing prior to connection of the first and the second optical connection identification assemblies.

In some arrangements, the first optical connection identification assembly may further include a heat source configured for heating the second optical filter to control the modulation of the modulated optical signals conveyed from the second connector in response to the known electrical signal input. In some such arrangements, the electrical signal input may be generated by a signal generator. In some such arrangements, the signal generator may be in communication with the heat source via a network, which may be a cloud-based network.

In some arrangements, the first optical connection identification assembly may further include a vibratory actuator. The vibratory actuator may be configured for vibrating the second optical filter to control frequency or amplitude modulation of the modulated optical signals in response to the known electrical signal input. In some such arrangements, the electrical signal input may be generated by a signal generator. In some such arrangements, the signal generator may in communication with the vibratory actuator via a network, which may be a cloud-based network.

In some arrangements, optical signals conveyed from the second optical filter may be received by the third photodiode via the second connector, the third connector, and the intermediate optical fiber.

In accordance with another aspect, an optical fiber connection identification system may include a first optical connection identification assembly, a second optical connection identification assembly, and an intermediate optical fiber. The first optical connection identification assembly may include first and second connectors, a first optical filter, a second optical filter, a first photodiode, a second photodiode, and a light source. The first and second connectors may be configured for conveying optical signals within and away from the first optical connection identification assembly. The first optical filter may be configured for conveying an optical signal to and from the first connector. The second optical filter may be configured for conveying an optical signal to and from the second connector. The first and the second optical filters may be configured for conveying optical signals between each other. The first photodiode may be configured for receiving an optical signal from the first optical filter. The second photodiode may be configured for receiving an optical signal from the second optical filter. The first and the second connectors may be configured such that at least a portion of optical signals conveyed to or from either one of the first and the second connectors are conveyed to each of the first and the second optical filters and to each of the first and the second photodiodes. The light source may be configured for conveying optical signals through the second connector different than the optical signals conveyed from the second optical filter. The second optical connection identification assembly may include third and fourth connectors, a third optical filter, a fourth optical filter, a third photodiode, a fourth photodiode, and an optical signal detection circuit. The third and fourth connectors may be configured for conveying optical signals within and away from the second optical connection identification assembly. The third optical filter may be configured for conveying an optical signal to and from the third connector. The fourth optical filter maybe configured for conveying an optical signal to and from the fourth connector. The third and the fourth optical filters may be configured for conveying optical signals between each other. The third photodiode may be configured for receiving an optical signal from the third optical filter. The fourth photodiode may be configured for receiving an optical signal from the fourth optical filter. The optical signal detection circuit may be configured for receiving the optical signals from the light source to confirm optical connectivity between the first and the second optical connection identification assemblies. The third and the fourth connectors may be configured such that at least a portion of optical signals conveyed to or from either one of the third and the fourth connectors are conveyed to each of the third and the fourth optical filters and to each of the third and the fourth photodiodes. The intermediate optical fiber may be connected to and may extend between the first and the second optical connection identification assemblies.

In some arrangements, the first and the second connectors may be on opposite sides of the combination of each of the first and the second optical filters and each of the first and the second photodiodes. In some arrangements, the third and the fourth connectors may be on opposite sides of the combination of each of the third and the fourth optical filters and each of the third and the fourth photodiodes.

In some arrangements, the differing optical signals conveyed through the second connector from the light source and from the second optical filter may be conveyed through the second connector simultaneously via wavelength-division multiplexing (WDM).

In some arrangements, optical signals conveyed from the light source may be received by the third photodiode via the second connector, the third connector, and the intermediate optical fiber.

In some arrangements, the light source may be a light-emitting diode (LED).

In accordance with another aspect, an optical fiber connection identification system may include a first optical connection identification assembly, a second optical connection identification assembly, and an intermediate optical fiber. The first optical connection identification assembly may include first and second connectors, a first optical filter, a second optical filter, a first photodiode, a second photodiode, a third photodiode, a first beam splitter, and a light source. The first and second connectors may be configured for conveying optical signals within and away from the first optical connection identification assembly. The first optical filter may be configured for conveying an optical signal to and from the first connector. The second optical filter may be configured for conveying an optical signal to and from the second connector. The first and the second optical filters may be configured for conveying optical signals between each other. The first photodiode may be configured for receiving an optical signal from the first optical filter. The second photodiode may be configured for receiving an optical signal from the second optical filter. The first and the second connectors may be configured such that at least a portion of optical signals conveyed to or from either one of the first and the second connectors are conveyed to each of the first and the second optical filters and to each of the first and the second photodiodes. The third photodiode may be configured for receiving a known electrical signal input. The first beam splitter may be between the second optical filter and the second connector. The light source may be driven, i.e., controlled, by the third photodiode and may be configured for emitting optical signals towards the first beam splitter in response to the known electrical signal input. The first beam splitter may be configured for conveying the optical signals emitted from the light source to the second connector and to the first optical filter. The second optical connection identification assembly may include third and fourth connectors, a third optical filter, a fourth optical filter, a fourth photodiode, a fifth photodiode, a sixth photodiode, a second beam splitter, and a signal indicator. The third and the fourth connectors configured for conveying optical signals within and away from the second optical connection identification assembly. The third optical filter may be configured for conveying an optical signal to and from the third connector. The fourth optical filter may be configured for conveying an optical signal to and from the fourth connector. The third and the fourth optical filters may be configured for conveying optical signals between each other. The fourth photodiode may be configured for receiving an optical signal from the third optical filter. The fifth photodiode may be configured for receiving an optical signal from the fourth optical filter. The third and the fourth connectors may be configured such that at least a portion of optical signals conveyed to or from either one of the third and the fourth connectors are conveyed to each of the third and the fourth optical filters and to each of the fourth and the fifth photodiodes. The sixth photodiode may be configured for receiving a portion of optical signals. The second beam splitter may be between the third optical filter and the third connector. The second beam splitter may be configured for conveying optical signals conveyed from the third connector to the sixth photodiode. The signal indicator may be electrically connected to the sixth photodiode and may be configured for indicating the conveyance of optical signals from the first optical connection identification assembly. The intermediate optical fiber may be connected to and may extend between the first and the second optical connection identification assemblies.

In some arrangements, the first and the second connectors may be on opposite sides of the combination of each of the first and the second optical filters and each of the first and the second photodiodes. In some arrangements, the third and the fourth connectors may be on opposite sides of the combination of each of the third and the fourth optical filters and each of the third and the fourth photodiodes.

In accordance with another aspect, an intelligent optical fiber termination system may include an enclosure, an optical termination assembly within the enclosure, a first operational sensing mechanism, a first component at least partially within the enclosure, and a central processing unit (CPU). The optical termination assembly may include (i) a first optical fiber connector, (ii) an optical fiber extending through at least a portion of the first optical fiber connector, (iii) an adapter into which the first optical fiber connector is insertable, and a sensing mechanism. The sensing mechanism may be any one or any combination of (i) first insertion sensing mechanism configured for conveying first fiber insertion status signals corresponding to a first fiber insertion status of the first optical fiber connector into the adapter, (ii) a first fiber signal conveyance sensing mechanism configured for conveying first fiber conveyance status signals corresponding to a first fiber conveyance status of input optical signals to or of output optical signals from the first optical fiber, and (iii) a first end contact sensing mechanism configured for conveying first end contact status signals corresponding to a first end contact status of an end of the first optical fiber connector with another object when the first optical fiber connector is inserted into the adapter. The first operational sensing mechanism may be configured for conveying first operational status signals different than at least one signal-type of the conveyed ones of the first fiber insertion status signals, the first fiber conveyance status signals, and the first end contact status signals and may correspond to a first operational status of the intelligent optical fiber termination system. The CPU may be configured for receiving a plurality of CPU input signals, respectively, corresponding to each of the conveyed ones of the first fiber insertion status signals, the first fiber conveyance status signals, the first end contact status signals, and the first operational status signals. The CPU may convey a first directional signal to direct a change in state of the first component based on the CPU input signals received by the CPU.

In some arrangements, the optical termination assembly may include a patch panel or a patch panel assembly.

In some arrangements, the first fiber insertion status signals, the first end contact status signals, the first operational status signals, and the CPU input signals may be electrical signals, e.g., current. In some arrangements, the first fiber conveyance status signals may be optical signals.

In some arrangements, the first fiber conveyance sensing mechanism may be an optical signal power monitoring device. In some such arrangements, the optical signal power monitoring device may be a bi-directional optical signal power monitoring device configured for providing an indication of the conveyance of the input optical signals to or of the output optical signals from the first optical fiber.

In some arrangements, the intelligent optical fiber termination system may be configured for receiving external input signals which may include external input radio signals, external input electrical signals, external input optical signals, and any combination of such signals from an external source external to the intelligent optical fiber termination system. In such arrangements, the CPU may be configured to convey the first directional signal to the first component in response to the external input signals. In some arrangements, the external input signals may be external input radio signals and the intelligent optical fiber termination system further may include a receiver or transceiver that may be configured for electrical communication with the CPU and may be further configured for receiving the external input radio signals.

In some arrangements, the intelligent optical fiber termination system may be configured for conveying system output signals which may be system output radio signals, system output electrical signals, system output optical signals, and any combination of such signals to an external source external to the intelligent optical fiber termination system. In such arrangements, the system output signals may be directed by the CPU.

In some arrangements, system output signals may be system output radio signals and the intelligent optical fiber termination system further may include a transmitter or transceiver that may be configured for electrical communication with the CPU and further configured for conveying the system output radio signals.

In some arrangements, the first operational status signals may be second fiber insertion status signals different from the first fiber insertion status signals and corresponding to a second fiber insertion status of a second optical fiber connector insertable into the adapter. In such arrangements, the intelligent optical fiber termination system may further include the second optical fiber connector insertable into the adapter.

In some arrangements, the first optical fiber connector may include a first housing and a first ferrule translatable within the first housing. In such arrangements, the first end contact sensing mechanism may convey first end contact status signals indicating contact of the end of the first optical fiber connector with another object when the first optical fiber connector is inserted into the adapter and the first ferrule of the first optical fiber connector is in contact with a second ferrule of a second optical fiber connector.

In some arrangements, each of the conveyed ones of the first fiber insertion status signals, the first fiber conveyance status signals, the first end contact status signals, and the first operational status signals may be conveyed at one or more respective predetermined time intervals.

In some arrangements, the intelligent optical fiber termination system may further include a memory storage system in communication with a microprocessor of the CPU and configured for storing any one or any combination of the first fiber insertion statuses, the first fiber conveyance statuses, the first end contact statuses, and the first operational statuses. In some such arrangements, the memory storage system may include a memory storage device in electrical communication with the microprocessor of the CPU. In some such arrangements, the memory storage system may be part of the CPU.

In some arrangements, the stored ones of the first fiber insertion statuses, the first fiber conveyance statuses, the first end contact statuses, and the first operational statuses may be stored by the memory storage system along with respective corresponding times at which or time intervals over which the plurality of the CPU input signals are received by the CPU.

In some arrangements, a first combination of at least two mechanisms of any one or any combination of the first insertion sensing mechanism, the first fiber conveyance sensing mechanism, and the first end contact sensing mechanism may be conveying the respective first fiber insertion status signals, first fiber conveyance status signals, and first end contact status signals. In such arrangements, the first operational sensing mechanism may be one of the mechanisms of the first combination.

In some arrangements, the memory storage system may store (i) a first fiber insertion reference value for use in determining the first fiber insertion status when the optical termination assembly includes the first insertion sensing mechanism, (ii) a first fiber conveyance reference value for use in determining the first fiber conveyance status when the optical termination assembly includes the first fiber conveyance sensing mechanism, (iii) a first end contact reference value for use in determining the first end contact status when the optical termination assembly includes the first end contact sensing mechanism, and (iv) a first operational reference value for use in determining the first operational status. In such arrangements, the intelligent optical fiber termination system further may include a logic controller in communication with the memory storage system. The logic controller may be part of or may be separate from but in communication with the CPU. The logic controller may be configured for determining (i) a first relative value associated with the first fiber insertion status and based on a comparison of a determined first fiber insertion status value corresponding to the first fiber insertion status signals to the first fiber insertion reference value when the memory storage device stores the first fiber insertion reference value, (ii) a second relative value associated with the first fiber conveyance status and based on a comparison of a determined first fiber conveyance status value corresponding to the first fiber conveyance status signals to the first fiber conveyance reference value when the memory storage device stores the first fiber conveyance reference value, (iii) a third relative value associated with the first end contact status and based on a comparison of a determined first end contact status value corresponding to the first end contact status signals to the first end contact reference value when the memory storage device stores the first end contact reference value, and (iv) a fourth relative value associated with the first operational status and based on a comparison of a determined first operational status value corresponding to the first operational status signals to the first operational reference value.

In some such arrangements, the logic controller may be remote from the enclosure when the logic controller is separate from the CPU.

In some arrangements, the first directional signal may be based on at least one relative value of the first, the second, the third, and the fourth relative values determined by the logic controller, and wherein the CPU is configured for conveying a second directional signal to the first component or another component different from the first component and at least partially within the enclosure based on at least one different relative value of the first, the second, the third, and the fourth relative values.

In some arrangements, a combination of the CPU, the logic controller when separated from the CPU, and the memory storage system may be configured to effect a change to at least one of the reference values of the first insertion reference value, the first fiber conveyance status value, the first end contact status value, and the first operational value.

In some arrangements, the combination of the CPU, the logic controller when separated from the CPU, and the memory storage system are configured to effect the change to the at least one of the reference values of the first insertion reference value, the first fiber conveyance status value, the first end contact status value, and the first operational value based on the external input signals received by the intelligent optical fiber termination system when such external input signals are so received. In some such arrangements, the intelligent optical fiber termination system may be configured to convey the system output signals to the external source, and wherein the external input signals are based on the system output signals to the external source. In some arrangements, the intelligent optical fiber termination system may include the external source. In such arrangements, the external source may be a central office of an internet service provider (ISP) in which the central office may manipulate the system output signals to determine the external input signals and convey the external input signals to the intelligent optical fiber termination system.

In some arrangements, the intelligent optical fiber termination system may further include a transceiver in electrical communication with the CPU. In such arrangements, the transceiver may be configured for communicating wirelessly with a cloud network and, as such, for receiving the external input signals. In such arrangements, the external source may be remote from the enclosure and may be within the cloud network.

In some such arrangements, the transceiver may be further configured for conveying the system output signals to the external source.

In some arrangements, the memory storage system may store a plurality of (i) the determined first fiber insertion status values when the memory storage device stores the first fiber insertion reference value, (ii) the determined first fiber conveyance status values when the memory storage device stores the first fiber conveyance reference value, (iii) the determined first end contact status values when the memory storage device stores the first end contact reference value, and (iv) the determined first operational status values. In such arrangements, the combination of the CPU, the logic controller when separated from the CPU, and the memory storage system may be configured to effect the change to (i) the first fiber insertion reference value when the optical termination assembly includes the first insertion sensing mechanism based on an accumulated set or the entirety of the plurality of the first fiber insertion status values, (ii) the first fiber conveyance reference value when the optical termination assembly includes the first fiber conveyance sensing mechanism based on an accumulated set or the entirety of the plurality of the first fiber conveyance status values, (iii) the first end contact reference value when the optical termination assembly includes the first end contact sensing mechanism based on an accumulated set or the entirety of the plurality of the first end contact status values, and (iv) the first operational reference value based on an accumulated set or the entirety of the plurality of the first operational status values.

In some arrangements, the change effected to (i) the first fiber insertion reference value is to ignore the first fiber insertion reference value and set the first insertion sensing mechanism to a default setting, (ii) the first fiber conveyance reference value is to ignore the first fiber conveyance reference value and set the first fiber conveyance sensing mechanism to a default setting, (iii) the first end contact reference value is to ignore the first end contact reference value and set the first end contact sensing mechanism to a default setting, and (iv) the first operational reference value is to ignore the first operational reference value and set the first operational sensing mechanism to a default setting.

In some arrangements, the intelligent optical fiber termination system may further include a transceiver in electrical communication with the CPU and configured for communicating wirelessly with a cloud network. In such arrangements, the first directional signal may be provided by the CPU to the first component based on a first transceiver signal from the transceiver and a second directional signal may be provided to the first component or another component different from the first component and at least partially within the enclosure based on a second transceiver signal from the transceiver.

In some arrangements, the operational sensing mechanism may include any one or any combination of an environmental sensor, a position sensor, an orientation sensor, a door closure sensor, a microphone, an accelerometer, a water presence sensor, and an enclosure presence sensor.

In some arrangements, the operational sensing mechanism may be an environmental sensor. Such environmental sensor may be a temperature sensor or a humidity sensor. In some arrangements in which the operational sensing mechanism is an environmental sensor, the first component may include a heating device that may be activated to heat at least a portion of an interior of the enclosure when the environmental sensor detects a temperature below a predetermined threshold. In some arrangements in which the operational sensing mechanism is an environmental sensor, the first component may include a cooling device that may be activated to cool at least a portion of an interior of the enclosure when the environmental sensor detects either one or both of a temperature above a predetermined threshold and a humidity level above a predetermined threshold. In some such arrangements, the cooling device may include a fan.

In some arrangements, the first component or another component separate from the first component may be a sensory indication unit configured to indicate a change in any one or any combination of (i) the first fiber insertion status when the optical termination assembly includes the first insertion sensing mechanism, (ii) the first fiber conveyance status when the optical termination assembly includes the first fiber conveyance sensing mechanism, (iii) the first end contact status when the optical termination assembly includes the first end contact sensing mechanism, and (iv) the first operational status. In such arrangements, the sensory indication unit may provide any one or any combination of a visual signal, an auditory signal, or a tactile signal.

In some arrangements, the sensory indication unit may include any one or any combination of a light emitting diode (LED), an audio speaker, and a piston-driven actuator assembly.

In some arrangements, the optical termination assembly may include the optical fiber connection identification assembly as described with respect to certain aspects and arrangements discussed above.

In accordance with another aspect, an intelligent optical fiber termination network may include the intelligent optical fiber termination system of aspects and arrangements above that include the CPU. The optical fiber termination network may further include a transceiver and a cloud network. The transceiver may be in electrical communication with the CPU. The cloud network may include the memory storage system and may be configured for communicating wirelessly with the transceiver of the intelligent optical fiber termination system.

In some arrangements, the intelligent optical fiber termination network may be a wide area network (WAN) comprising a remote site remote from the intelligent optical fiber termination system.

In accordance with another aspect, an intelligent optical fiber termination network may include the intelligent optical fiber termination system of aspects and arrangements above that include the CPU and are configured for receiving the external input signals. The intelligent optical fiber termination system may further include a transceiver and a cloud network. The transceiver may be in electrical communication with the CPU. The cloud network may include the logic controller when the logic controller is separated from the CPU in which the logic controller may be located at a remote site remote from the intelligent optical fiber termination system. In such arrangements, the cloud network may be configured for communicating wirelessly with the transceiver of the intelligent optical fiber termination system such that the transceiver receives the external input signals conveyed from the logic controller.

In accordance with another aspect, an optical fiber termination system may be controlled by a process. In this process, a first electrical input signal corresponding to any one or any combination of (i) first fiber insertion status signals corresponding to a first fiber insertion status of a first optical fiber connector into an adapter of an optical termination assembly at least partially within an enclosure of the optical fiber termination system, (ii) first fiber conveyance status signals corresponding to a first fiber conveyance status of input optical signals to or of output optical signals from the first optical fiber, (iii) first end contact status signals corresponding to a first end contact status of an end of the first optical fiber connector with another object when the first optical fiber connector is inserted into the adapter may be received by a central processing unit (CPU). A second electrical input signal corresponding to first operational status signals different than the first fiber insertion status signals, the first fiber conveyance status signals, and the first end contact status signals and corresponding to a first operational status of the optical fiber termination system may be received by the CPU. In such arrangements, a first directional signal may be conveyed by the CPU to direct a change in state of a first component at least partially within the enclosure of the optical fiber termination system based on either one or both of the first and the second electrical input signals received by the central processing unit. In such arrangements, a physical state of the first component may be changed in response to the first directional signal.

In accordance with another aspect, an optical fiber termination assembly and control unit includes at least a first cassette within a cassette housing or chassis and an electronic control unit attached to but separable from the cassette housing or chassis. The first cassette includes a plurality of front optical ports. The electronic control unit includes at least a first photodiode. The first photodiode is in optical communication with at least a first front optical port of the plurality of the front optical ports such that at least a first portion of optical signals conveyed from the first front optical port is received by the first photodiode.

In accordance with another aspect, an optical fiber termination assembly and control unit includes at least a first cassette within a cassette housing or chassis and an electronic control unit attached to but separable from the cassette housing or chassis. The first cassette includes one or more patch panels and a first optical filter. Each patch panel includes at least one connector port. At least a first connector port of the plurality of connector ports is in optical communication with at least a second one of the plurality of connector ports via the first optical filter. The electronic control unit includes at least a first photodiode. The first photodiode is in optical communication with the first optical filter such that a first portion of optical signals conveyed from the first connector port is received by the first photodiode and a second portion of the optical signals conveyed from the first connector port is received by the second connector port.

In some arrangements, the optical fiber termination assembly and control unit further may include a plurality of the cassettes in which the plurality of cassettes may be stacked in the cassette housing.

In some arrangements, the optical fiber termination assembly and control unit further may include a second optical filter in optical communication with the first optical filter, the second connector port, and at least a third connector port of the plurality of connector ports. The second optical filter may be a WDM module or splitter module such that the optical signals conveyed from the first optical filter are conveyed to each of the second and the third connector ports. Optical signals conveyed from each of the second and the third connector ports are conveyed via the second optical filter within a blended optical signal to the first optical filter in which a portion of the blended optical signal is conveyed from the first optical filter to the first connector port.

In some such arrangements, the cassette may include a plurality of first optical filters such that portions of the optical signals conveyed from each of the second and the third connector ports are conveyed via a respective one of the first optical filters to the second optical filter.

In some arrangements, the cassette may include another first optical filter associated with the second connector port such that only a portion of optical signals conveyed from the second connector port are received by the first connector port.

In some arrangements, the optical fiber termination assembly and control unit further may include a microcontroller and a light-emitting diode (LED). The first photodiode may convey first electrical signals to the microcontroller when the first photodiode receives the first portion of the optical signals conveyed from the first connector port. The microcontroller may convey second electrical signals to the LED to illuminate the LED upon receipt of the first electrical signals. In some such arrangements, the optical fiber termination assembly and control unit further may include an electronic interface board in which the microcontroller may convey the second electrical signals to the LED via the electronic interface board.

In accordance with another aspect, a connectivity map of a fiber optic system may be prepared by a process. In this process, opposing ends of a first fiber optic cable may be connected to an existing fiber optic network and to a first port of a first optical connection identification assembly, respectively, to register the first optical connection identification assembly to the fiber optic network. In this process, an end of a second fiber optic cable may be connected to a second port of the first optical connection identification assembly opposite the first port. In this process, information relating to the second fiber optic cable may be associated with information relating to the second port of the first optical connection identification assembly. In this process, information relating to a plurality of optical identification assemblies including the first optical connection identification assembly may be analyzed to determine cable connectivity between ports of the plurality of optical identification assemblies. In this process, a cable connectivity map may be created or updated, as the case may be, based on the determined cable connectivity between the ports of the plurality of optical identification assemblies.

In accordance with another aspect, an optical system may include a first connector, a first optical filter, a first optical receiving device, a first optical transmission device, and a first central processing and transmission unit. The first connector may be configured for routing first optical signals. The first optical filter may be configured for routing the first optical signals to and from the first connector. The first optical receiving device may be configured for receiving second optical signals routed via the first optical filter and the first connector. The first optical transmission device may be configured for causing the generation of the second optical signals. The first central processing and transmission unit may be in electrical communication with the first optical receiving device. The first central processing and transmission unit may be configured for transmitting radio or electrical signals carrying data relating to either the second optical signals or either one or both of determined optical characteristics and determined optical path characteristics based on the second optical signals.

In some arrangements, the first optical signals may be deformed within the optical system to form the second optical signals.

In some arrangements, the second optical signals may be routed from the first optical filter. In some such arrangements, the first optical receiving device and the first optical transmission device may be parts of a first transceiver. In some such arrangements, the first optical filter may be further configured for routing optical signals to a remote optical unit, which may be a separate optical unit, simultaneously with the routing of the second optical signals and the first optical filter may be further configured for receiving optical signals simultaneously from the remote optical unit and from the first optical transmission device, e.g., the first transceiver. In some such arrangements, the first optical unit may be an additional optical assembly.

In some arrangements, the first optical filter may be a splitter. In some such arrangements, the splitter may be a tap filter module or wavelength division multiplexing (WDM) unit.

In some arrangements, the optical signals may be generated by the first optical transmission device may be formed by a modulated continuous wave (CW) laser. In some such arrangements, such optical signals may be formed by pulses of light when the laser is operated in a burst mode.

In some arrangements, the first optical receiving device may be configured for converting the second optical signals to electrical signals in the form of electrical current received by the first central processing and transmission unit. The first central processing and transmission unit or a computing unit remote from the optical system may thereby determine and, as needed, report, e.g., to a central office, any one or any combination of information relating to an optical power, pulse shape, and noise of the optical signals.

In some arrangements, the first central processing and transmission unit may be in electrical communication with the first optical transmission device and may be further configured for receiving radio or electrical signals carrying data relating to optical signals generated by the first optical transmission device and thereby causing the generation of the second optical signals. In some other arrangements, the optical system may further include a second central processing and transmission unit. In such arrangements, the second central processing and transmission unit may be in electrical communication with the first optical transmission device and may be further configured for receiving radio or electrical signals carrying data relating to the optical signals generated by the first optical transmission device and thereby causing the generation of the second optical signals.

In some arrangements, the first central processing and transmission unit is part of a first control unit. In some such arrangements, the second central processing and transmission unit is part of a remote optical unit, which may include a second control unit, attached to the first control unit via one or more optical fibers.

In some arrangements, the optical system may further include a first photodetector. The first photodetector may be configured for receiving third optical signals from the first optical filter to confirm the first connector is receiving the first optical signals. In some such arrangements, the first photodetector may be a photodiode.

In some arrangements, the transmitted radio or electrical signals may be carrying data relating to the one or both of the determined optical characteristics and the determined optical path characteristics. In some such arrangements, the one or both of the determined optical characteristics and the determined optical path characteristics may be any one or any combination of power loss, optical dispersion, and latency.

In some arrangements, the transmitted radio or electrical signals may be carrying data relating to the one or both of the determined optical characteristics and the determined optical path characteristics. In some such arrangements, the first central processing and transmission unit may be configured for computing and thereby determining the one or both of the determined optical characteristics and the determined optical path characteristics and may be further configured for reporting the one or both of the determined optical and optical path characteristics to a central office configured for analyzing the determined optical and optical path characteristics or to a remote computing unit accessible by the central office. In some other arrangements, the remote computing unit may be configured for receiving the transmitted radio or electrical signals and for computing and thereby determining the one or both of the determined optical and the determined optical path characteristics. In such arrangements, the remote computing unit may be further configured for reporting the one or both of the determined optical and the determined optical path characteristics to the central office configured for analyzing the determined optical characteristics and the determined optical path characteristics or the remote computing unit may be accessible by the central office.

In some arrangements, the remote computing unit may be a virtual machine which may be on a cloud network. The virtual machine may be running analysis software configured for determining the one or both of the determined optical characteristics and the determined optical path characteristics. Such software may be but is not limited to being AMAZON Web Services (AWS) or Microsoft® Azure cloud computing network software, or other such software.

In some arrangements, the central office may utilize the determined optical characteristics and the determined optical path characteristics to optimize optical paths of a fiber optic network through physical changes in the network, such as by deploying and redeploying optical fibers within the network or by modifying the routing of the optical signals, e.g., by switching the direction of the optical signals for latency optimization.

In some arrangements, the optical system may further include a cassette that may include a substrate. In some such arrangements, the first optical filter may be mounted to the substrate of the cassette. In some such arrangements, the first optical receiving device may be attached to a printed circuit board detached from the cassette. In some arrangements, the first optical receiving device and the first optical transmission device may be portions of a transceiver that is attached to the printed circuit board separate, e.g., detached or detachable, from the cassette.

In some arrangements, the cassette may be insertable into a cassette housing and the printed circuit board may be enclosed in a control unit housing. In some such arrangements, a cassette connector may be attached to and in optical communication with the first optical filter, a control unit connector may be attached to and in optical communication with the first optical receiving device which may be part of a transceiver, and the cassette and the control unit connectors may be inserted into an adapter extending through a rear portion of the cassette housing or a front portion of the control unit housing such that the first connector and the control unit connector are in optical communication via the cassette connector.

In some arrangements, the cassette further includes a first adapter and the first connector may be inserted or insertable into the adapter. The first connector may be on an end of an optical fiber extending between the first connector and the first optical filter such that the first connector and the first optical filter are in optical communication. In some arrangements, the cassette may further include additional first adapters and additional first connectors inserted or insertable into respective ones of the additional first adapters. In such arrangements, each of the additional first adapters may be in optical communication with the first optical receiving device via the respective ones of the first connectors and the first optical filter. In such arrangements, the first adapter and the additional adapters may define a plurality of adapters and the first connector and the additional connectors may define a plurality of first connectors. In such arrangements, at least one of the plurality of first adapters may be in optical communication with another one of the plurality of first adapters via the corresponding first connectors of the first adapters that are in optical communication and via the first optical filter.

In some arrangements, the transmitted radio or electrical signals may be carrying data relating to the one or both of the determined optical characteristics and the determined optical path characteristics. In such arrangements, one of the one or both of the determined optical characteristics and the determined optical path characteristics may be a determined optical path length corresponding to an actual length of an optical path taken by optical signals generated by the first optical transmission device. In such arrangements, the first optical receiving device may determine a first time of conveyance of the optical signals generated by the first optical transmission device and received from the first optical receiving device as the second signals. In such arrangements, the first central processing and transmission unit may be configured for determining the determined optical path length based on the first time of conveyance.

In some such arrangements, the optical path length may be an entire path length between the first optical receiving device and an optical transmission device of an additional optical assembly.

In some arrangements, the determined optical path length may be determined from a measurement of the dispersion of conveyed light providing the optical signals. In some arrangements, he determined optical path length in conjunction with a determined optical power may be used to provide an indication of the real-time quality of the optical path.

In some arrangements, the transmitted radio or electrical signals may be carrying data relating to the one or both of the determined optical characteristics and the determined optical path characteristics. In such arrangements, one of the one or both of the determined optical characteristics and the determined optical path characteristics may be a determined optical dispersion value relating to a light dispersion generating the optical signals received by the first optical receiving device and routed from the first optical filter. In some such arrangements, the determined optical dispersion value may correspond to an optical path length of an optical path extending between the first optical receiving device and a remote optical unit. In some arrangements, the remote optical unit may be a separate optical assembly that may include a second connector, a second optical filter, and a second receiving device or a second transceiver that includes a second receiving device.

In some such arrangements, a stored optical dispersion value corresponding to an optical path length may be stored in a memory of the first central processing and transmission unit or a remote computing unit, as described previously herein, in communication with the first central processing and transmission unit. In such arrangements, the respective first central processing and transmission unit or the remote computing unit may be further configured to determine the determined optical path length based on the stored optical dispersion value.

In some arrangements, the optical system may further include a tuning controller that may be adjacent to the first optical filter. In such arrangements, the tuning controller, which may be but is not limited to being a dispersion compensation device, may alter a temperature along a portion of the optical path length and thereby alter the optical signals routed from the first optical filter into the second optical signals. In some such arrangements, the first optical receiving device and the first transmission device may be components of a transceiver that includes the tuning controller. In some arrangements, the tuning controller may be along a portion of the optical path. In such arrangements, the first central processing and transmission unit may continuously direct the tuning controller to alter the temperature of the tuning controller until the first optical receiving device receives the second optical signals routed from the first optical filter at a preset desired state.

In some arrangements, the optical system may further include a thermocouple or other temperature transducer that may be in electrical communication with the first central processing and transmission unit and that may be configured for measuring the local temperature along the optical path.

In some arrangements, the tuning controller may include either one or both of a heat source and a cooling source for altering the temperature along the portion of the optical path.

In some arrangements, the first optical receiving device and the first optical transmission device may be components of an optical transceiver. In such arrangements the first central processing and transmission unit may be in electrical communication with the first optical transmission device such that the first central processing and transmission unit may direct the generation of optical signals by the first optical transmission device and thereby causes the generation of the second optical signals. In some arrangements, the optical transceiver may be an optical time-domain reflectometry (OTDR) device.

In some arrangements, the first optical signals may include the second optical signals and third optical signals. The second optical signals may have a first wavelength and the third optical signals may have a second wavelength different from the first wavelength. In some such arrangements, only the third optical signals may be routed from the first optical filter to the first receiving device. In some such arrangements, the second wavelength may be 1650 nm.

In some arrangements, the first connector, the first optical filter, the first optical receiving device, and the first central processing and transmission unit may form a first optical assembly. In such arrangements, the optical system may further include a second optical assembly that may include a second connector, a second optical filter, and a second optical receiving device. The first and the second connectors may be configured for routing optical signals within and away from the first and the second optical assemblies, respectively. The second connector may be in optical communication with the first connector via a first optical fiber such that optical signals routed from the first connector and from the second connector are received by the other of the first connector and the second connector. The second optical filter may be configured for routing optical signals to and from the second connector. The second optical receiving device may be configured for receiving optical signals routed from the second optical filter and may be configured for routing at least portions of optical signals routed by the second connector via the second optical filter along the first optical fiber or along another optical fiber to the first optical assembly.

In such arrangements, the second connector may be configured for routing third optical signals within and away from the second optical assembly, the second optical filter may be configured for routing the third optical signals to and from the second connector, and the second optical receiving device may be configured for receiving fourth optical signals routed from the second optical filter. The third and fourth optical signals may be formed from light conveyed from the second connector such that the second optical receiving device is configured for routing at least the portions of the optical signals routed by the second connector via the second optical filter along the first optical fiber or along another optical fiber to the first optical assembly.

In some arrangements, the second optical filter may be further configured for routing optical signals to a remote optical unit simultaneously with the routing of the fourth optical signals routed to the second optical receiving device.

In some arrangements including the second optical assembly, the second optical filter may be a splitter. In some such arrangements the splitter may be a tap filter module or WDM unit.

In some arrangements including the second optical assembly, the optical signals generated by the first optical transmission device may be formed by a modulated CW laser. Such optical signals may be formed by pulses of light when the laser is operated in a burst mode.

In some arrangements including the second optical assembly, the first optical receiving device may be configured for converting the second optical signals to electrical signals in the form of electrical current received by the first central processing and transmission unit. The first central processing and transmission unit may thereby determine and, as needed, report, e.g., to a central office, any one or any combination of information relating to an optical power, pulse shape, and noise of the optical signals.

In some arrangements including the second optical assembly, the first optical transmission device may be a component of the second optical assembly.

In some arrangements including the second optical assembly, the optical system may further include a second central processing and transmission unit in electrical communication with the second optical receiving device. In such arrangements, the second central processing and transmission unit may be configured for transmitting radio or electrical signals carrying data relating to either the fourth optical signals or either one or both of determined optical characteristics and determined optical path characteristics based on the fourth optical signals.

In some arrangements including the second optical assembly, the second optical receiving device and the first optical transmission device are components of an optical transceiver of the second optical assembly. In some such arrangements, the second central processing and transmission unit may be in electrical communication with the first optical transmission device such that the second central processing and transmission unit may direct the generation of optical signals by the first optical transmission device.

In some arrangements including the second optical assembly, the optical transceiver of the second optical assembly is an OTDR device.

In some arrangements, the optical system may further include a second optical transmission device configured for generating optical signals and thereby causing the generation of the first optical signals routed from the first optical filter and away from the first optical assembly via the first connector. In such arrangements, the second optical transmission device may be a component of the first optical assembly. In some arrangements, the optical signals generated by the second optical transmission device may be synchronized and thus simultaneously generated with optical signals generated by the first optical transmission device and thereby causing the generation of the second optical signals.

In some arrangements including the second optical assembly, the second optical signals are formed from light conveyed from the second connector via the first optical fiber.

In some arrangements including the second optical assembly, the first optical receiving device and the first optical transmission device are components of an optical transceiver of the first optical assembly.

In some arrangements including the second optical assembly, the optical system further may include a second photodetector configured for receiving fifth optical signals from the second optical filter to confirm the second connector is receiving third optical signals. In some such arrangements, the second photodetector may be a photodiode.

In some arrangements, the optical system may further include a third optical assembly in optical communication with the first optical assembly via a second optical fiber such that optical signals may be routed between the first optical assembly and the third optical assembly. The third optical assembly may be further in optical communication with the second optical assembly via a third optical fiber such that optical signals may be routed between the second optical assembly and the third optical assembly. In some such arrangements, the first central processing and transmission unit or a remote computing unit remote from the optical system as described previously herein may compare the timing for receiving optical signals routed from the second optical assembly via the first optical fiber to the timing for receiving optical signals routed from the second optical assembly via the second optical fiber and the third optical fiber to determine a latency between a direct optical path extending between the first optical assembly and the second optical assembly and an optical path extending between the first optical assembly and the second optical assembly via the third optical assembly. In some other such arrangements, the optical system may further include a second central processing and transmission unit in electrical communication with the second optical receiving device. In such arrangements, the second central processing and transmission unit may compare the timing for receiving optical signals routed from the first optical assembly via the first optical fiber to the timing for receiving optical signals routed from the third optical assembly via the second optical fiber and the third optical fiber to determine a latency between a direct optical path extending between the first optical assembly and the second optical assembly and an optical path extending between the first optical assembly and the second optical assembly via the third optical assembly.

In some arrangements, the first optical assembly may further include a third connector, the second optical assembly may further include a fourth connector, and the third optical assembly may further include fifth and sixth connectors for routing optical signals within and away from the third optical assembly. The fifth connector may be in optical communication with the third connector via the second optical fiber and the sixth connector may be in optical communication with the fourth connector via the third optical fiber.

In some arrangements, the optical signals received by the first connector may include first optical signals having a first wavelength and second optical signals having a second wavelength different from the first wavelength to provide a dark channel. In such arrangements, only the second optical signals may be routed from the first optical filter to the first receiving device. In some such arrangements, the second wavelength may be 1650 nm.

In some arrangements, the transmitted radio or electrical signals may correspond to the one or both of the determined optical characteristics and the determined optical path characteristics. In such arrangements, the first central processing and transmission unit or a remote computing unit remote from the optical system, as described previously herein, may be further configured for reporting the one or both of the determined optical characteristics and the determined optical path characteristics to a central office configured for analyzing the determined optical and optical path characteristics or to the remote computing unit accessible by the central office.

In some arrangements, the optical system may further include a first adapter, a second adapter, and an optical fiber cable. The first adapter may be in optical communication with the first optical transmission device. The second adapter may be in optical communication with the first connector. The optical fiber cable may include a first cable connector on a first end of the optical fiber cable and insertable into the first adapter and a second cable connector on a second end of the optical fiber cable opposite the first end and insertable into the second adapter. The first optical transmission device may convey the first optical signals. The first optical signals may be routed along the optical fiber cable via the first adapter, the second adapter, and the first connector.

In some arrangements, the first optical signals may be routed along the optical fiber cable via the first adapter to the second adapter and then to the first optical receiving device via the first connector. The first optical transmission device and the first optical receiving device may be components of different optical transceivers.

In some arrangements, the optical system may further include one or more additional first connectors, one or more additional second adapters, a plurality of optical fibers. The one or more additional first connectors may be in optical communication with the first optical filter and the first optical receiving device. The first connector and the one or more additional first connectors may define a plurality of first connectors. The one or more additional second adapters may be in optical communication with a respective one of the one or more additional first connectors. The second adapter and the one or more additional second adapters may define a plurality of second adapters. The plurality of optical fibers may extend between respective ones of the plurality of first connectors and the plurality of second adapters. The optical fiber cable may be insertable into any one of the plurality of first connectors.

In some arrangements, the optical system may further include a cassette housing, a first cassette, and a second cassette. The first cassette may be inserted into or insertable into the cassette housing. The first cassette may include the first connector. The second cassette may be inserted into or insertable into the cassette housing. The second cassette may include a second connector. The first connector and the second connector may be in optical communication via the first optical filter.

In some arrangements, the optical system may further include a control unit housing, a first adapter, and a second adapter. The control unit housing may include a first control unit connector in optical communication with the first optical filter and a second control unit connector in optical communication with the first optical filter. The first optical filter and the first optical receiving device may be enclosed in the control unit housing. The first cassette may include a first cassette connector in optical communication with the first connector and the second cassette may include a second cassette connector in optical communication with the second connector. The first cassette connector and the first control unit connector may be inserted into the first adapter and the second cassette connector and the second control unit connector may be inserted into the second adapter. The first and the second adapters may extend through a rear portion of the cassette housing or a front portion of the control unit housing such that the first connector and the first optical filter are in optical communication via the first control unit connector and such that the second connector and the first optical filter are in optical communication via the second control unit connector.

In some arrangements, the first connector and the second connector may be in optical communication via the first optical filter.

In some arrangements, the first cassette may include an additional first connector. The second cassette may include an additional second connector. The first cassette and the second cassette may be insertable into the cassette housing and the first connector may be configurable for optical communication via the first optical filter and optical fibers with each of the additional first connector, the second connector and the additional second connector. In some such arrangements, the first connector may be configurable for optical communication with only one of the additional first connector, the second connector, and the additional second connector at a given time.

BRIEF DESCRIPTION OF THE DRAWINGS

By way of description only, embodiments of the present disclosure are described herein with reference to the accompanying figures, in which:

FIG. 13A-15 are cross-sectional views of a connector assemblies for use in the intelligent optical fiber termination system of FIG. 11;

DETAILED DESCRIPTION

As used herein, "optical signals" are ones that are created by the transmission of light beams. Such signals may be formed by modulating the intensity of light beams from a light source or by modulating the frequency of the transmission of light beams from a light source.

Figure 1A:
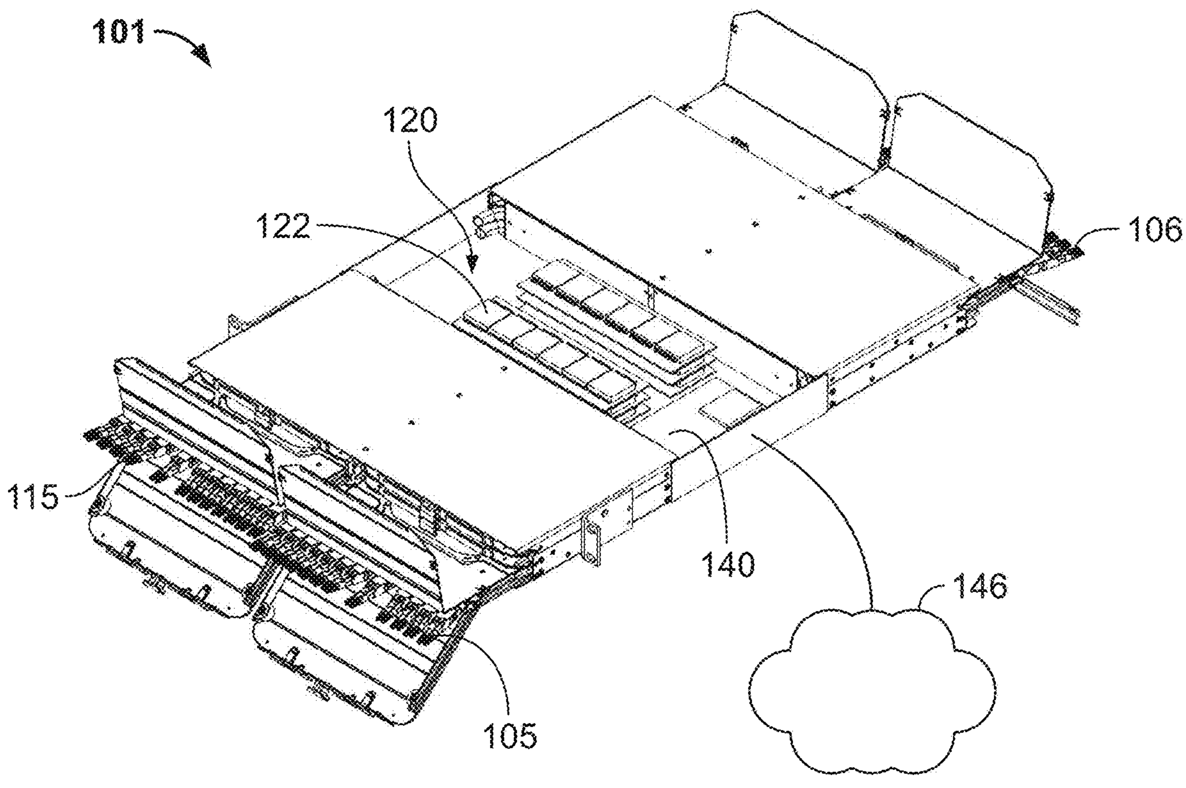
FIG. 1A is a perspective view of an optical connection identification assembly in accordance with an embodiment.
Figure 1B:
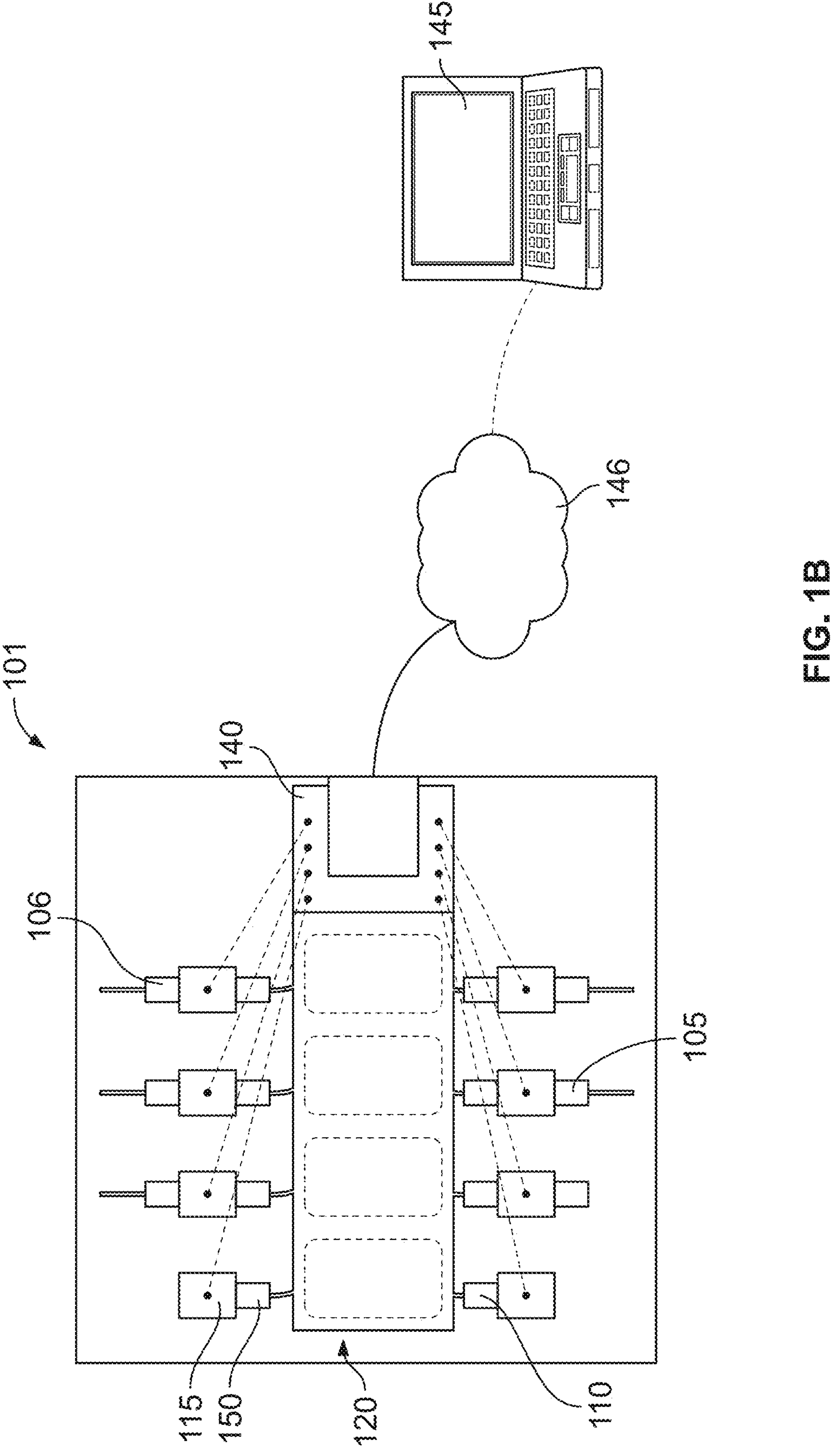
FIG. 1B is a schematic of a portion of the optical connection identification assembly of FIG. 1A within an optical connection identification system in accordance with another embodiment.

Referring now to FIGS. 1A and 1B, optical connection identification system 100, which in the example shown is in the form of a patch panel, provides for optical connections and for signals that such connections have been made. As shown, system 100 generally includes a plurality of first connectors 110 defining ends of fiber optic cables, power monitoring subassembly 120, and a plurality of second connectors 150 opposite respective ones of the plurality of first connectors 110 and also defining ends of fiber optic cables. Each of the plurality of first connectors 110 and second connectors 150 may be inserted into adapters 115 or may be integral with the adapters such that the connectors are inseparable from the adapters. As shown, opposing connectors 105 may be inserted into adapters 115 opposite respective first connectors 110 and, likewise, opposing connectors 106 may be inserted into adapters 115 opposite respective second connectors 150 such that the opposing connectors and the respective first and second connectors may be in optical communication with each other via power monitoring subassembly 120. In some arrangements, a connector engagement sensing mechanism, such as those shown and described in U.S. Patent Application Publication Nos. 2017/0003459 A1 and 2018/0136410 A1, which are hereby incorporated by reference herein, may be attached to or otherwise used in conjunction with first connectors 110, second connectors 150, opposing connectors 105, 106, and adapters 115.

As shown in FIG. 1B, power monitoring subassembly 120 generally includes a plurality of power monitoring sections 122 and microcontroller 140. Microcontroller 140 is electrically connected to first and second connectors 110, 150 or adapters 115 such that the microcontroller may monitor whether connector engagement sensors associated with any one of the first connectors, the second connectors, and the adapters are powered or unpowered for use in determining whether optical fiber connections have been made at the adapters of optical connection identification system 100. As shown, microcontroller 140 may be in communication with remote computer terminal 145 via network 146, such as but not limited to a cloud network. Each power monitoring section 122 in conjunction with a set of opposing first and second connectors 110, 150 may define a separate channel. As in the example shown, power monitoring sections 122 may provide optical signal tapping detection, which, as in the examples described herein, may be signal direction sensitive.

Figure 2:
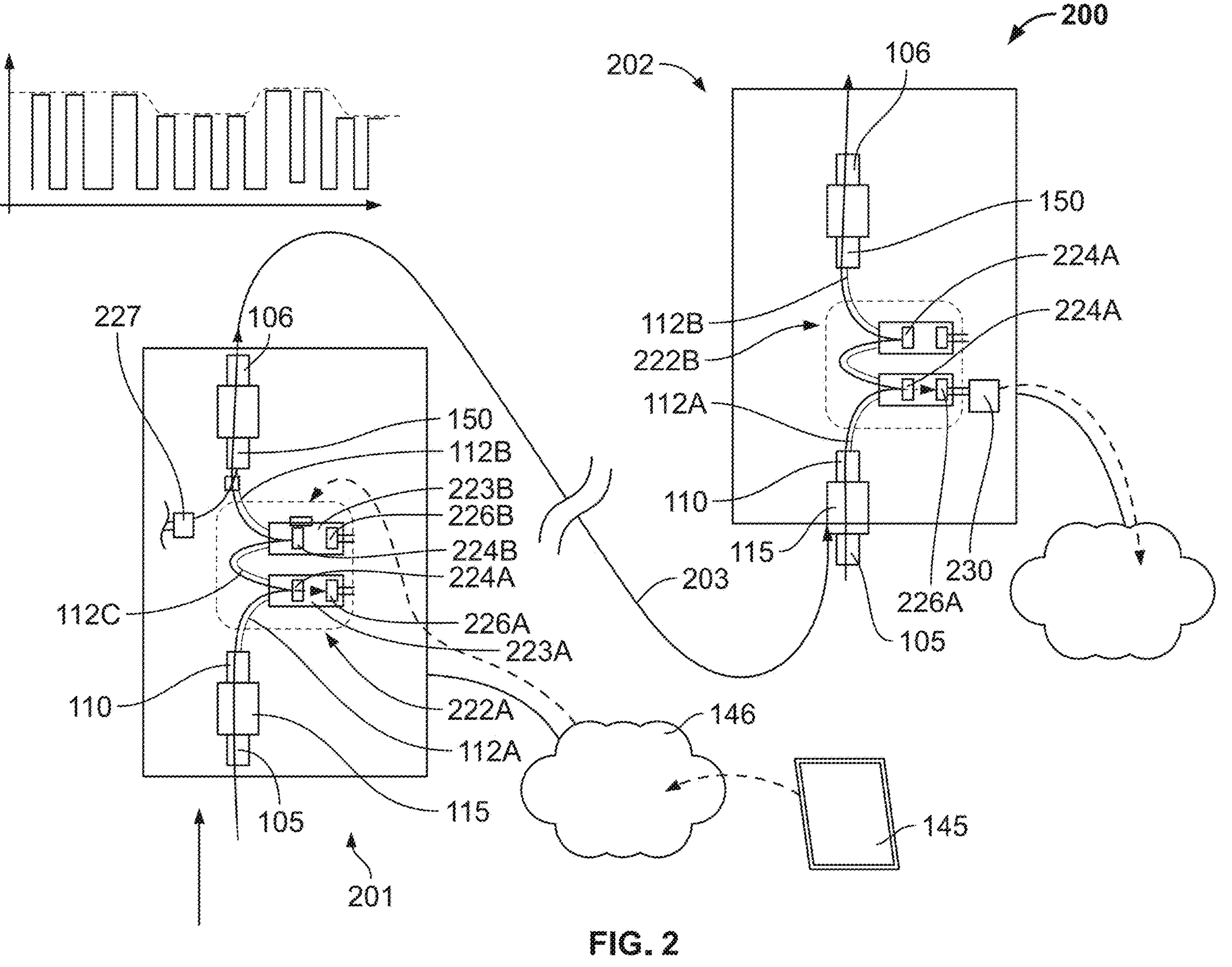
FIG. 2 is a schematic of an optical connection identification system in accordance with another embodiment.

Referring now to FIG. 2, optical connection identification system 200 includes first optical connection identification assembly 201 and second optical connection identification assembly 202, which may be substantially in the form of and function in substantially the same manner as optical connection identification system 100, optically connected by intermediate optical fiber 203. In this example, optical signals may be conveyed from the first optical connection assembly 201 to the second optical connection identification assembly 202 along the intermediate optical fiber 203, and vice versa, may be conveyed from the second optical connection assembly 202 to the first optical connection identification assembly 201 along the intermediate optical fiber 203. As shown, first optical connection identification assembly 201 includes a single power monitoring section 222A optically connected to a set of first and second connectors 110, 150, adapters 115, and opposing connectors 105, 106 and, likewise, second optical connection identification assembly 202 includes a single power monitoring system 222B optically connected to a set of first and second connectors 110, 150, adapters 115, and opposing connectors 105, 106. As shown, intermediate optical fiber 203 is attached on its ends to opposing connector 106 of first optical identification assembly 201 and opposing connector 105 of second optical identification assembly 202.

As shown in FIG. 2, power monitoring section 222A of optical connection identification assembly 201 includes first base 223A, first optical filter 224A attached to the first base, and first photodiode 226A attached to the first base in the form of a first module as well as second base 223B, second optical filter assembly 224B attached to the second base, and second photodiode 226B attached to the second base in the form of a second module. As used herein, the term "base" refers to a card or board, a cured bonding element for attaching optical or optoelectronic components together, or another discrete packaging element for attaching optical or optoelectronic components together. First optical fiber 112A extends between first connector 110 and first optical filter 224A such that optical signals may be conveyed along the fiber between the first connector and the first optical filter. Second optical fiber 112B extends between second connector 150 and second optical filter assembly 224B such that optical signals may be conveyed along the fiber between the second connector and the second optical filter assembly. In some arrangements, ends of each of first and second optical fiber 112A, 112B may include respective facets defining respective planes at angles transverse to longitudinal axes of the optical fibers, which may be but are not limited to being angles of approximately 8 degrees, such that light conveyed from the optical fibers is deflected at a slight angle to the ends of the respective optical fibers. Third optical fiber 112C extends between first optical filter 224A and second optical filter assembly 224B such that optical signals may be conveyed along the fiber between the first optical filter and the second optical filter assembly. Electrical leads extending from first and second photodiodes 226A, 226B may be in electrical communication with a central processing unit (CPU), such as but not limited to microcontroller 140.

In the example shown, first optical filter 224A is configured such that portions of optical signals from first optical fiber 112A pass through the first optical filter to first photodiode 226A and remaining portions of such optical signals are reflected to second optical filter assembly 224B. Second optical filter assembly 224B is configured such that portions of optical signals from second optical fiber 112B pass through the filter, which may be but is not limited to being a tap filter, of second optical filter assembly to second photodiode 226B and remaining portions of such optical signals are reflected to second connector 150 from which such signals are conveyed along intermediate optical fiber 203 to second optical identification assembly 202.

In one example as shown in FIG. 2, second optical filter assembly 224B may be manipulated, such as by but not limited to being by altering properties or changing the position, e.g., angle, of a filter of the second optical filter assembly, to convey modulated optical signals to second connector 150 in response to an electrical signal input, which may be preset or controlled remotely, for example via a combination of network 146 and computer terminal 145. In one example, second optical filter assembly 224B may include a heat source in which heat is transferred from the heat source to a filter, or other appropriate component of the second optical filter assembly, of the second optical filter assembly via modulation in response to the electrical signal input to the second optical filter assembly in order to alter the state of the filter. In this manner, second optical filter assembly 224B may convey optical signals at either one or both of a different frequency and a different intensity than when the heat is not applied or is applied at a different rate or quantity. In another example, second optical filter assembly 224B may include an electromechanical vibratory actuator attached to a filter of the second optical filter such that the actuator vibrates the filter, or other appropriate component of the second optical filter assembly, via modulation in response to the electrical signal input to the second optical filter in order to alter the state of the filter. In this manner, second optical filter assembly 224B may convey optical signals at either one or both of a different frequency and a different intensity than when the vibration is not applied to the second optical filter assembly or is applied at a different frequency or different amplitude.

In the example of FIG. 2, second optical connection identification assembly 202 is the same as first optical connection identification assembly 201 with the exception that assembly 202 includes first optical filter 224A in place of second optical filter assembly 224B and further includes optical signal detection circuit 230. Optical signals conveyed from first connector 110 of second optical connection identification assembly 202 as well as optical signals conveyed from second optical filter assembly 224B of first optical connection identification assembly 201 via second connector 150 of the first optical connection identification assembly may be received simultaneously or separately by first photodiode 226A of the second optical connection identification assembly. Detection circuit 230 is electrically connected, such as by electrical wire or other electrical connections known to those skilled in the art, to first photodiode 226A of second optical connection identification assembly 202. In some arrangements, detection circuit 230 may be configured to interpret the different one or both of the frequencies and amplitudes of optical signals conveyed from first connector 110 of second optical connection identification assembly 202 and optical signals conveyed from second optical filter assembly 224B of first optical connection identification assembly 201. Detection circuit 230 may then communicate with network 146 or another network to alert a remote terminal that optical connection identification assemblies 201, 202 are optically connected as well as simultaneously or separately alert the remote terminal that optical signals are being received, and thus power is being received, within the second optical connection assembly 202 from optical fibers 112A, 112B connected to one of connectors 110, 150 of second optical connection assembly 202 which is separate from optical signals conveyed along intermediate optical fiber 203 that are also received by the second optical connection assembly. In some arrangements, detection circuit 230 may form part or all of a microcontroller, such as microcontroller 140, while in some other arrangements, detection circuit 230 may be electrically connected to a separate microcontroller that communicates with network 146 or another network to provide information on the cable and assembly connectivity of optical connection identification system 200.

In another example as further shown in FIG. 2, first optical connection identification assembly 201 may further include light source 227 which may be used in conjunction with second optical filter assembly 224B or in conjunction with a further first optical filter 224A, without filter altering modulation capability, that may be used in place of the second optical filter assembly. Light source 227 may be located within or adjacent to power monitoring section 222A such that the light source conveys optical signals to first optical fiber 112A which are then conveyed to second optical connection identification assembly 202 via intermediate optical fiber 203 along with the optical signals separately conveyed from the optical filter, whether second optical filter assembly 224B or the further first optical filter 224A, that conveys optical signals to second connector 150 of first optical connection identification assembly 201. The optical signals conveyed from light source 227 may have a different wavelength than the optical signals conveyed from the optical filter that conveys optical signals to second connector 150. In this manner, optical signals conveyed from light source 227 may be conveyed along with other optical signals conveyed along intermediate optical fiber 203 as described previously herein via wavelength-division multiplexing (WDM). In this example, a microcontroller, such as microcontroller 140 may manage input signals that control the optical signals emitted from light source 227.

Figure 3:
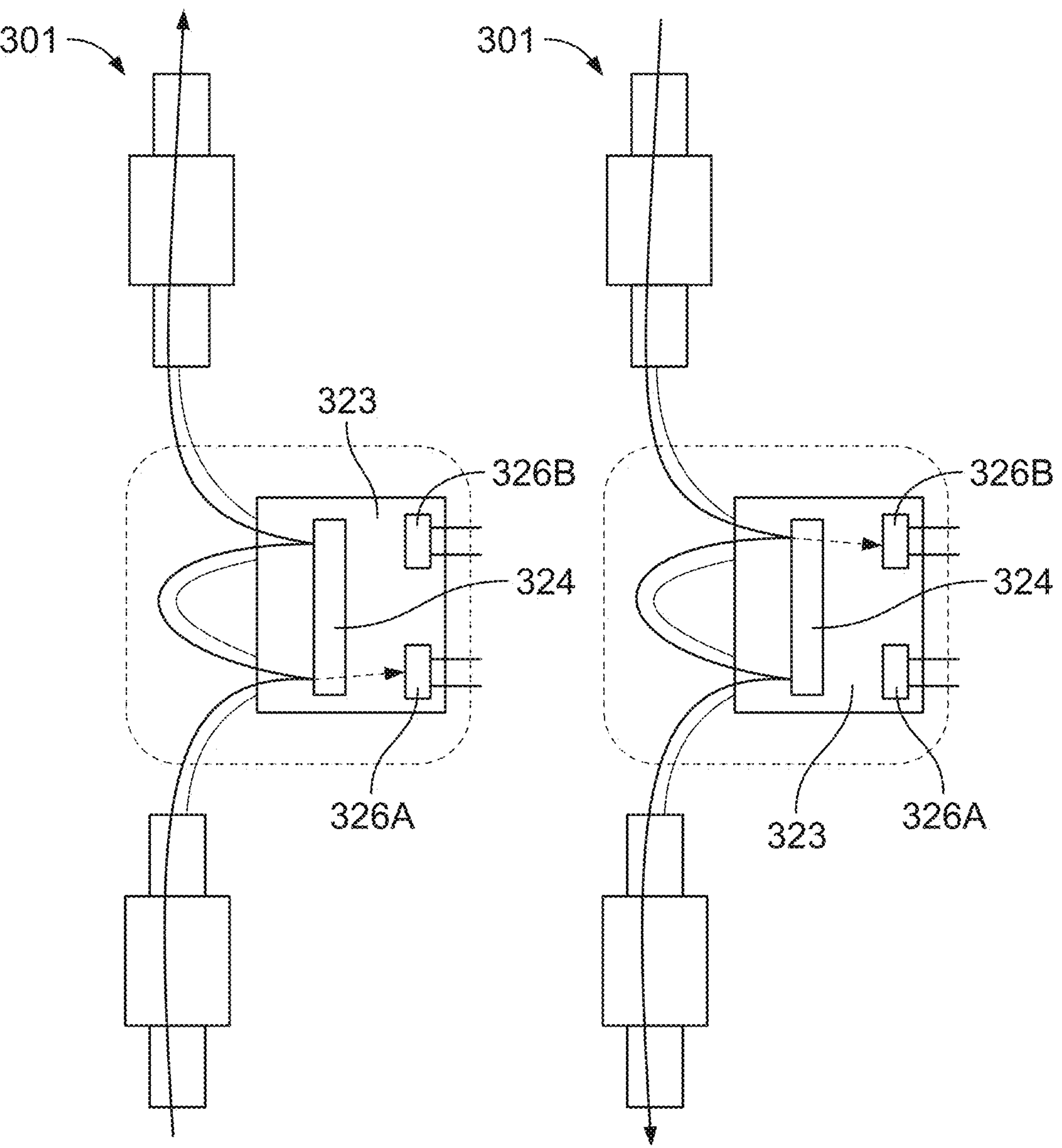
FIGS. 3-5 are schematics of optical connection identification assemblies in accordance with various embodiments.

Referring now to FIG. 3, optical connection identification assembly 301 is the same or substantially the same as second optical connection identification assembly 202 with the exception that optical connection identification assembly 301 includes a single module in place of the first and second modules of optical connection identification assembly 202. As such, optical connection identification assembly 301 includes first base 323, in place of first and second bases 223A, 223B, first optical filter assembly 324 attached to the first base in place of the plurality of optical filters 224A, and first and second photodiodes 326A, 326B attached to the first base in place of first and second photodiodes 226A, 226B. First optical filter assembly 324 may be configured such that optical signals may be conveyed from the first optical filter assembly to both first and second photodiodes 326A, 326B, such as by deflecting a light beam at different angles or paths. In this manner, optical connection identification assembly 301 functions in the same manner as second optical connection identification assembly 202. Like second optical connection identification assembly 202, in some arrangements, photodiodes 326A, 326B of optical connection identification assembly 301 may be electrically connected to a detection circuit, for example detection circuit 230, and in some arrangements, may be connected to another optical connection identification assembly. In some arrangements, lenses of long optical filters like first optical filter assembly 324 may be modulated like second optical filter assembly 224B of first optical connection identification assembly 201.

Figure 4:
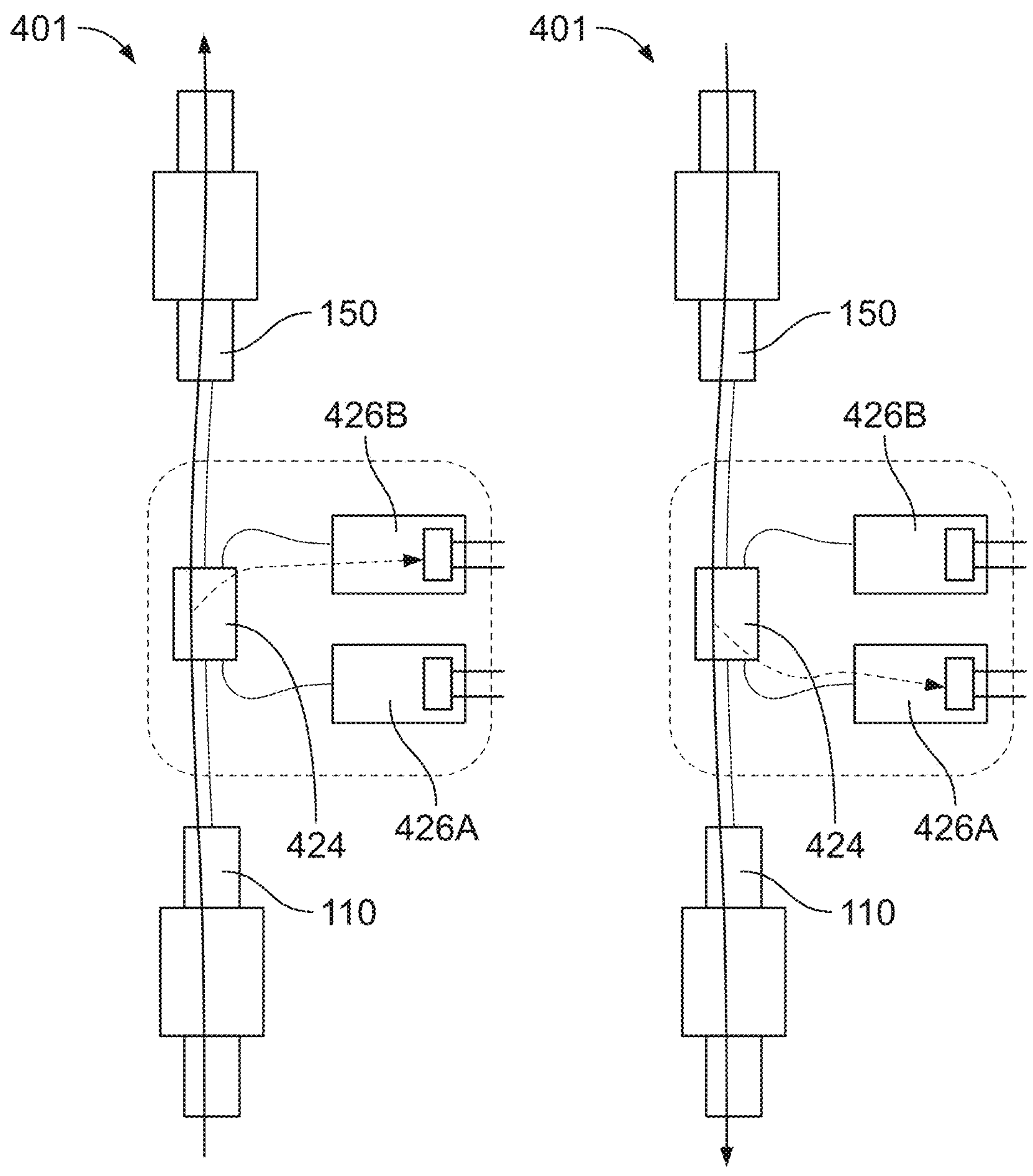

As shown in FIG. 4, optical connection identification assembly 401 is the same or substantially the same as second optical connection identification assembly 202 with the notable exceptions that first and second modules of optical connection identification assembly 401 exclude optical filters and include optical filter module 424 in place of the plurality of optical filters 224A. Optical filter module 424 is aligned with first and second connectors 110, 150 such that the optical filter module allows portions of optical signals to pass through the module and between the first and the second connectors. In some arrangements, module 424 further includes a pair of beam splitters (see FIGS. 8A-8C) such that remaining portions of optical signals received in the module from first connector 110 are reflected to second photodiode 426B of optical connection identification assembly 401 and remaining portions of optical signals received in the module from second connector 150 are reflected to first photodiode 426A of the optical connection identification assembly. In some other arrangements, module 424 may be a fused fiber module in which small portions of the optical signals conveyed from connector 110, 150 may be directed along optical fibers through module 424 such that the signals conveyed from connector 110 are directed to second photodiode 426B and the signals conveyed from connector 150 are directed to first photodiode 426A. In this manner, reflection of light to the photodiode to which the light is not directed may be substantially avoided.

Figure 5:
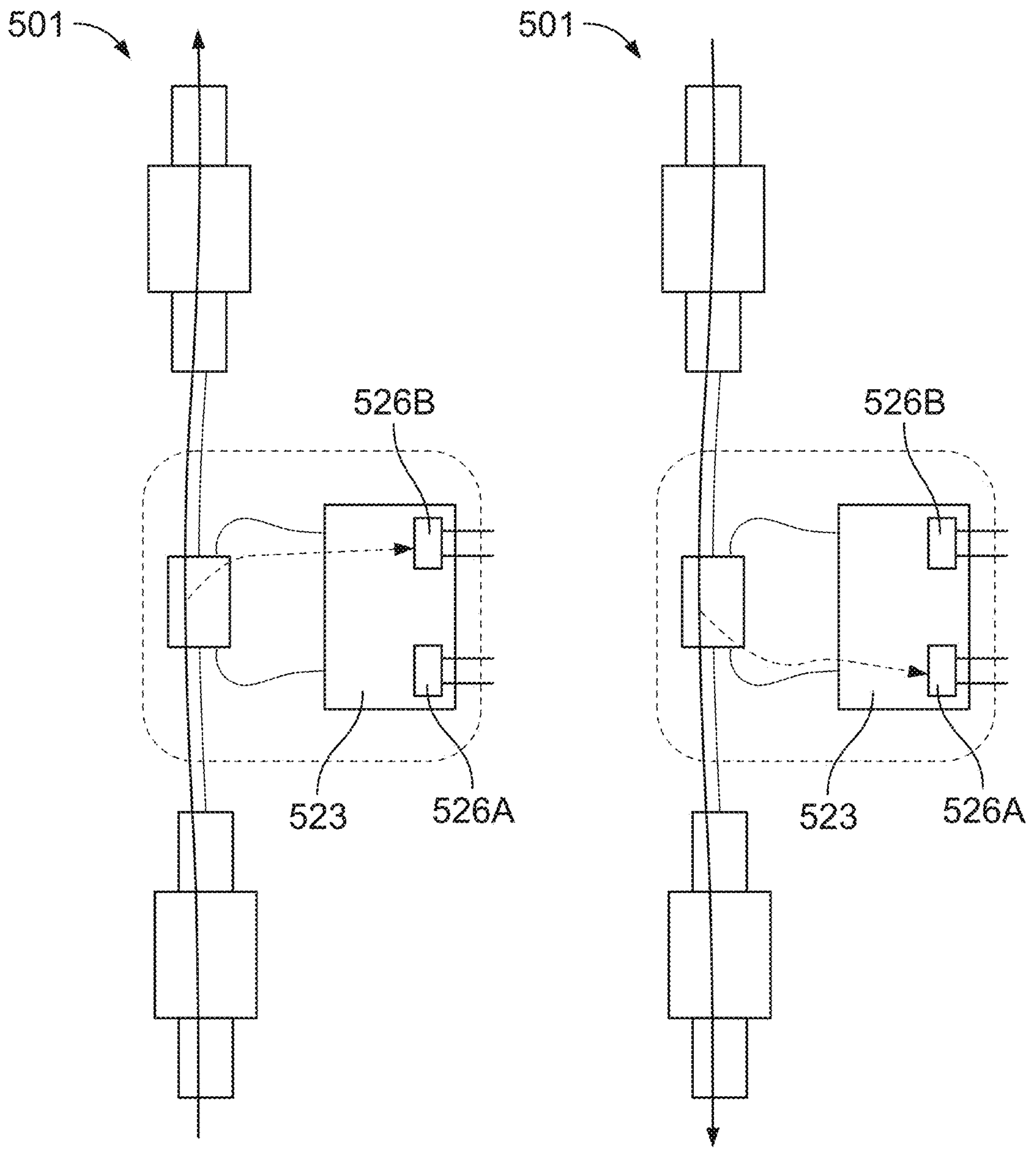

As shown in FIG. 5, optical connection identification assembly 501 is the same or substantially the same as optical connection identification assembly 401 with the exception that first photodiode 426A and second photodiode 426B of optical connection identification assembly 401 are mounted onto separate bases whereas photodiodes 526A, 526B of optical connection identification assembly 501, which are the same or substantially the same as photodiodes 426A, 426B, are mounted on the same base 523.

Figure 6A:
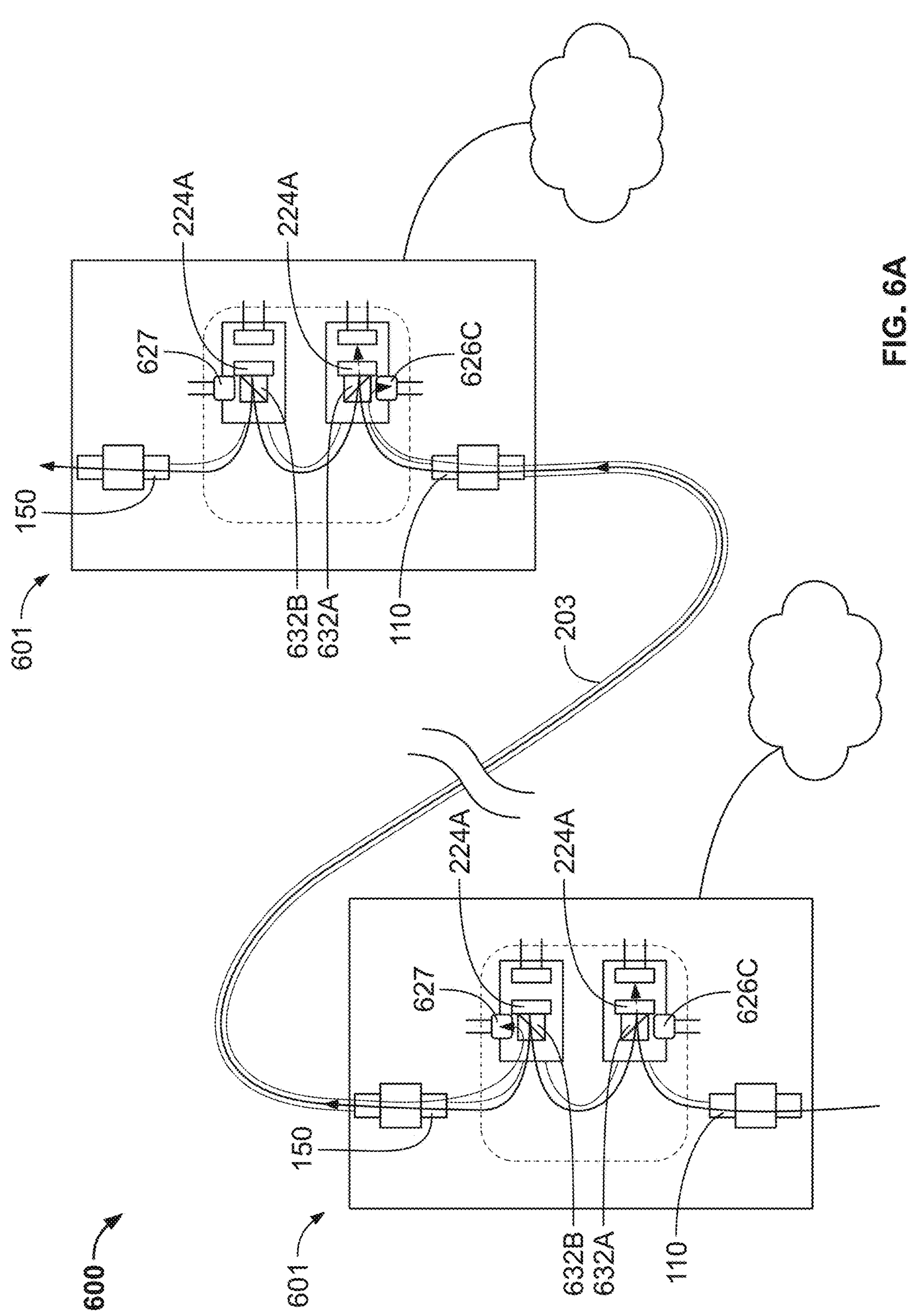
FIG. 6A is a schematic of an optical connection identification system in accordance with an embodiment.
Figure 6B:
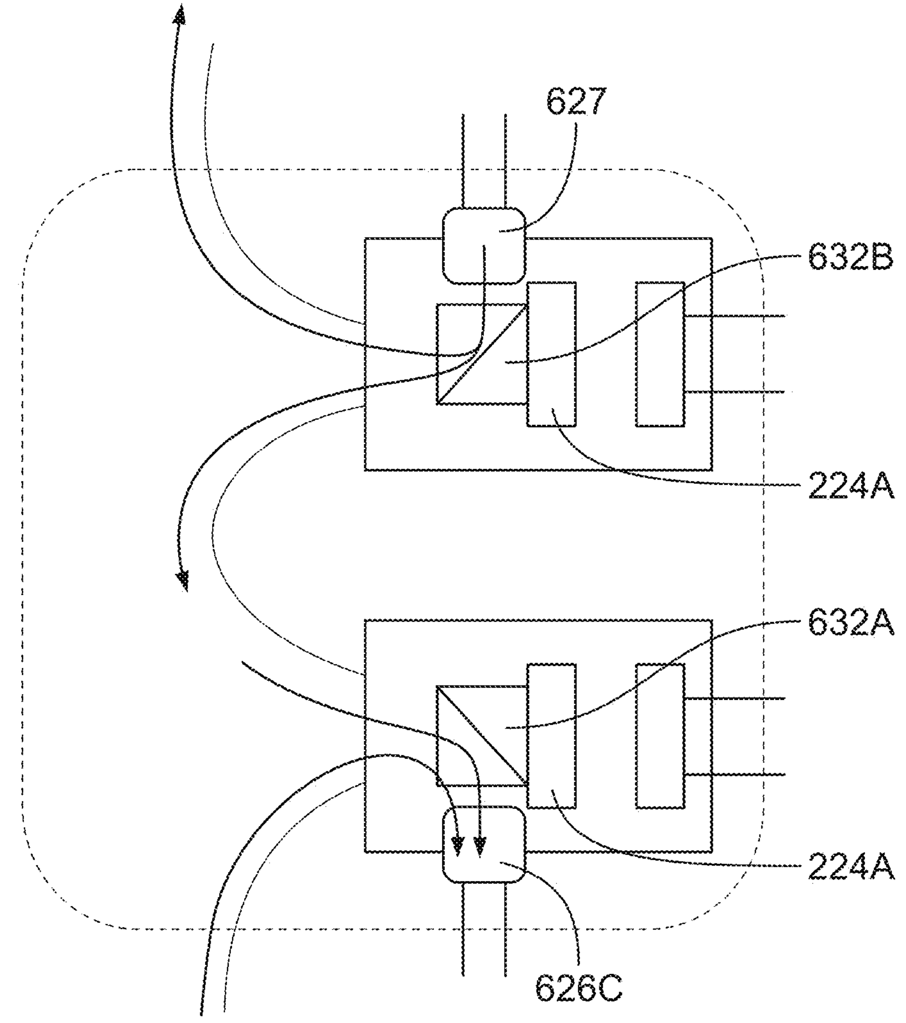
FIG. 6B is a schematic of a power monitoring section of the optical connection identification system of FIG. 6A.

Referring now to FIGS. 6A and 6B, optical connection identification system 600 includes a plurality, in the example shown a pair, of optical connection identification assemblies 601 optically connected by intermediate optical fiber 203. The optical connection identification assemblies 601 are the same as or substantially the same as second optical connection identification assembly 202 of optical connection identification system 200 with the notable exceptions that the first modules of each of assemblies 601 further include beam splitter 632A between first connector 110 and optical filter 224A of the first module and third photodiode 626C adjacent to beam splitter 632A and the second modules of each of assemblies 601 further include beam splitter 632B between second connector 150 and optical filter 224A of the second module and light source 627, which may be an LED controlled remotely such as through a network, adjacent to beam splitter 632B. In this manner, optical signals conveyed from light source 627 may be split by beam splitter 632B such that portions of the optical signals conveyed from the light source are conveyed from beam splitter 632B to third photodiode 626C via beam splitter 632A of the same optical connection identification assembly and other portions of the optical signals conveyed from the light source are conveyed from beam splitter 632B to third photodiode 626C of another optical connection identification assembly via second connector 150. As such, third photodiode 626C of each optical connection identification assembly 601 may receive optical signals from light source 627 of its own optical connection identification assembly as well as optical signals from light source 627 of a directly adjacent optical connection identification assembly. Upon receipt of such signals, third photodiode 626C may transmit an electrical signal to indicate that the adjacent optical connection identification assemblies 601 are in optical communication. As with other arrangements described previously herein, first and second photodiodes 626A, 626B may receive portions of optical signals from first and second connectors 110, 150, respectively, which the photodiodes may convert to electrical signals to provide a power monitoring system.

Figure 6C:
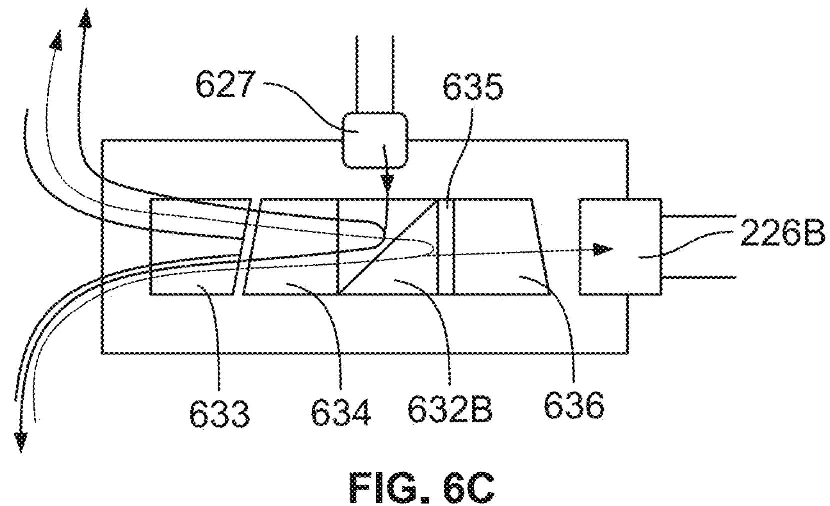
FIGS. 6C and 6D are schematics of modules of the power monitoring section of FIG. 6B.
Figure 6D:
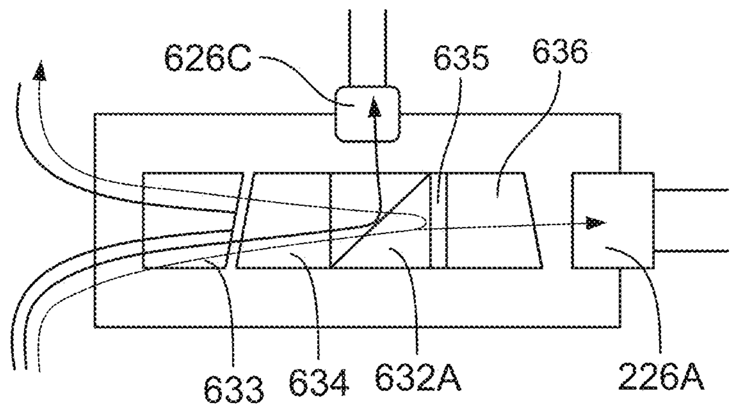

As shown in FIGS. 6C and 6D, the combinations of optical filter 224A and each of beam splitters 632A, 632B may each include fiber support 633, collimation lens 634 directly adjacent to the fiber support, beam splitter 632A, 632B directly adjacent to the collimation lens, tap filter 635 directly adjacent to the beam splitter, and focusing lens 636 directly adjacent to the tap filter. In some arrangements, tap filter 635 may allow 0.5 to 10% of light received by the tap filter to pass through the tap filter to focusing lens 636 and then to respective first and second photodiodes 226A, 226B.

Figure 7:
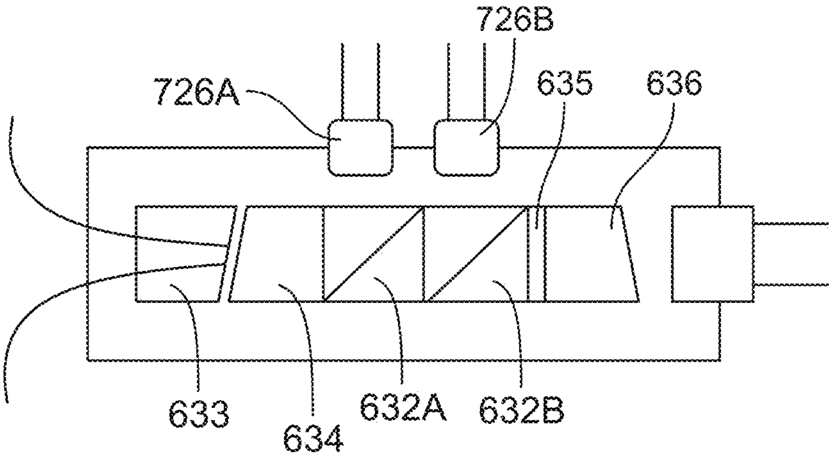
FIG. 7 is a schematic of a module for a power monitoring section in accordance with another embodiment.

In an alternative arrangement to one or both of optical connection identification assemblies 601, as shown in FIG. 7, the first and second modules of assembly 601 may be replaced with a single integrated module that includes fiber support 633, collimation lens 634 directly adjacent to the fiber support, first beam splitter 632A directly adjacent to the collimation lens, second beam splitter 632B directly adjacent to beam splitter 632A, tap filter 635 directly adjacent to beam splitter 632B, and focusing lens 636 directly adjacent to the tap filter. In this arrangement, first photodiode 726A is directly adjacent to beam splitter 632A and second photodiode 726B is directly adjacent to beam splitter 632B and to first photodiode 726A.

Figure 8A:
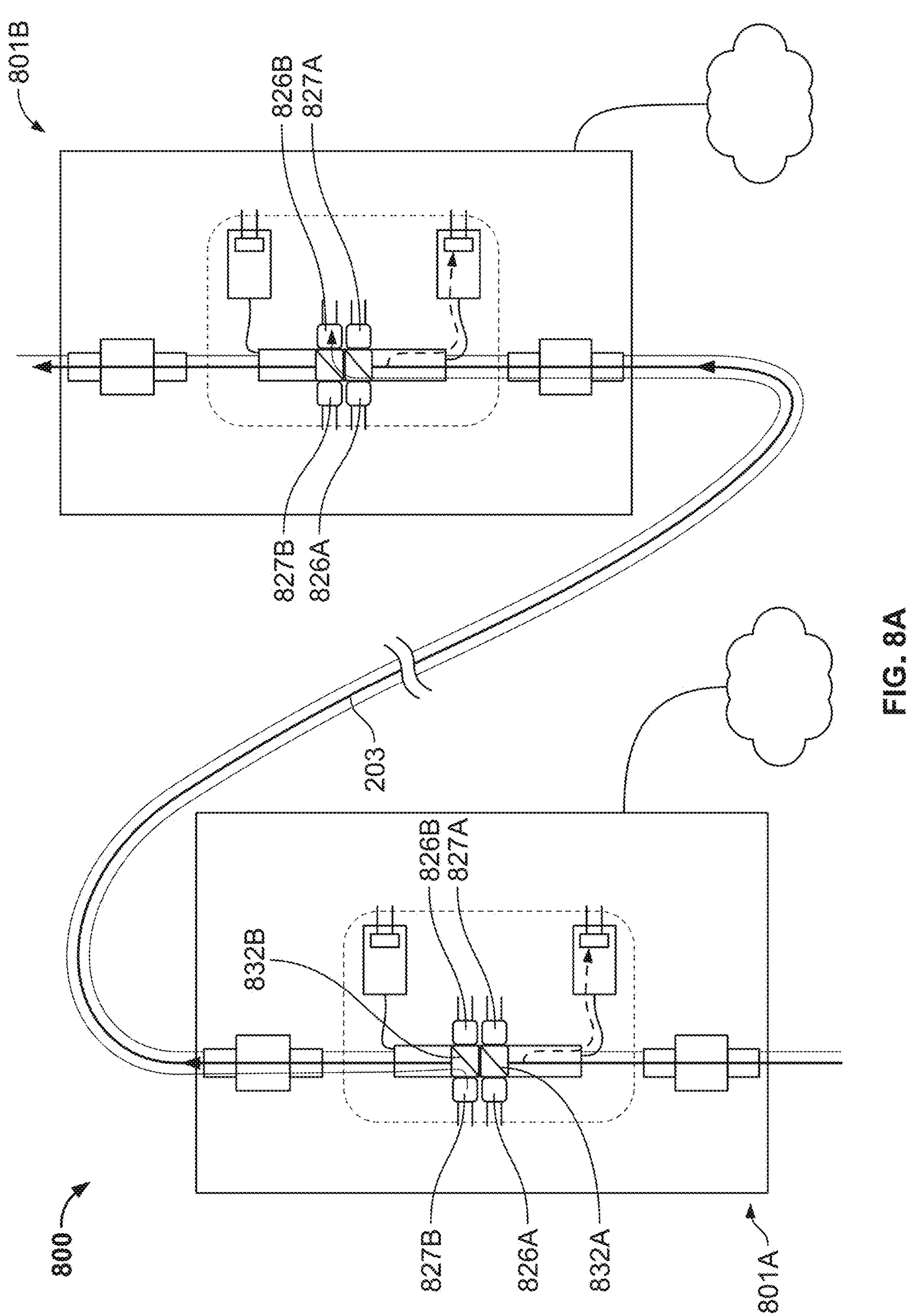
FIG. 8A is a schematic of an optical connection identification system in accordance with an embodiment.

Referring now to FIG. 8A, optical connection identification system 800 includes a plurality, in the example shown a pair, of optical connection identification assemblies 801A, 801B optically connected by intermediate optical fiber 203. Each optical connection identification assembly 801A, 801B is the same or substantially the same as optical connection identification assembly 401 with the notable exceptions that each optical connection identification assembly further includes third photodiode 826A and first light source 827A directly adjacent to and on opposite sides of first beam splitter 832A as well as fourth photodiode 826B and second light source 827B directly adjacent to and on opposite sides of second beam splitter 832B. In this manner, as shown by the arrow in the schematic of FIG. 8A, optical signals emitted from second light source 827B of optical connection identification assembly 801A are received by fourth photodiode 826B of optical connection identification assembly 801B via intermediate optical fiber 203. Upon receiving such optical signals, fourth photodiode 826B of optical connection identification assembly 801B sends an electrical signal, such as to a network connected to a terminal, to indicate optical connectivity between optical connection identification assemblies 801A, 801B. Similarly, optical signals emitted from first light source 827A of optical connection identification assembly 801B may be received by third photodiode 826A of optical connection identification assembly 801A, optical signals emitted from first light source 827A of optical connection identification assembly 801A may be received by third photodiode 826A of another optical connection identification assembly (not shown), and optical signals emitted from second light source 827B of optical connection identification assembly 801B may be received by fourth photodiode 826B of yet another optical connection identification assembly (not shown) to indicate connectivity between respective directly adjacent optical connection identification assemblies of optical connection identification system 800.

Figure 8B:
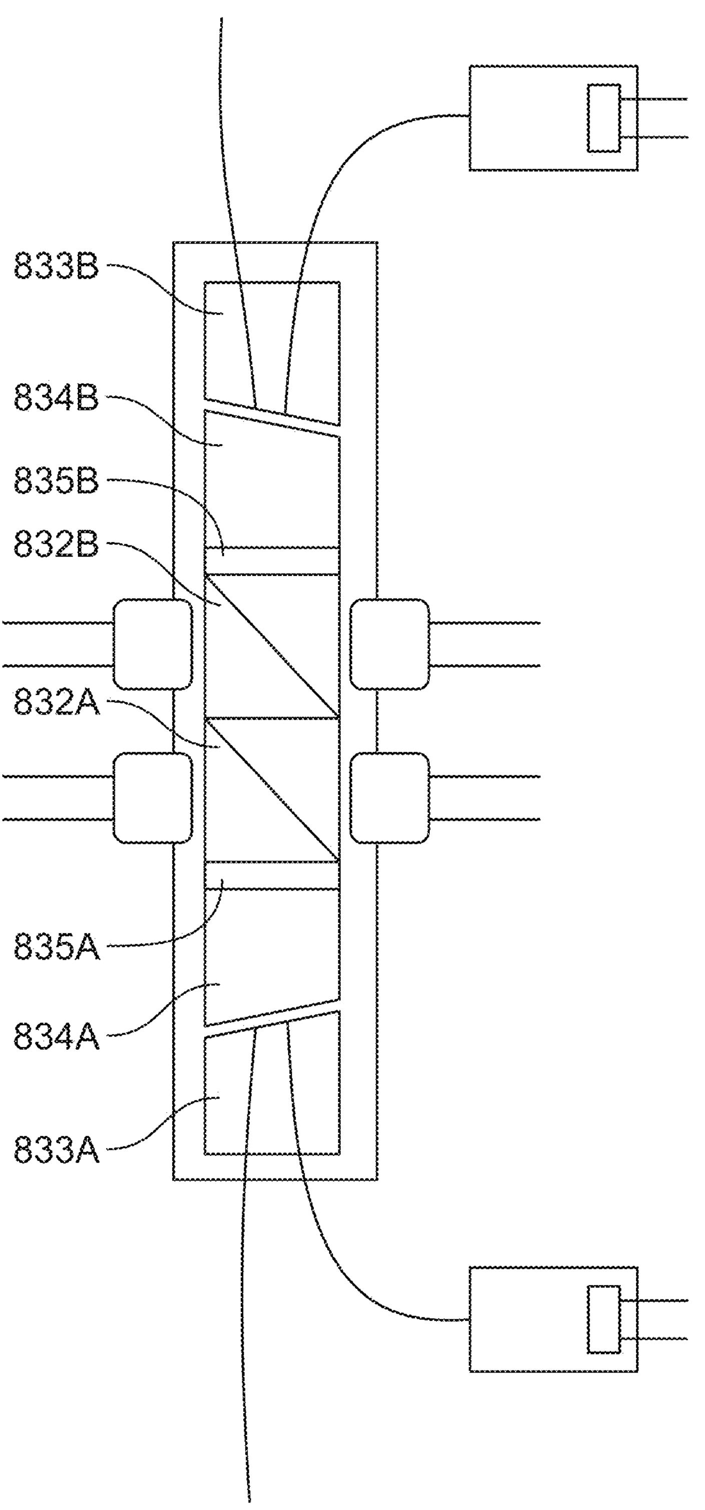
FIG. 8B is a schematic of a power monitoring section of the optical connection identification system of FIG. 8A.

As shown in FIG. 8B, the optical filter module of each of optical connection identification assemblies 801A, 801B may each include first fiber support 833A, first collimation lens 834A directly adjacent to the first fiber support, first tap filter 835A directly adjacent to the first collimation lens, first beam splitter 832A directly adjacent to the first tap filter, second beam splitter 832B directly adjacent to the first beam splitter, second tap filter 835B directly adjacent to the second beam splitter 832B, second collimation lens 834B directly adjacent to the second tap filter, and second fiber support 833B directly adjacent to the second collimation lens.

Figure 9:
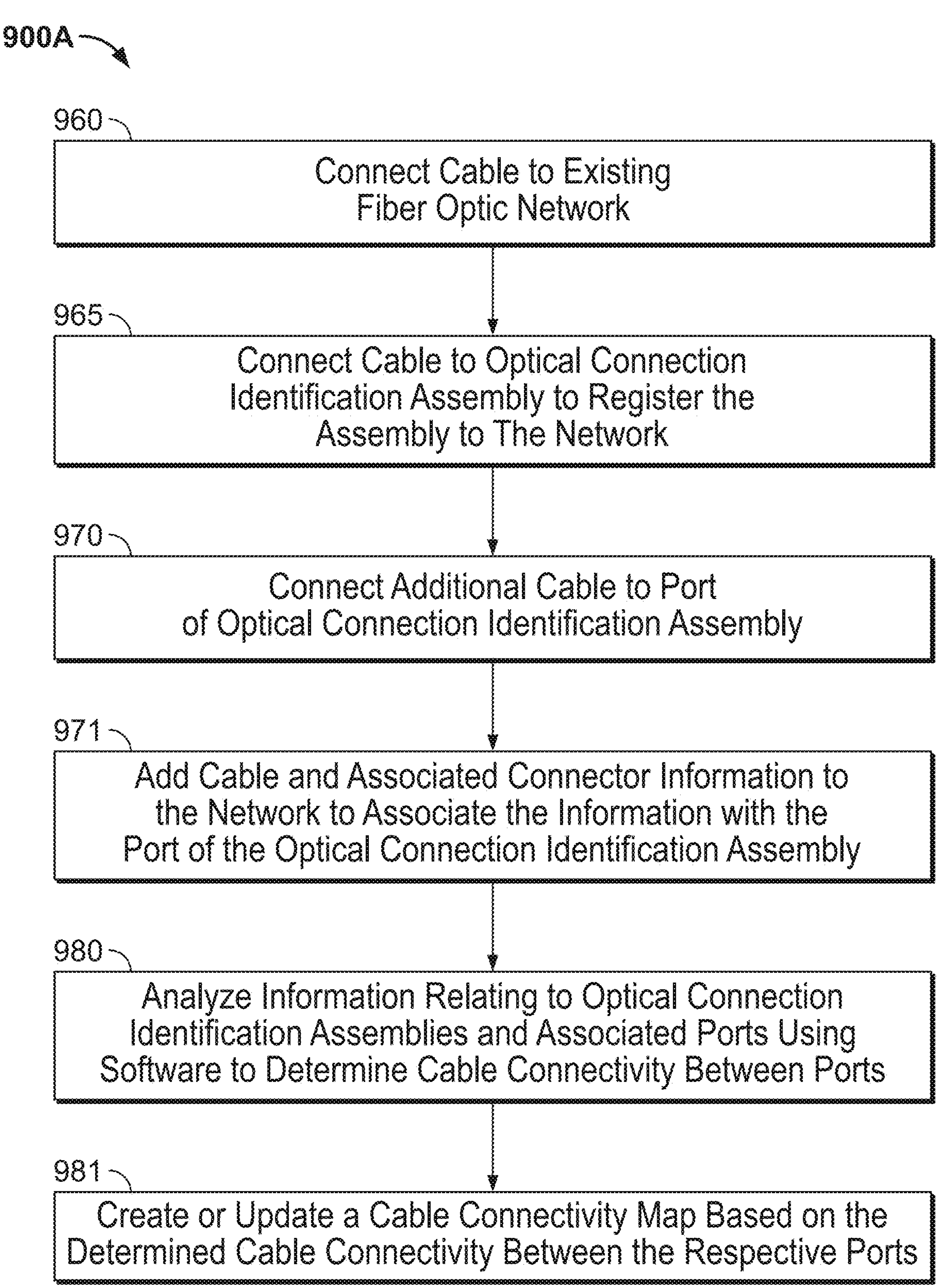
FIG. 9 is a flow diagram for an optical connection identification system connectivity and connectivity monitoring process in accordance with an embodiment.
Figure 10:
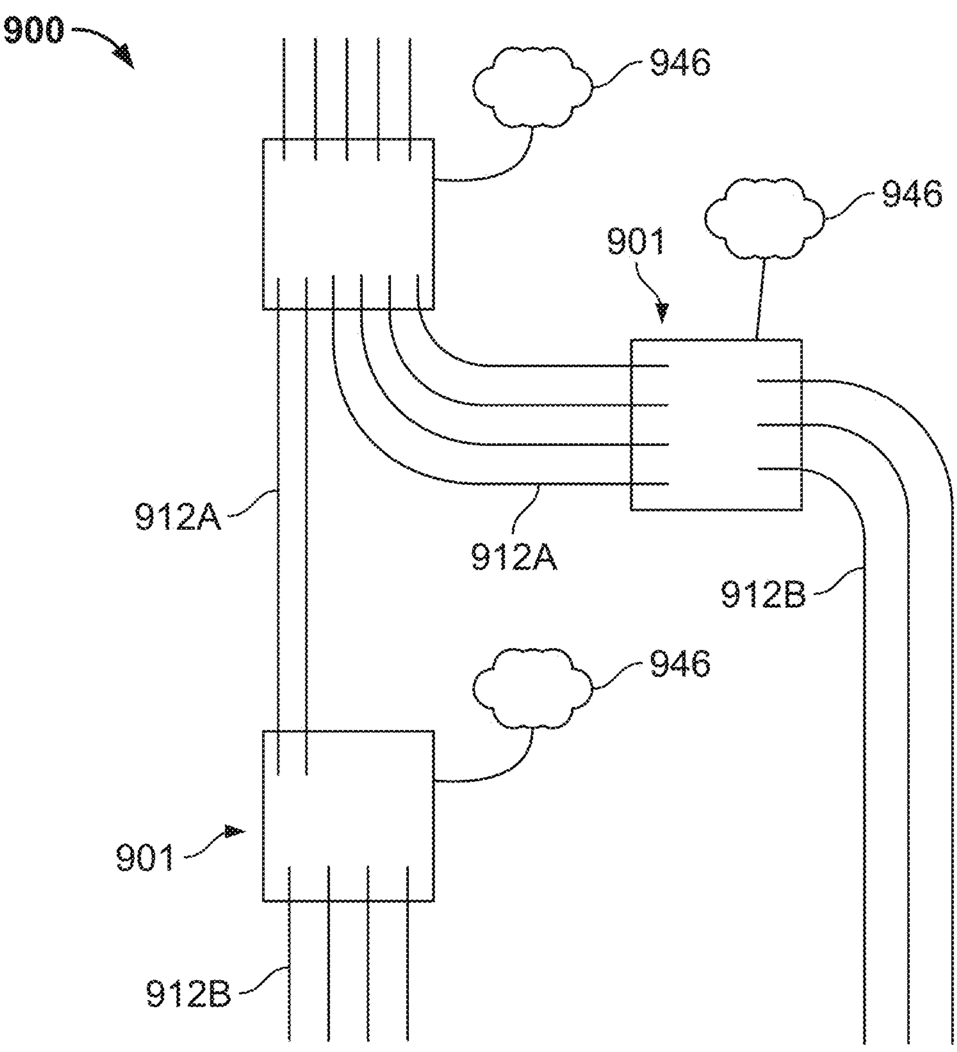
FIG. 10 is an optical connection identification system for use in the process shown in FIG. 9.
Figure 10:
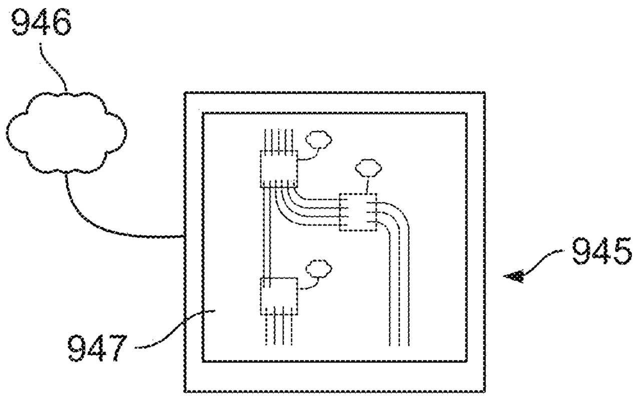

Referring now to FIGS. 9 and 10, optical connection identification assembly 901, which may be but is not limited to being any one of optical connection identification assemblies 201, 202, 301, 401, 501, 601, 801A, 801B, may be used in an intelligent optical connection identification system 900, which may be in the form of a fiber optic network, in process 900A. At step 960 of process 900A, a connector on one end of fiber optic cable 912A is plugged into existing optical connection identification system 900. At step 965, a connector on an opposite end of fiber optic cable 912A is plugged into optical connection identification assembly 901, thereby registering the optical connection identification assembly 901 to the optical connection identification system 900. At step 970, a connector on one end of fiber optic cable 912B is plugged into a port of optical connection identification assembly 901. At step 971, a technician or other operator, digitally inputs into a database associated with optical connection identification system 900 identifying information associated with fiber optic cable 912B and its associated connector plugged into optical connection identification assembly 901. As a result, the database associated with optical connection identification system 900 is updated to associate the port of optical connection identification system 900 into which the connector on the end of fiber optic cable 912B is inserted with the cable and its associated connector.

At step 980, information relating to any one or all of the optical connection identification assemblies and their associated ports within optical connection identification system 900 is received via digital cloud network 946 and software then analyzes the information to determine cable, which may be but is not limited to being fiber optic cable and electrical wire, connectivity at the ports of any individual optical connection identification assembly as well as connectivity between ports of different optical connection identification assemblies. Connectivity at ports may be determined using connector engagement sensing mechanisms disclosed in U.S. Patent Application Publication Nos. 2017/0003459 A1 and 2018/06410 A1 in which data from such connectivity or lack thereof may be sent from a microcontroller, such as microcontroller (μC) 140, to terminal 945 via network 946. Connectivity between ports of different optical connection identification assemblies may be determined using light source and photodiode pairs in optically connected optical connection identification assemblies in the manner described previously herein, such as with respect to optical connection identification system 200, 600, 800. In some arrangements, artificial intelligence may be used in conjunction with the software to make assumptions as to the connectivity of the cables within optical connection identification system 900 in order to compensate for possible operator errors in the entry of information associated with the cables by making guesses as to cable connectivity based on available information. At step 981, the software creates or updates a cable connectivity map based on the determined cable connectivity at ports of individual optical connection identification assemblies and between the optical connection identification assemblies. As shown in FIG. 10, a virtual version 947 of cable connectivity map may be viewed at terminal 945, which may be located at a central office. Based on this information, a determination may be made as to where additional cable connections may be made or where repairs may be needed within optical connection identification system 900.

Figure 11:
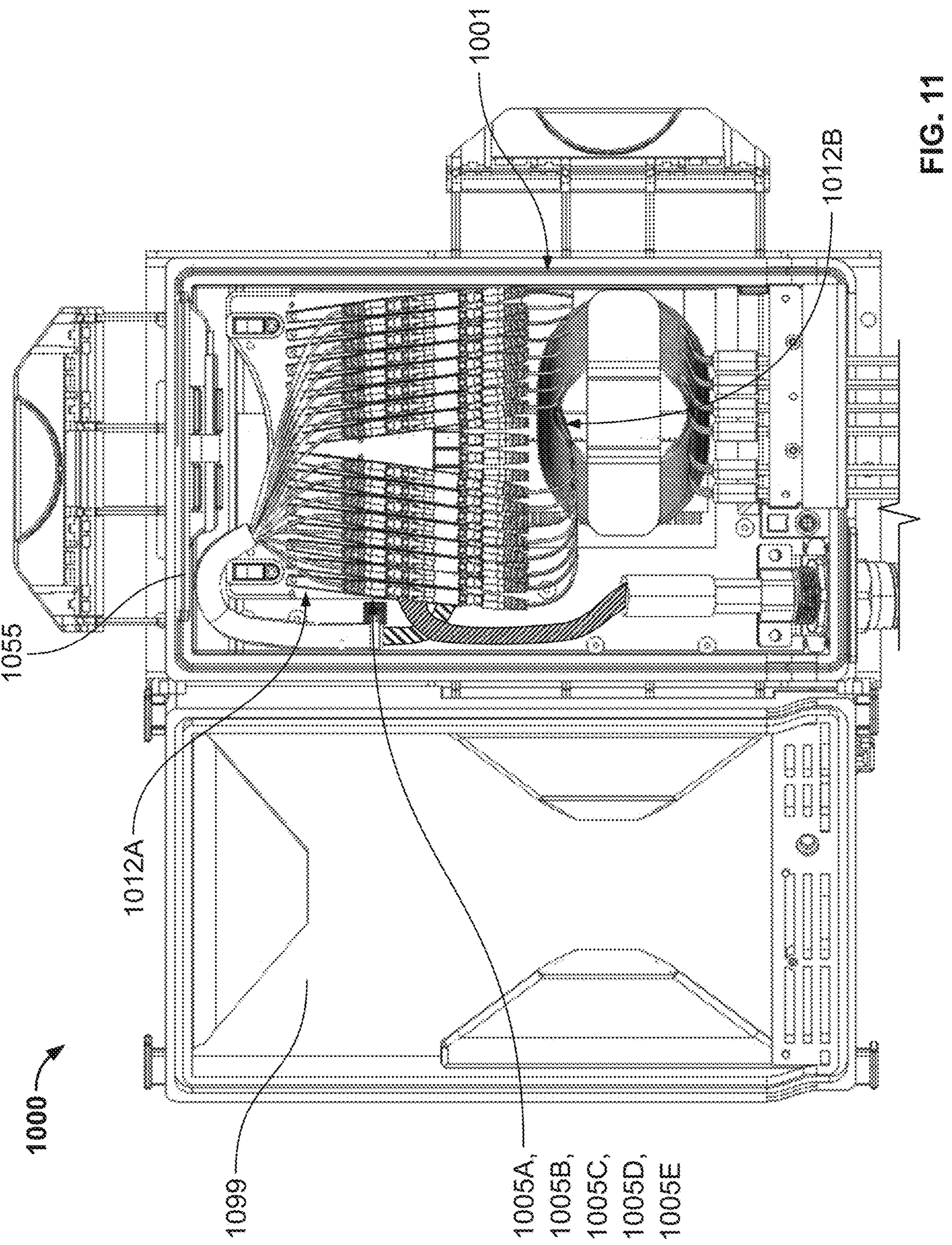
FIGS. 11 and 12 are plan views of an intelligent optical fiber termination system in accordance with another embodiment.
Figure 12:
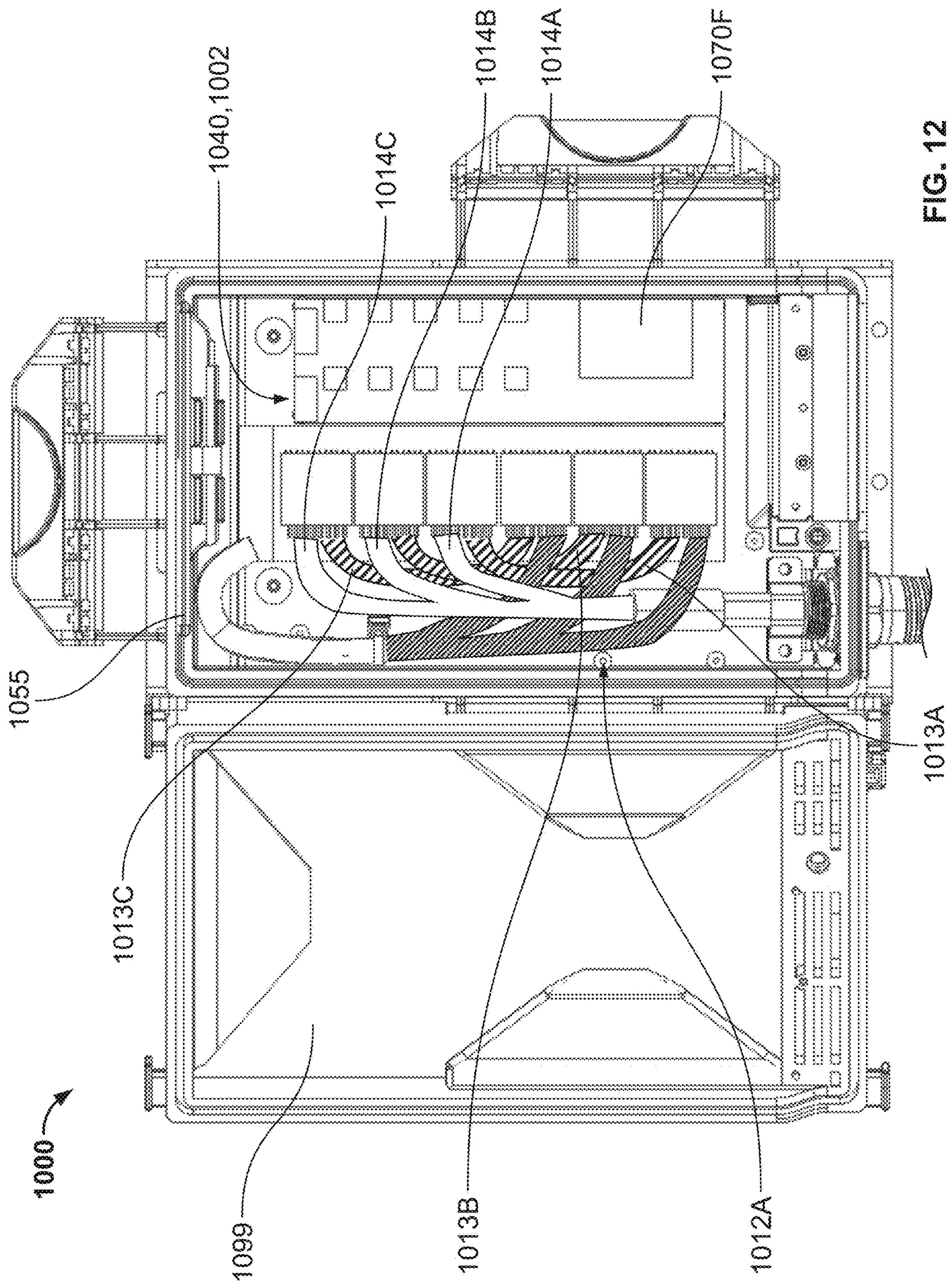

Referring now to FIGS. 11 and 12, intelligent optical fiber termination system 1000 includes enclosure 1099, optical termination assembly 1001 including various operational sensing mechanisms, other operational sensing mechanism 1060 (see FIGS. 17 and 19), at least one sensory indication unit 1055 (see FIGS. 16A and 16B), at least one operational change unit 1070 (see FIGS. 17 and 19) and main controller 1040. Optical termination assembly 1001 is attached to and enclosed by enclosure 1099 and includes a plurality of input optical fiber cables 1012A, a plurality of output optical fiber cables 1012B, a plurality of adapters 1015 having opposing receptacles for receiving connectors 1005 of corresponding ones of the input and output optical fiber cables in which corresponding sets of the input optical fiber cables, the output optical fiber cables, and the adapters are aligned in a multi-tier fashion, as further described in U.S. Provisional Patent Application No. 62/855,470, filed May 31, 2019, the disclosure of which is hereby incorporated herein by reference in its entirety.

Optical termination assembly 1001 may include a connector engagement sensing mechanism such as one or more of those described in U.S. Patent Application Publication Nos. 2017/0003459 A1 ("the '459 Publication") and 2018/0136410 A1 (the '410 Publication) and further discussed above. As shown by the example connector assemblies of FIGS. 13A and 13B, force or displacement sensor 1030A may be attached to housing 1035A of one respective connector 1005A of either one or both of input and the output optical fiber cables 1012A, 1012B and may be configured for contact with adapter 1015A or such force or displacement sensor may be attached to adapter 1015B and configured for contact with a portion of housing 1035B, e.g., a projection of the housing, of one respective connector 1005B, the combination of the sensor and the housing or the adapter being in the form of insertion sensing mechanism 1081 (see FIGS. 17 and 19). As shown by the example connector assembly of FIG. 14, force or displacement sensor 1030B further may be attached to adapter 1015C such that the sensor interacts with a rear of housing 1035C of one respective connector 1005C of either one or both of the input and output optical fiber cables. Other configurations of sensors on housings of respective connectors or on adapters as further described in the '459 and the '410 Publications are also encompassed by the technology described herein. When a force is applied to sensor 1030A, 1030B when the sensor acts as a force sensor or the sensor is displaced when the sensor acts as a displacement sensor, the sensor may change states such that the sensor may convey electrical signals or stop conveying electrical signals being conveyed via main controller 1040 shown in FIG. 12, in which such electrical signals correspond to an optical fiber insertion status of optical fiber cables 1012A, 1012B having a corresponding sensor. In such manner, the insertion of respective connectors 1005A, 1005B, 1005C of either one or both of input and output optical fiber cables 1012A, 1012B (or variation thereof) into adapter 1015A, 1015B, 1015C may be detected.

Figures 13A, 13B, 14, 15:
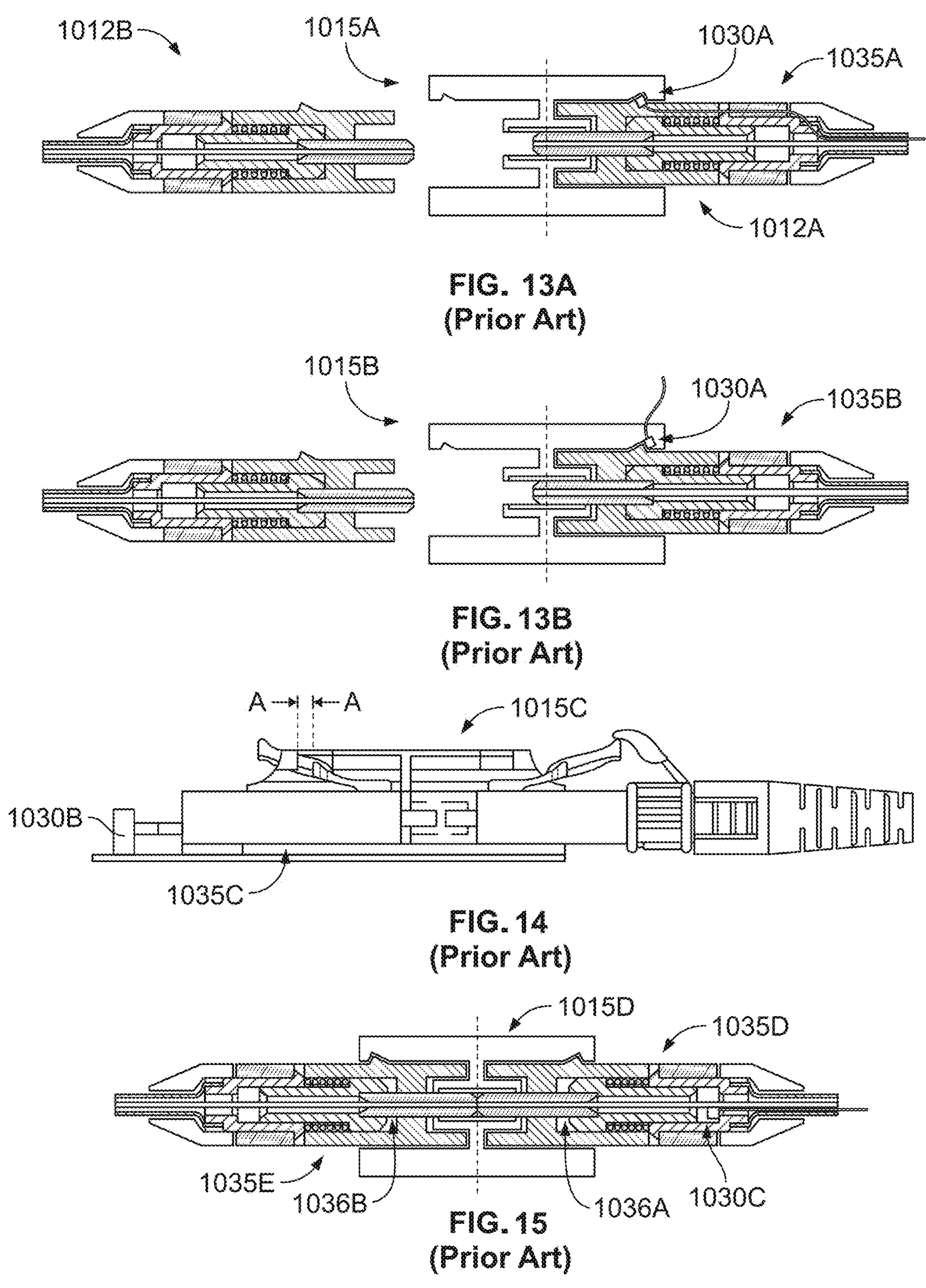
Figure 17:
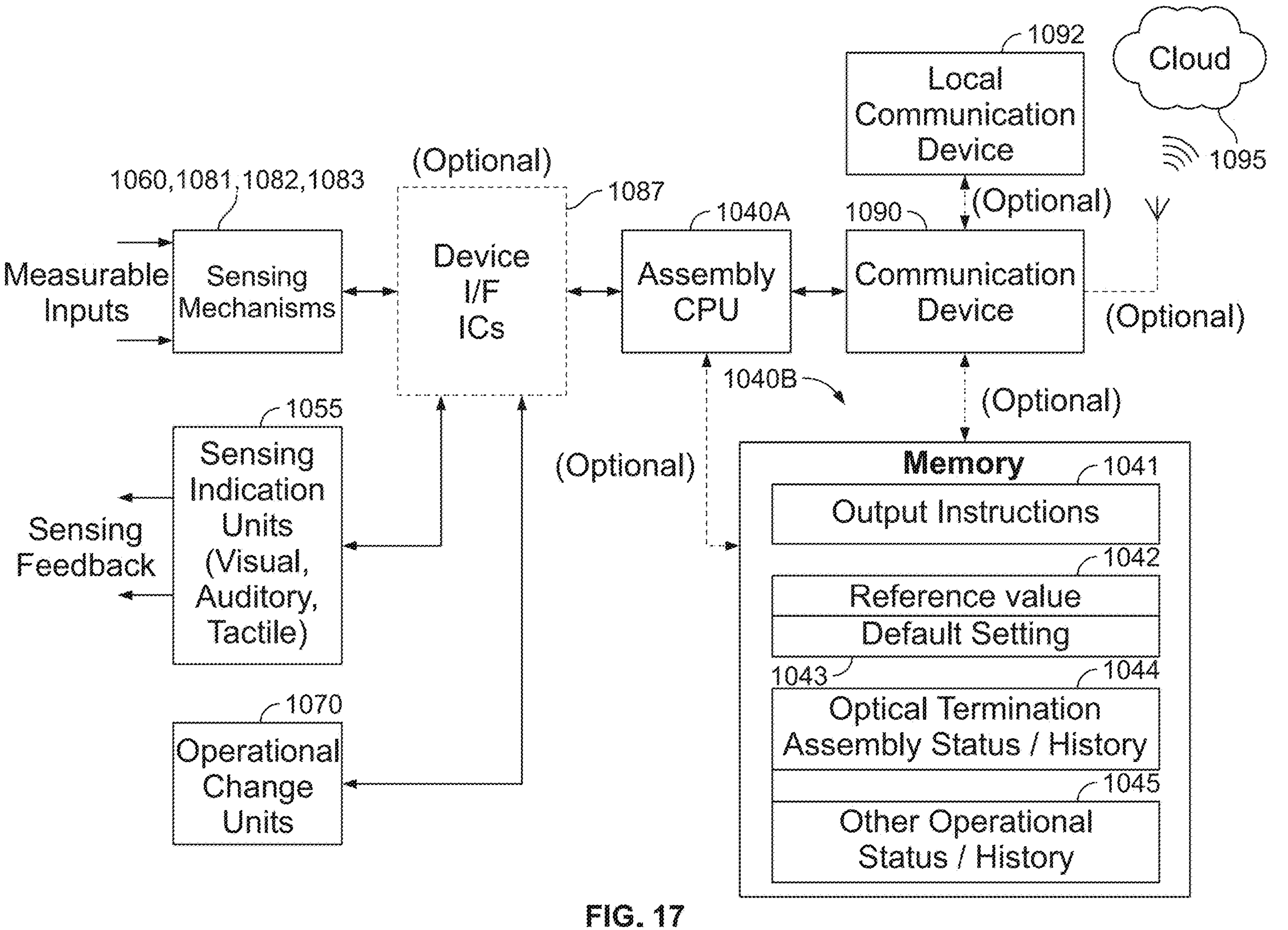
FIGS. 17 and 18 are schematics of an intelligent optical fiber termination system and a cloud network in accordance with another embodiment.
Figure 19:
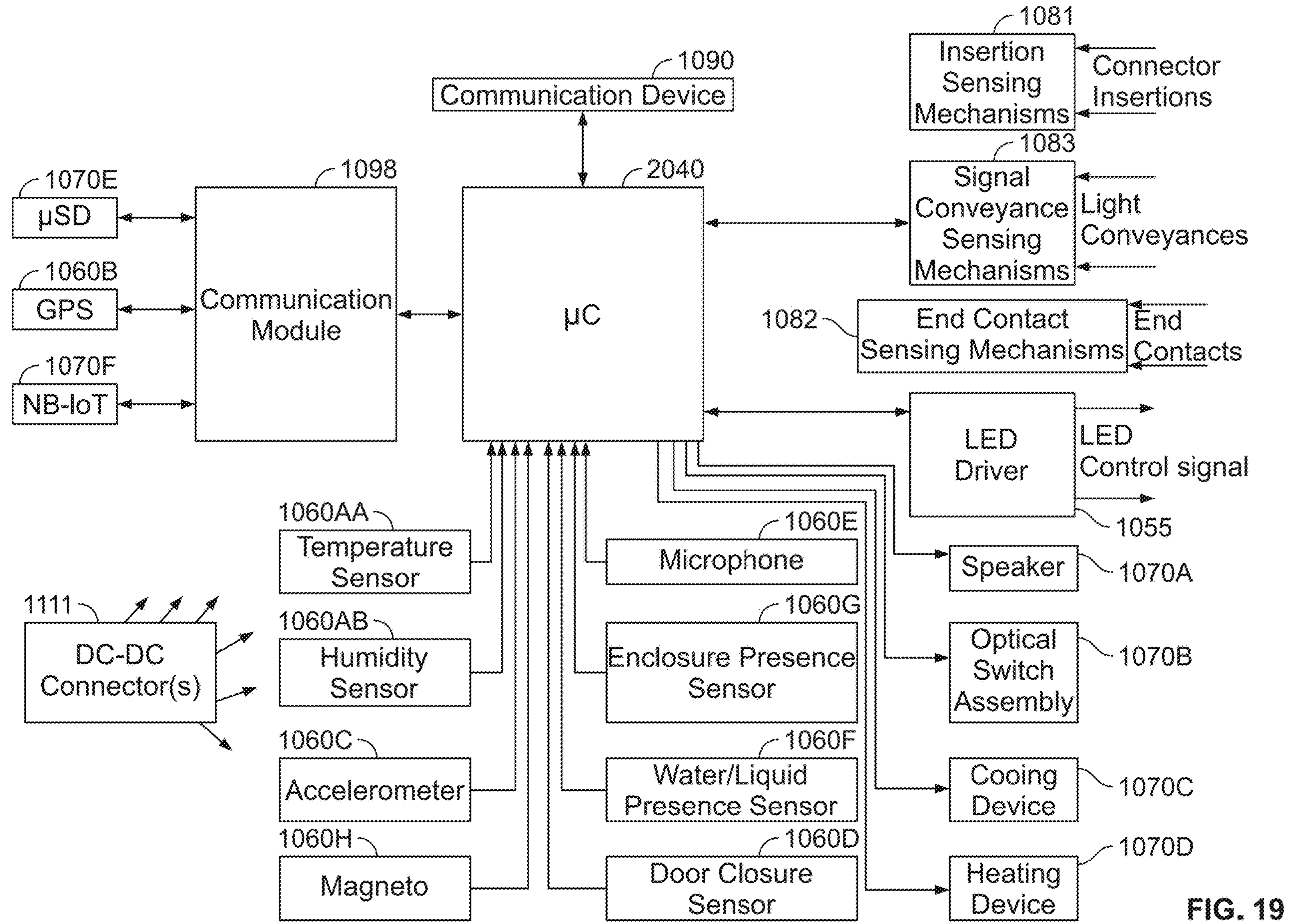
FIG. 19 is a schematic of an intelligent optical fiber termination system in accordance with an embodiment.

In some other arrangements, as shown by the example connector assembly of FIG. 15 and as further described in the '459 and the '410 Publications, force or displacement sensor 1030C may be attached between housing 1035D and ferrule 1036A (which as shown may be an outer ferrule of a two-part ferrule for an optical fiber) of respective connector 1005D of either one or both of the input and the output optical fiber cables in the form of end contact sensing mechanism 1082 (see FIGS. 17 and 19). In this manner, contact of an end of either one of the opposing input and output optical fiber cables with an end of the other of the input and the output cables may be detected so as to ascertain an end contact status of the end of the optical fiber cable having corresponding sensor 1030C. In the example of FIG. 15, when the connectors of the opposing input and output optical fiber cables are properly aligned by adapter 1015D, an abutment of ferrules 1036A, 1036B (which as shown may be an abutment of inner ferrules of the two-part ferrules for the opposing optical fibers) translatable within respective housings 1035D, 1035E of connectors 1005D, 1005E of the input and the output optical fiber cables is ascertained. When a force is applied to sensor 1030C when the sensor acts as a force sensor or the sensor is displaced when the sensor acts as a displacement sensor, the sensor may change states such that the sensor may convey electrical signals or stop conveying electrical signals being conveyed via main controller 1040 shown in FIG. 12, in which such electrical signals correspond to an end contact status of ends of optical fiber cables having a corresponding sensor. In such manner, the abutment of ends of respective connectors 1005D, 1005E of the input and output optical fiber cables with other objects, e.g., the abutment of opposing ferrules 1036A, 1036B, may be detected.

Still referring to FIGS. 11 and 12, optical termination assembly 1001 may include one or more optical fiber signal conveyance sensing mechanisms 1083 (see FIGS. 17 and 19). Such mechanisms 1083 may be in the form of one or more optical connection identification systems, which in some arrangements may be in the form of optical connection identification system 200, 600, 800 or similar system utilizing one or more optical connection identification assemblies 201, 202, 301, 401, 501, 601, 801A, 801B. In this manner, conveyance of optical signals to or from, i.e., through, either one or both of any opposing input optical fiber cable 1012A or output optical fiber cable 1012B associated with an optical connection identification system may be detected, in the manner described previously herein, so as to ascertain an optical fiber conveyance status. In the example of FIGS. 11 and 12, input optical signals conveyed to input optical fibers 1012A are first received by respective photodiodes 1A, 2A, 3A from respective additional optical fibers 1014A, 1014B, 1014C in which a portion of the input optical signals conveyed to the input optical fibers are conveyed from photodiodes 1A, 2A, 3A by jumper optical fibers 1013A, 1013B, 1013C and received by respective photodiodes 1B, 2B, 3B and then the input optical signals are conveyed to the connectors of the input optical fiber cables and output optical fiber cables 1012B and adapters 1015A, 1015B, 1015C aligning the optical fibers of the input and output optical fiber cables. Conversely, in this example, output optical signals conveyed to input optical fibers 1012A via output optical fibers 1012B corresponding to respective input optical fibers are received by respective photodiodes 1B, 2B, 3B in which a portion of the output optical signals conveyed from the input and output optical fibers are conveyed by jumper optical fibers 1013A, 1013B, 1013C and received by respective photodiodes 1A, 2A, 3A, and then the output optical signals are conveyed along additional optical fibers 1014A, 1014B, 1014C to a receiving unit, such as administrator remote interface 1091 described further herein with respect to FIG. 18, external to intelligent optical fiber termination system 1000.

Figure 16A:
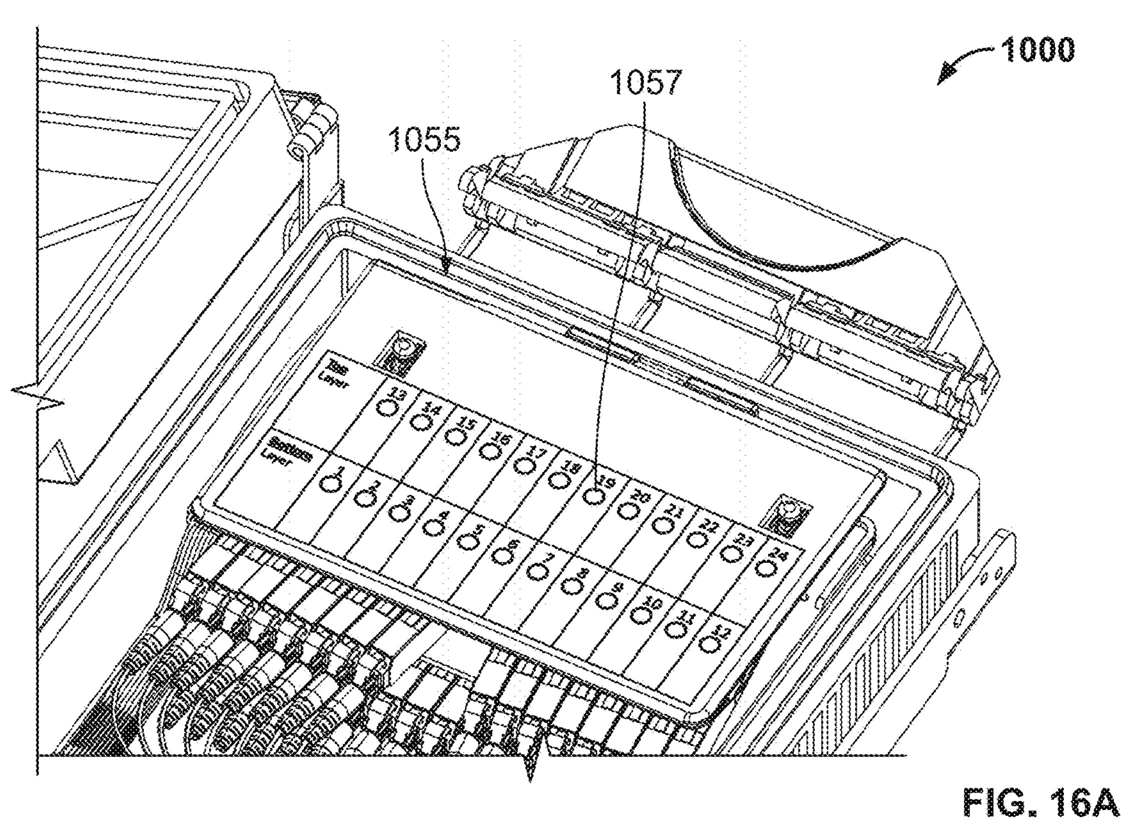
FIGS. 16A and 16B are perspective views of a sensory indication unit of the intelligent optical fiber termination system of FIG. 11.
Figure 16B:
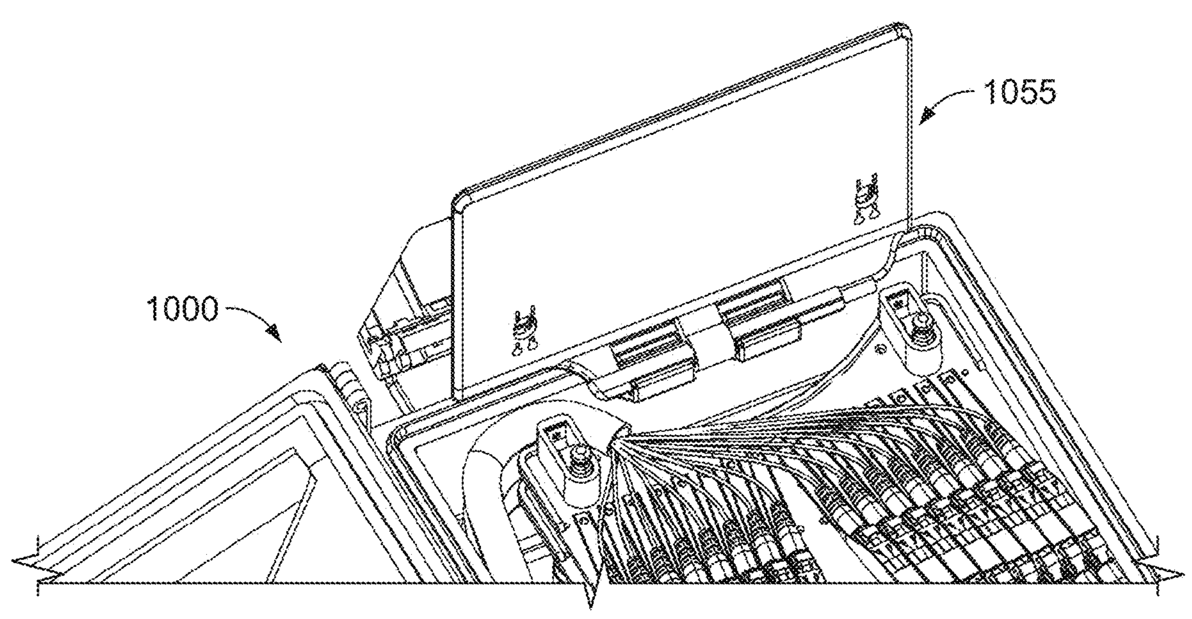

As best shown in FIGS. 16A and 16B, sensory indication unit 1055 is rotatably attached to enclosure 1099 such that the unit when in an open position exposes input optical fiber cables 1012A and when in a closed position covers the input optical fiber cables. Sensory indication unit 1055 is in electrical communication with optical fiber signal conveyance sensing mechanism 1083 just described and, as in the example shown, may include a set of light-emitting diodes (LEDs) 1057 associated with optical connection identification system 201, 202, 301, 401, 501, 601, 801A, 801B that may be configured to illuminate to indicate either that optical signals are not being received by associated photodiodes 1A, 2A, 3A, 1B, 2B, 3B, or more preferably that optical signals are being received by the associated photodiodes. While sensory indication unit 1055 is a visual indicator, in alternative arrangements, the sensory indication unit may be auditory, e.g., a speaker, or tactile, e.g., movable surface that raises to provide an alert such as for blind persons. A plurality of sensory indication units 1055 may be employed in an intelligent optical fiber termination system in accordance with the technology. As in the example shown in FIGS. 11 and 12, sensory indication unit 1055 may be in electrical communication with optical fiber signal conveyance sensing mechanism 1083 via main controller 1040.

As shown in the schematic of FIG. 17, sensory indication unit 1055 in accordance with the technology may be in electrical communication with an associated sensing mechanism, e.g., insertion sensing mechanism 1081, optical fiber signal conveyance sensing mechanism 1083, end contact sensing mechanism 1084 described above or another operational sensing mechanism 1060 as described below, via an optional device interface integrated circuit (IC) 1087 in electrical communication with assembly CPU 1040A, e.g., microcontroller 1040. With further reference to FIG. 17, operational change units that operate to alter the operational status of components of intelligent optical fiber termination system 1000 or the system as a whole are directed by assembly CPU 1040A and are in electrical communication with the associated sensing mechanisms via the assembly CPU and optionally via device interface IC 1087, as shown.

Still referring to FIG. 17, assembly CPU 1040A may be in electrical communication with communication device such that the assembly CPU may receive instructions from or provide data to an external source, such as administrator remote interface 1091 described further herein. Communication device 1090 may be a wireless router enclosed in intelligent optical fiber termination system 1000 as shown in FIG. 12. In particular, communication device 1090 may be wirelessly connected to cloud network 1095, such as the Internet of Things (IoT) or connected by wire or wirelessly such as via Bluetooth® wireless technology to a peripheral local communication device 1092, e.g. a programmable logic controller (PLC) used by a technician.

As further shown in FIG. 17, assembly CPU 1040A may be in electrical communication with memory 1040B housed within enclosure 1099 of intelligent optical fiber termination system 1000 or be in communication with such memory located at a remote location via communication device 1090. In some arrangements, such as in the example of main controller 1040 shown in FIG. 12 and of microcontroller (μC) 2040 shown in FIG. 19, assembly CPU 1040A and memory 1040B may be parts of a microcontroller. Memory may include read-only memory (ROM) and random-access memory (RAM) and, as needed, secondary memory such as found on hard disk drives, universal serial bus (USD) drives, and other data writable memory to which data may be stored. As shown, memory 1040B may include but is not limited to including data associated with output instructions 1041, reference values 1042, default settings 1043, optical termination assembly status 1044, and other operational status 1045 corresponding to electrical signals conveyed to or from, whether directly or indirectly, assembly CPU 1040A.

Data associated with optical termination assembly status 1044 may include data corresponding to optical fiber insertion status, optical fiber conveyance status, and optical fiber end contact status. Such data may result from a comparison of preset reference values against associated status values conveyed via electrical signals from insertion sensing mechanisms 1081, end contact sensing mechanisms 1082, optical fiber signal conveyance sensing mechanisms 1083. Such data further may correspond to a last determined status at a particular instant in time or over a time interval and may include historical data of such statuses taken at predetermined periods. A logic controller within assembly CPU 1040A or a remote CPU (not shown) conducts a comparison between the obtained status values and reference values stored in memory.

Data associated with other operational status may include data corresponding to an operational status. Such data may result from a comparison of preset reference values against associated status values conveyed via electrical signals from one or more operational sensing mechanisms 1060 such as those described further herein. Such data further may correspond to a last determined status at a particular instant in time or over a time interval and may include historical data of such statuses taken at predetermined periods. The logic controller within assembly CPU 1040A or a remote CPU conducts the comparison between the obtained status values and reference values stored in memory.

Based on one or more of the determined optical fiber insertion status, optical fiber conveyance status, optical fiber end contact status, and operational status, the logic controller may convey electrical signals associated with output instructions 1041 stored in memory 1040B and corresponding to the one or more of the determined optical fiber insertion status, optical fiber conveyance status, optical fiber end contact status, and operational status that direct the operation of operational change units 1070 described further herein. In some instances, one or more default settings 1043 are stored in memory 1040B such that a determined optical fiber insertion status, optical fiber conveyance status, optical fiber end contact status, or operational status may be ignored and a default setting may be conveyed by the logic controller as output instructions 1041 in place of output instructions corresponding to the one or more of the determined optical fiber insertion status, optical fiber conveyance status, optical fiber end contact status, and operational status.

In some arrangements, a combination of assembly CPU 1040A and memory 1040B may be configured for machine learning in which such machine learning may be conducted over communication device 1090 and a network such as a cloud network 1095 when the assembly CPU and the memory are in communication via the communication device and a network. In such arrangements, such combination may be configured to effect a change to at least one of the reference values 1042 associated with the optical fiber insertion status, the optical fiber conveyance status, the optical fiber end contact status, and the operational status. In some such arrangements, the combination may be configured to effect the change based on an accumulated set or an entirety of a plurality of determined statuses of any one or any combination of the optical fiber insertion status, the optical fiber conveyance status, the optical fiber end contact status, and the other operational status stored by memory 1040B. In some arrangements, the combination of assembly CPU 1040A and memory 1040B may be programmed to actively effect the changes to reference values 1042 such that the changes are made without human intervention. The combination of assembly CPU 1040A and memory 1040B may initiate these changes, for example, when an average of the determined status over a period of time based on data from a sensing mechanism of intelligent optical fiber termination system 1000 changes. In one particular example, a determined status from optical fiber signal conveyance sensing mechanism 1083 may indicate that optical signals are not being conveyed between opposing optical fibers, i.e., no optical power is being utilized, during a certain period of time, e.g., the early morning hours, such that there is no need to check for connectivity of optical fiber cables and a default instruction thus may be sent to assembly CPU 1040A to not perform any analysis, thus saving system power. In another example, a determined status from optical fiber signal conveyance sensing mechanism 1083 may indicate that optical signals are being conveyed between opposing optical fibers, i.e., optical power is being utilized, during a certain period of time, e.g., during late morning hours, such that there may be no need to utilize either one of insertion sensing mechanism 1081 or end contact sensing mechanism 1082 to determine connector engagement as a lack of connector engagement would be determined when a loss of optical power occurred according to data from the optical fiber signal conveyance sensing mechanism.

Figure 18:
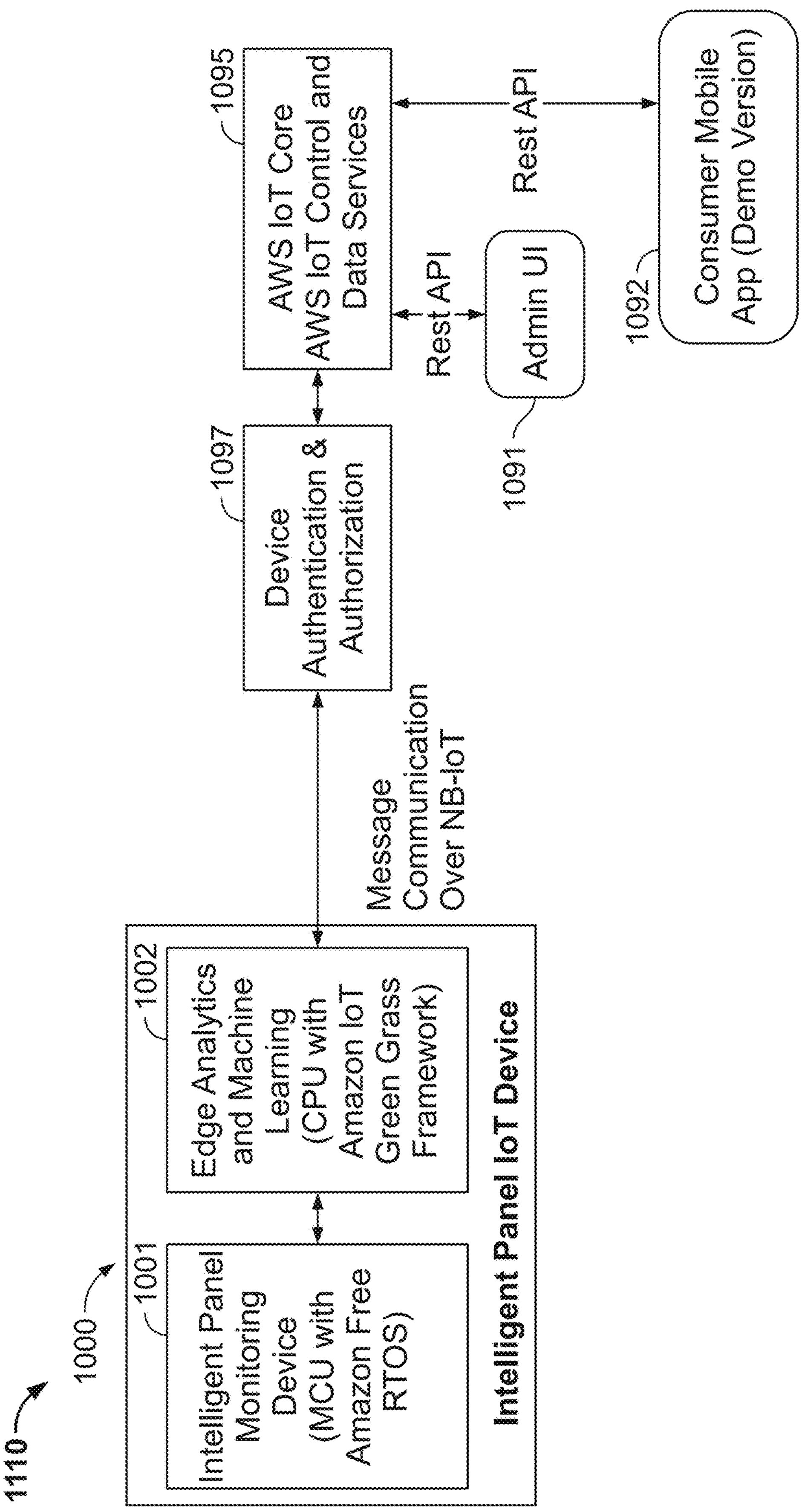

Referring now to FIG. 18, network 1110 includes intelligent panel monitoring and control system 1001, intelligent panel analysis system 1002, system authentication and authorization interface 1097, plug-in cloud network 1095, administrator remote interface 1091, and local interface 1092. Intelligent panel monitoring and control system 1001 and intelligent panel analysis system 1002, which together may form a substantial portion of intelligent optical fiber termination system 1000. In one example, intelligent panel monitoring and control system 1001 may include sensing mechanisms including insertion sensing mechanism 1081, optical fiber signal conveyance sensing mechanism 1083, end contact sensing mechanism 1082 described above or another operational sensing mechanism 1060 described below, sensory indication units 1055, and operational change units 1070. Intelligent panel analysis system 1002 may include assembly CPU 1040A and memory 1040B in the form of microcontroller 1040, 2040 and further include communication device 1090 configured for interfacing with plug-in cloud network 1095 over an ISP, e.g., an NB-IoT provided by Verizon Communications. In the example shown, plug-in cloud network 1095 is AMAZON Web Services (AWS) cloud computing network owned by Amazon.com, in which the microcontroller 1040, 2040 includes AWS IoT Greengrass framework to allow provide for localized control of and machine learning by the microcontroller and system while remaining on plug-in cloud network. As in the example shown, administrator remote interface 1091 may be a central office of an ISP and local interface 1092 may be a peripheral local communication device such as local communication device 1092.

Using an application programming interfaces (APIs), e.g., a representational state transfer (REST) API, administrator remote interface 1091 and local interface 1092 may communicate with plug-in cloud network 1095. In this manner, upon accessing plug-in cloud network 1095 via system authentication and authorization interface 1097, intelligent panel analysis system 1002 interfaces with plug-in cloud network 1095 such that data, e.g., data corresponding to optical fiber insertion status, optical fiber conveyance status, optical fiber end contact status, and operational status, and instructions, e.g., output instructions 1041, may be conveyed bi-directionally via plug-in cloud network 1095. In such configuration, machine learning may be conducted over plug-in cloud network 1095 in which logic control, e.g., data analysis and decision-making, may be handled remotely at administrator remote interface 1091 and instructions based on such machine learning carried out via the combination of intelligent panel monitoring and control system 1001 and intelligent panel analysis system 1002.

Referring now to an example system in FIG. 19, intelligent optical fiber termination system 1000 may include one or more operational sensing mechanisms 1060 and operational change units 1070. Any such operational sensing mechanism 1060 may be one of optical fiber insertion sensing mechanism 1081, optical fiber signal conveyance sensing mechanism 1083, and end contact sensing mechanism 1082 or a different sensing mechanism. In some arrangements, the operational sensing mechanism, may be a device such as environmental sensor 1060AA, 1060AB, position sensor 1060B, accelerometer 1060C, door closure sensor 1060D, microphone 1060E, liquid presence sensor 1060F, enclosure presence sensor 1060G, and magneto 1060H. In various arrangements, the operational change units, as shown in FIG. 17, may be any one of speaker 1070A, optical switch assembly 1070B, cooling device 1070C, and heating device 1070D, as shown in FIG. 19.

The environmental sensor may be but is not limited to being temperature sensor 1060AA, e.g., a thermocouple, configured to ascertain a temperature of or within enclosure or other components of intelligent optical fiber termination system 1000 or humidity sensor 1060AB configured to ascertain a humidity within enclosure 1099. In this example, environmental sensor 1060AA, 1060AB conveys electrical signals to microcontroller 2040 having a combination of a CPU and memory. When microcontroller 1040 determines that either one or both of the temperature and humidity of at least a portion of the intelligent optical fiber termination system, e.g., intelligent optical fiber termination system 1000, is outside of associated reference values 1042, microcontroller directs cooling device 1070C or heating device 1070D to activate and attempt to regulate the one or both of the temperature and the humidity.

Position sensor 1060B, e.g., a global positioning system (GPS), may provide a location of enclosure 1099 or other components of intelligent optical fiber termination system 1000. In this manner, when intelligent optical fiber termination system 1000 is moved to another location, microcontroller 2040 will communicate via communication device 1090 to a remote location, e.g., administrator remote interface 1091, to alert such location to the move of intelligent optical fiber termination system 1000. As shown in FIG. 19, GPS 1060B may be an add-on operational sensing mechanism that may be plugged into communication module 1098 in electrical communication with microcontroller 2040.

Accelerometer 1060C may be a piezoelectric or more preferably a microelectromechanical system (MEMS) based accelerometer known to those skilled in the art. In some arrangements, accelerometer 1060C may be configured to detect a vibration level or changes in orientation of portions of intelligent optical fiber termination system 1000 such as enclosure 1099 or other components within the enclosure. For example, accelerometer 1060C may detect a ball striking enclosure and send an electrical signal to microcontroller 2040. If such ball strike causes vibration greater than a reference value stored in microcontroller 2040, then the microcontroller will communicate via communication device 1090 to a remote location, e.g., administrator remote interface 1091, to alert such location as to possible damage to intelligent optical fiber termination system 1000 needing repair.

Door closure sensor 1060D, which may be in the form of a force or displacement sensor, may detect the position of a door of enclosure 1099, e.g., to determine if the door is closed. If the door is detected to be in an open state, door closure sensor 1060D may send an electrical signal to microcontroller 2040 which will then communicate via communication device 1090 to a remote location, e.g., administrator remote interface 1091, to alert such location that the door is open. In such example, if no technician is known to be present at the site of intelligent optical fiber termination system 1000, then administrator remote interface 1091 may send a technician to inspect the system and close the door of enclosure 1099 if no further issues are found.

Microphone 1060E may detect the sound pressure level and frequency of sounds within enclosure 1099 and send electrical signals corresponding to such sounds to microcontroller 2040. When a sound detected by microphone 1060E is determined by microcontroller 2040 to be above reference value 1042 associated with the microphone, the microcontroller then may communicate via communication device 1090 to a remote location, e.g., administrator remote interface 1091, to alert such location as to the detected sound. In such example, if no technician is known to be present at the site of intelligent optical fiber termination system 1000, then administrator remote interface 1091 may send a technician to inspect the system to be sure no damage has been caused to the system. In some arrangements, as in the example shown in FIG. 19, when a sound detected by microphone 1060E is determined to be above reference value 1042 associated with the microphone, microcontroller 2040 then may send electrical signals to speaker 1070A to direct the speaker to issue a loud sound. Such sounds may be effective to remove animals or other living creatures from enclosure 1099.

Liquid presence sensor 1060A, which may be formed of electrodes for which only completely pure water completes a circuit with the electrodes, may detect the presence of liquids including rainwater that may have intruded into enclosure 1099. When a liquid level detected by liquid presence sensor 1060A corresponding to electrical signals from the sensor to microcontroller 2040 is determined by the microcontroller to be above reference value 1042 associated with the liquid presence sensor, microcontroller 2040 then may communicate via communication device 1090 to a remote location, e.g., administrator remote interface 1091, to alert such location as to the detected liquid. In such example, if no technician is known to be present at the site of intelligent optical fiber termination system 1000, then administrator remote interface 1091 may send a technician to inspect the system to remove the liquid, ensure no damage has been caused to the system, and as necessary appropriately seal the system.

Enclosure presence sensor 1060G, which may be in the form of a force or displacement sensor, may detect whether enclosure 1099, and thus intelligent optical fiber termination system 1000, has been removed or detached from a predetermined position, such as a telephone pole or side of a building. When a lack of presence detected by enclosure presence sensor 1060G is determined by microcontroller 2040 based on data from electrical signals conveyed by the sensor, microcontroller then may communicate via communication device 1090 to a remote location, e.g., administrator remote interface 1091, to alert such location as to the detected lack of presence of enclosure 1099. In such example, if no technician is known to be present at the site of intelligent optical fiber termination system 1000, then administrator remote interface 1091 may send a technician to inspect the system to be sure the intelligent optical fiber termination system is still present and that no damage has been caused to the system.

As further shown in FIG. 19, an intelligent optical fiber termination system such as intelligent optical fiber termination system 1000 may include additional components, including optical switch assembly 1070B and other add-on devices including microSD (μSD) card 1070E and NB-IoT device 1070F. Optical switch assembly 1070B which may be substantially in the form described in U.S. Pat. No. 9,008,484, filed Mar. 28, 2012, the disclosure of which is incorporated herein in its entirety, may include an arm to move connectors of optical fiber cables, such as connectors of input and output optical fiber cables. In this manner, when insertion sensing mechanism 1081 detects that an associated port of associated adapter 1015A, 1015B, 1015C, 1015D is open, microcontroller 2040 may send electrical signals to optical switch assembly 1070B to insert one connector 1005A, 1005B, 1005C, 1005D, 1005E of one of input and output optical fiber cables 1012A, 1012B into the open port. Furthermore, when end contact sensing mechanism 1082 detects that an end of an associated connector, e.g., a ferrule 1036A, 1036B, of one of input and output optical fiber cables 1012A, 1012B is not in contact with another object, microcontroller 2040 may send electrical signals to optical switch assembly 1070B to, for example, fully insert such cable into proper position. MicroSD card 1070E and NB-IoT device 1070F may be insertable into communication module 1098 or another communication module within intelligent optical fiber termination system 1000 that is in electrical communication with microcontroller 2040. In the example shown, microSD card 1070E provides additional memory storage and allow for data to be collected from intelligent optical fiber termination system 1000, and NB-IoT device 1070F operates to facilitate communication as described above.

Still referring to FIG. 19, intelligent optical fiber termination system 1000 may include one or more DC-DC converters 1111 that preferably step down voltage from a utility power or other power source. In this manner, one or more components including microcontroller 2040 may be electrically powered via such a DC-DC converter as known to those skilled in the art.

Figure 20:
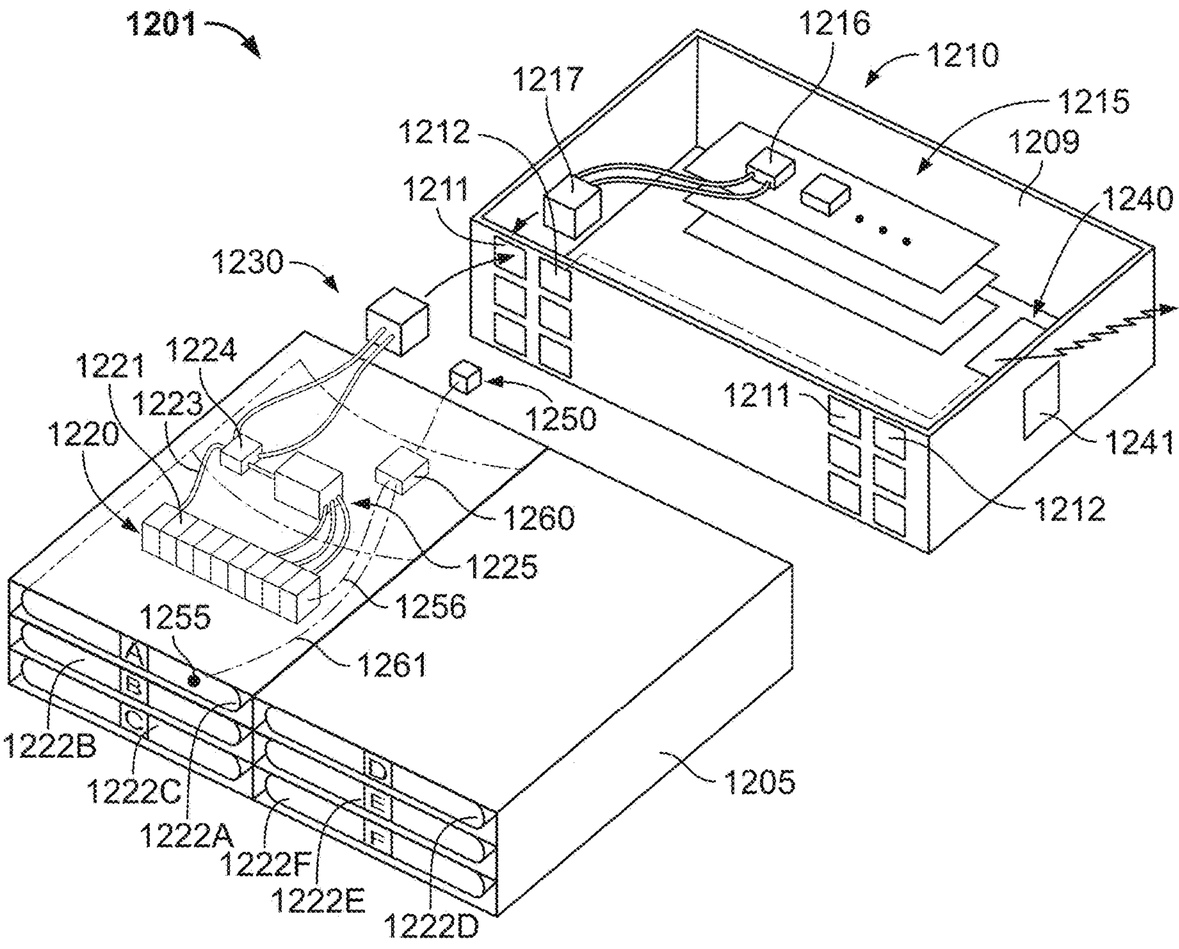
FIGS. 20 and 21 are perspective views of optical fiber termination assembly and control units in accordance with further embodiments.

Referring now to FIG. 20, optical fiber termination assembly and control unit 1201 includes cassette housing 1205, a plurality of removable and replaceable cassettes 1222A-1222F receivable in corresponding slots of the cassette housing, and electronic control unit 1210 attachable to and separable from the cassette housing. Optical fiber termination assembly and control unit 1201 allows connector ports of each cassette to be in optical communication with or without power monitoring of such connector ports as well as to allow each cassette to have its own unique optical filtering configuration independent from each other cassette and from electronic control unit 1210.

As shown, cassette A includes patch panel 1220 having a plurality of connector ports 1221 which may be in the form of adapters for connection with respective connectors of optical fiber cables, a plurality of optical fibers 1223 (only one shown) extending from respective ones of the plurality of the connector ports, first optical filter 1224, which may be a tap filter, optionally second optical filter 1225, which preferably may be a WDM or may be a splitter module such as but not limited to a planar lightwave circuit (PLC), optical fiber cable and multi-fiber connector combination 1230, electronic interface board 1260, electrical wire and multi-pin connector combination 1250, a plurality of LEDs 1255 in electrical communication with the electronic interface board via wire 1261 and attached to a front face of cassette 1222A such that the LEDs are visible when the cassette is receiving in the cassette housing, and optional electrical wire 1256 in electrical contact between a connector engagement sensing mechanism, such as those shown and described in U.S. Patent Application Publication Nos. 2017/0003459 A1 and 2018/0136410 A1, of a respective connector port and the electronic interface board. First optical filter 1224 provides tapping of optical signals, e.g., approximately 0.5% to approximately 5% of the optical signals, conveyed between connector ports 1221 of patch panel in the same manner as optical filter 424 provides tapping of optical signals conveyed via optical filter 424 within optical connection identification assembly 401. Second optical filter 1225 includes a branching network of optical fibers encased in and maintained in the same positions relative to each other by a housing, as shown. In this manner, optical signals conveyed along an optical fiber from first optical filter 1224 towards second optical filter 1225 may be split and conveyed along the branching network of optical fibers extending from second optical filter 1225 to respective connector ports 1223. Additionally, optical signals conveyed from connector ports 1223 to second optical filter 1225 may be conveyed through the second optical filter and then conveyed to first optical filter 1224 in which an untapped portion of such optical signals may be conveyed from the first optical filter to a respective connector port, as shown.

Other cassettes 1222B-1222F may include any of the same componentry as cassette 1222A as well as additional or less componentry. In one example, cassettes 1222A and 1222D may be configured for 5G Wireless such that these cassettes may have a specialized WDM module or splitter module, cassette 1222B may be configured for Super Passive Optical Network (Super-PON) may have another specialized WDM module or splitter module, cassette 1222C may be configured for Next-Generation Passive Optical Network 2 (NG-PON2) still further specialized WDM module or splitter module, cassette 1222E may be configured for WDM to combine and transmit multiple optical signals simultaneously at different wavelengths along the same optical fiber, in this example coarse wavelength division multiplexing (CWDM), and cassette 1222F may be configured for another type of WDM, in this example, dense wavelength division multiplexing (DWDM) using more channels with less spacing than the CWDM. Any of cassettes 1222A-1222F may be interchanged or replaced with another cassette that is interchangeable with these cassettes and which may have the same or a different function.

Still referring to FIG. 20, electronic control unit 1210 includes control unit housing 1209, a plurality of optical connector adapters 1211 configured for connection with the connector of a respective optical fiber cable and multi-fiber connector combination 1230 of one of cassettes 1222A-1222F, a plurality of electrical connector ports 1212 configured for connection with the connector of a respective electrical wire and multi-pin connector combination 1250, a plurality of photodiode (PD) panels 1215, main controller 1240 which may be substantially similar to main controller 1040, and communication port 1241.

Figure 21:
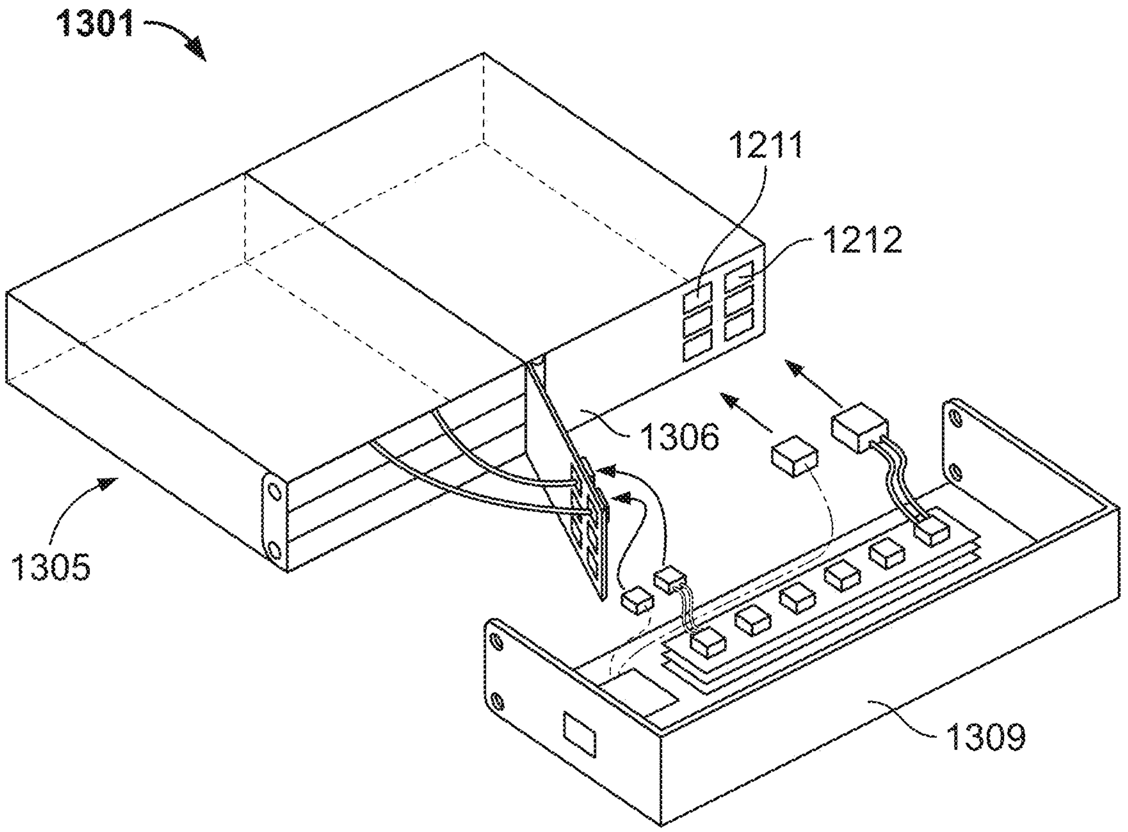

Control unit housing 1209 may be attachable to and separable from cassette housing by fasteners such as a nut-and-bolt combination that may be received through bolt holes on corresponding sides of control unit housing and cassette housing such as in the example shown in FIG. 21. Each of the plurality of optical connector adapters 1211 are inserted into control unit housing 1209 such that exposed ports of each of the optical connector adapters face cassette housing. Each of the plurality of PD panels 1215 includes an array of PDs 1216 each attached to a respective multi-fiber connector 1217, e.g., an multi-fiber push-on (MPO) connector, via a pair of optical fibers in the form of a pigtail as shown. Opposing respective ones of the plurality of optical fiber cable and multi-fiber connector combinations 1230 and the plurality of multi-fiber connectors 1217 are inserted into respective ones of the plurality of optical connector adapters 1211 such that each PD 1216 is associated with a respective one of the optical fiber cable and multi-fiber connector combinations. In this manner, tapped optical signals conveyed by each optical fiber cable and multi-fiber connector combination 1230 are received by the PD 1216 associated with such cable and connector combination. Each of PDs 1216 converts the optical signals, e.g., average optical power, received by the PD into electrical signals, e.g., current, that are conveyed to main controller 1240. In this manner, main controller 1240 may manipulate data received from the electrical signals and communicate wirelessly via a wireless transmitter or by a communication cable through communication port 1241, e.g., Ethernet port, with any one or any combination of a local area network (LAN), wide-area network (WAN), or cloud network to provide radio or electrical signals corresponding to the electrical signals received from PDs 1216 to provide an indication that optical signals are being conveyed from associated ones of connector ports 1221 of cassettes 1222A-1222F and thus to provide power monitoring of such connector ports or, in another example, to simply provide an indication of a undesired disruption in optical power being conveyed by at least one of the connector ports 1221.

As further shown in FIG. 20, main controller 1240 is in electrical communication with each of the plurality of electrical connector ports 1212. Each of the plurality of electrical wire and multi-pin connector combinations 1250 are inserted into respective ones of the plurality of electrical connector ports 1212 such that each of the electrical connector ports is associated with electronic interface board 1260 and electrical signals, e.g., current, may be conveyed between electronic interface board 1260 and microcontroller 1240. In this manner, main controller 1240 may manipulate data received from the electrical signals and may communicate wirelessly via a wireless transmitter or by communication cable through communication port, e.g., Ethernet port, with any one or any combination of a local area network (LAN), wide-area network (WAN), or cloud network to provide radio or electrical signals corresponding to the electrical signals received from electronic interface board 1260 to provide an indication as to whether connector sensing mechanisms associated with respective connector ports 1221 detect insertion of respective optical fiber cables 1223 in the connector ports and thus to provide connector engagement monitoring of such connector ports. By way of the electrical communication between main controller 1240 and LEDs 1255 via electronic interface board 1260, main controller 1240 directs the illumination (or alternatively but less preferably the non-illumination) of respective ones of the LEDs when the main controller 1240 receives either one or both electrical signals from PDs that optical signals are being conveyed from respective connector ports 1221 and electrical signals from the connector engagement sensing mechanism associated with the respective connector ports indicating that optical fiber connectors are received, preferably that such optical fiber connectors are fully received such that a release button or latch must be depressed to remove the connectors, in the respective connector ports, depending on the configuration, e.g., programming, of the microcontroller.

Referring now to FIG. 21, optical fiber termination assembly and control unit 1301 is the same as or substantially the same as optical fiber termination assembly and control unit 1201 with the exception that the plurality of optical connector adapters 1211 and the plurality of electrical connector ports 1212 are inserted into back panels 1306 of cassette housing 1305 rather than a front panel of a control unit housing as in optical fiber termination assembly and control unit 1201. Indeed, control unit housing 1309 lacks a front panel in the example shown. Back panels 1306 of cassette housing 1305 may be rotatable away from the rest of the cassette housing as shown and, in some arrangements, may be removable from the rest of the cassette housing to provide for access to a back side of cassettes 1222A-1222F when such cassettes are received in control unit housing 1305.

Figure 22A:
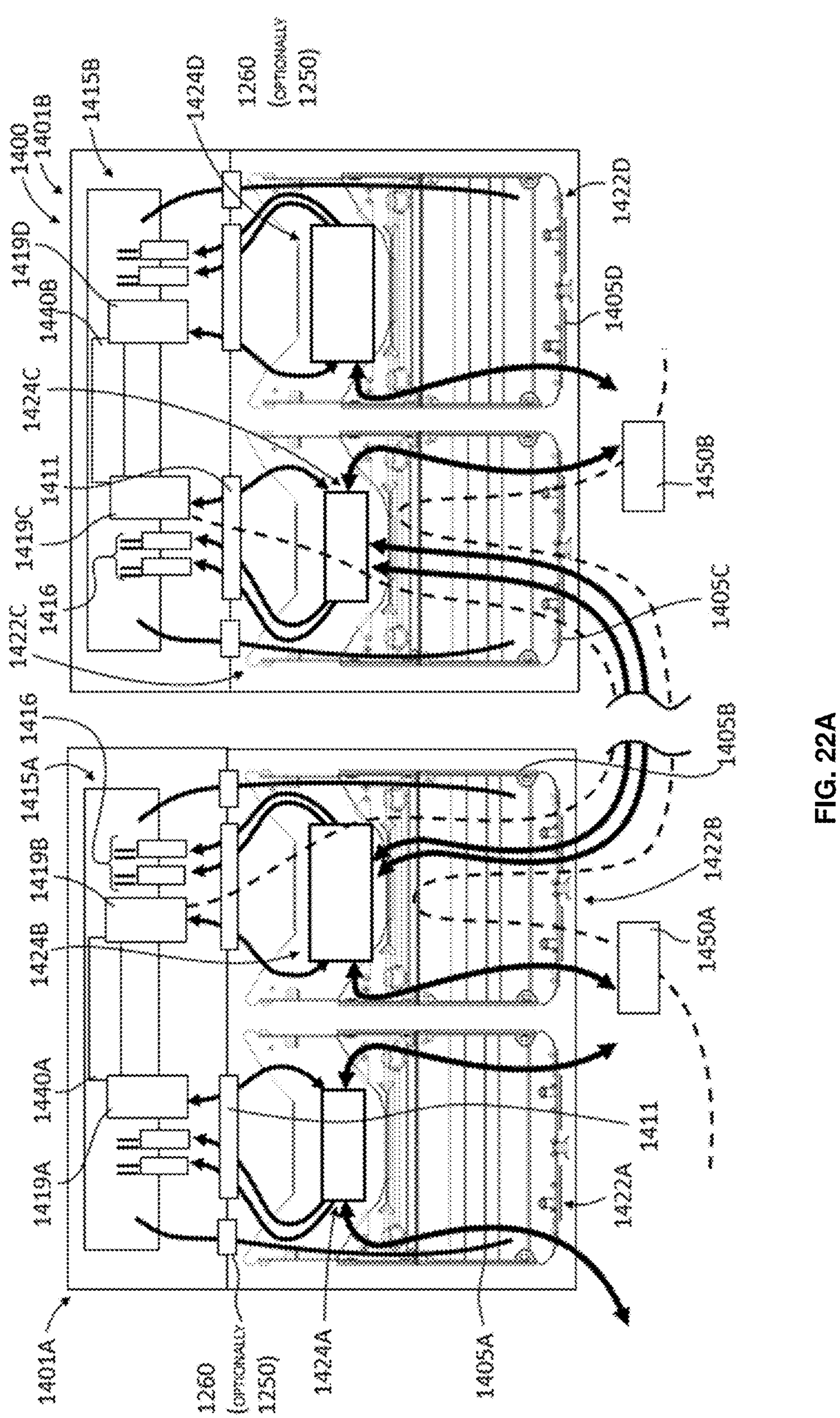
FIGS. 22A and 22B are schematics in plan views of optical systems in accordance with further embodiments.

Referring now to FIG. 22A, optical system 1400 includes a plurality of optical fiber and termination assembly and control units 1401A, 1401B that may be in optical communication with other optical fiber and termination assembly and control units or with a central office that may control and analyze the operation of each of these units. In the example shown, the two units 1401A, 1401B are the same or substantially the same as optical fiber termination assembly and control unit 1301 with certain notable exceptions. Each of optical fiber and termination assembly and control units 1401A, 1401B include a plurality of cassettes 1422A-1422D acting as portions of optical assemblies (e.g., in the form of patch panels as in the example shown) within respective cassette housings 1405A-1405D and control units 1401A, 1401B.

As shown, each of cassettes 1422A-1422D includes connector ports, which as shown may be in the same form as connector ports 1221, into which optical fibers may be inserted for optical communication with other optical fiber and termination assembly and control units or with a central office and further includes optical filter devices 1424A-1424D. In the same manner as with optical filters described previously herein, each of optical filter devices 1424A-1424D may be a WDM, a tap filter, or a splitter module such as but not limited to a planar lightwave circuit (PLC). Optical filter devices 1424A-1424D may be but do not need to be the same type of filter or filter device. For instance, in the example shown, optical filters 1424A, 1424C are tap filter modules employing whereas optical filters 1424B, 1424D are tap filter modules with DWDM or other WDM.

Control units 1401A, 1401B include central processing and transmission units 1415A, 1415B that each include a CPU, controller and electronic transmission device 1440A, 1440B, a combination of optical receiving and transmission devices in the form of optical transceivers 1419A-1419D in the example shown, and a pair of photodetectors 1416, e.g., photodiodes, associated with each of optical filters 1424A-1424D in the manner described previously herein with respect to FIGS. 2-8B. Optical filters 1424A-1424D are in optical communication with transceivers 1419A-1419D and photodiodes 1416 via optical connections via connector adapters 1411. In this manner, optical signals at wavelengths different than the wavelengths of main optical signals, i.e., optical carrier signals, are filtered from the rest of the signals to transceivers 1419A-1419D and the main optical signals are routed to separate optical units 1450A, 1450B, which may be other optical fiber and termination assembly and control units.

Electronic transmission devices 1440A, 1440B in electrical communication with respective ones of optical transceivers 1419A-1419D may interface with a central office, personal electronic devices such as mobile phones and tablets, or other types of control units, e.g., other optical fiber and termination assembly and control units, as previously described herein by an electrical wire connection, such as an Ethernet cable, a Power-over-Ethernet (PoE), or a direct current (DC) connection, or wirelessly such as over a cloud network or by way of an IoT connection, as further previously described herein. In some examples, electronic transmission devices 1440A, 1440B may interface with a remote computing unit accessible by a central office. Such a remote computing unit may be a virtual machine, which in some examples may be part of a datacenter. Such a virtual machine may be running analysis software such as but not limited to AMAZON Web Services (AWS) or Microsoft® Azure cloud computing network software, or other such software configured for analyzing data associated with the optical signals routed within control units 1401A, 1401B.

As shown, in a first setup, an optical transmission device portion of first transceiver 1419B generates optical signals that are routed along an optical fiber extending between cassettes 1422B and 1422C (along the path of one of the double arrows shown in FIG. 22A), through optical filter 1424C, and received by a reflecting element of an optical receiving device portion of second transceiver 1419C in which such signals are reflected by the reflecting element and thus routed back to an optical receiving device portion of the first transceiver. In this first setup, the time of travel 2t of the pulsed optical signals from first transceiver 1419B to second transceiver 1419C and back to first transceiver 1419B may be multiplied by signal propagation speed v and then divided by two to determine an optical path length L, i.e., $v*2t/2=L$. In this instance in which the measured or clocked time of travel is represented as 2t, the variable t thus corresponds to an arithmetic mean of the time of travel of the pulsed optical signal in one direction between first transceiver 1419B and second transceiver 1419C and thus to an approximate time of travel of the optical signal along the optical path length L. In some arrangements of this first setup, second transceiver 1419C may be replaced with an optical receiving device with a reflecting element in which the optical receiving device is not a transceiver. In some such arrangements, the optical receiving device may be simply a reflecting element, e.g., a mirror.

In a second setup of optical system 1400, first transceiver 1419B and second transceiver 1419C are synchronized such that at a start time t=0 of pulsed optical signals generated by optical transmission device portion of second transceiver 1419C and routed to optical receiving device portion of first transceiver 1419B via an optical fiber extending between cassettes 1422B and 1422C of optical fiber and termination assembly and control units 1401A, 1401B and optical filter 1424B, central processing and transmission unit 1415A, 1415B determines, or a central office in electrical or wireless communication with the central processing and transmission unit, determines a time of travel of the optical signals generated by second transceiver 1419C and received by first transceiver 1419B. In this second setup, the time of travel t of the pulsed optical signals from second transceiver 1419C to first transceiver 1419B may be multiplied by the signal propagation speed v to determine an optical path length L, i.e., v*t=L. Similarly, a time of travel of optical signals generated by an optical transmission device portion of transceiver 1419B and received by optical receiving device portion of transceiver 1419C may be determined.

Figure 22B:
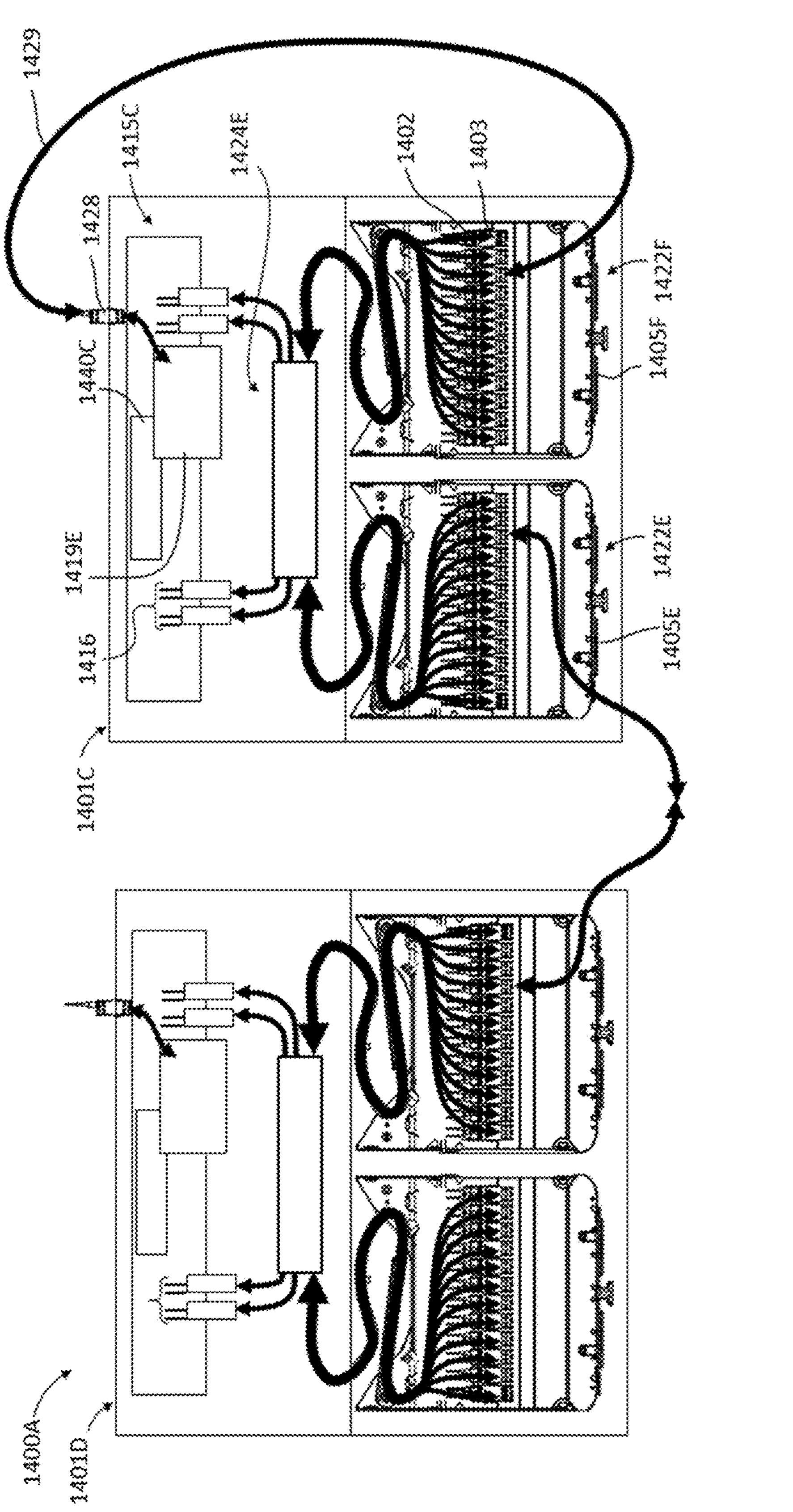

Referring now to FIG. 22B, in an alternative arrangement, optical system 1400A includes a plurality of optical fiber and termination assembly and control units 1401C, 1401D that may be in optical communication with other optical fiber and termination assembly and control units or with a central office that may control and analyze the operation of each of these units. In the example shown, units 1401C, 1401D are the same or substantially the same as optical fiber termination assembly and control units 1401A, 1401B with certain notable exceptions. Each of optical fiber and termination assembly and control units 1401C include a plurality of cassettes 1422E, 1422F within respective cassette housings 1405E, 1405F in place of cassettes 1422A-1422D within respective cassette housings 1405A-1405D.

Like cassettes 1422A-1422D, cassettes 1422E, 1422F may include a plurality of optical fibers 1402 received within a plurality of adapters 1403 having ports configured to receive connectors of optical fiber cables that extend external to the cassettes. Optical fibers 1402 may form part of respective optical fiber cables having connectors insertable into and removable from respective ports of adapters 1403 or the optical fibers may be received directly into and be integral with the adapters into which the optical fibers are received. As shown, cassettes 1422E, 1422F exclude optical filter devices 1424A-1424D. Instead, each of optical fiber and termination assembly and control units 1401C, 1401D include optical filter devices 1424E that are configured for optical communication with each of optical fibers 1402 of each of cassettes 1422E, 1422F. In this manner, each of optical fibers 1402 of cassette 1422E may be placed in optical communication with any one of optical fibers 1402 of cassette 1422F via optical filter device 1424E of the same optical fiber and termination assembly and control units 1401C, 1401D. In this configuration, optical fibers 1402 of cassette 1422E may serve as input optical fibers while optical fibers 1402 of either cassette 1422E or cassette 1422F in optical communication with the optical fibers of 1402 of 1422E, respectively, serve as output optical fibers.

As optical filter device 1424E is shared between cassettes 1422E, 1422F, each control unit 1401C, 1401D include a single central processing and transmission unit 1415C for use in conjunction with optical signals to and from cassettes 1422E, 1422F via the shared optical filter device. Each central processing and transmission unit 1415C includes a CPU, controller and electronic transmission device 1440C, a combination of optical receiving and transmission devices in the form of a single optical transceiver 1419E unlike units 1415C, and, also unlike units 1415C, two pairs of photodetectors 1416, e.g., photodiodes, in which each of the photodetectors is associated with optical filter device 1424E in a similar manner to that described previously herein with respect to FIGS. 2-8, and in particular FIG. 4. In this manner, optical signals routed by optical fibers 1402 from cassette 1422E are received via optical filter device 1424E by one of the pairs of photodetectors 1416 of central processing and transmission unit 1415C and optical signals routed by optical fibers 1402 from cassette 1422F are received via the optical filter device by the other of the pairs of photodetectors 1416 of the central processing and transmission unit.

Still referring to FIG. 22B, optical system 1400A further includes control unit adapter 1428 and an optical fiber jumper cable having a sufficient length to extend from a port of the control unit adapter to any one of ports of adapters 1403 and defining optical path 1429. In this manner, optical transceiver 1419E configured for conveying the optical signals generated by the transceiver along an optical fiber to control unit adapter 1428 is in optical communication with a respective one of optical fibers 1402 and thereby an optical receiving device, which may be one of photodetectors 1416, of a separate or remote control unit 1401D via the control unit adapter, the optical fiber defining optical path 1429, a respective one of adapters 1403, and optical filter devices 1424E of each of control units 1401C, 1401D. The use of this configuration with the optical fiber jumper cable allows a technician to manually test that optical signals are being conveyed through an optical system, such as in a system like that of optical system 1400A in which optical transceiver 1419A may not convey optical signals directly to associated optical filter 1424E within its same optical fiber and termination assembly and control unit 1401C. In this manner, optical transceiver 1419E and photodiodes 1416 of remote control unit 1401D may be operationally tested as well as used to identify power loss within optical system 1400A. Control unit adapter 1428 and the optical fiber jumper cable also may be used in the same manner and for the same purpose with respect optical system 1400 and other similar such systems.

Figure 23A:
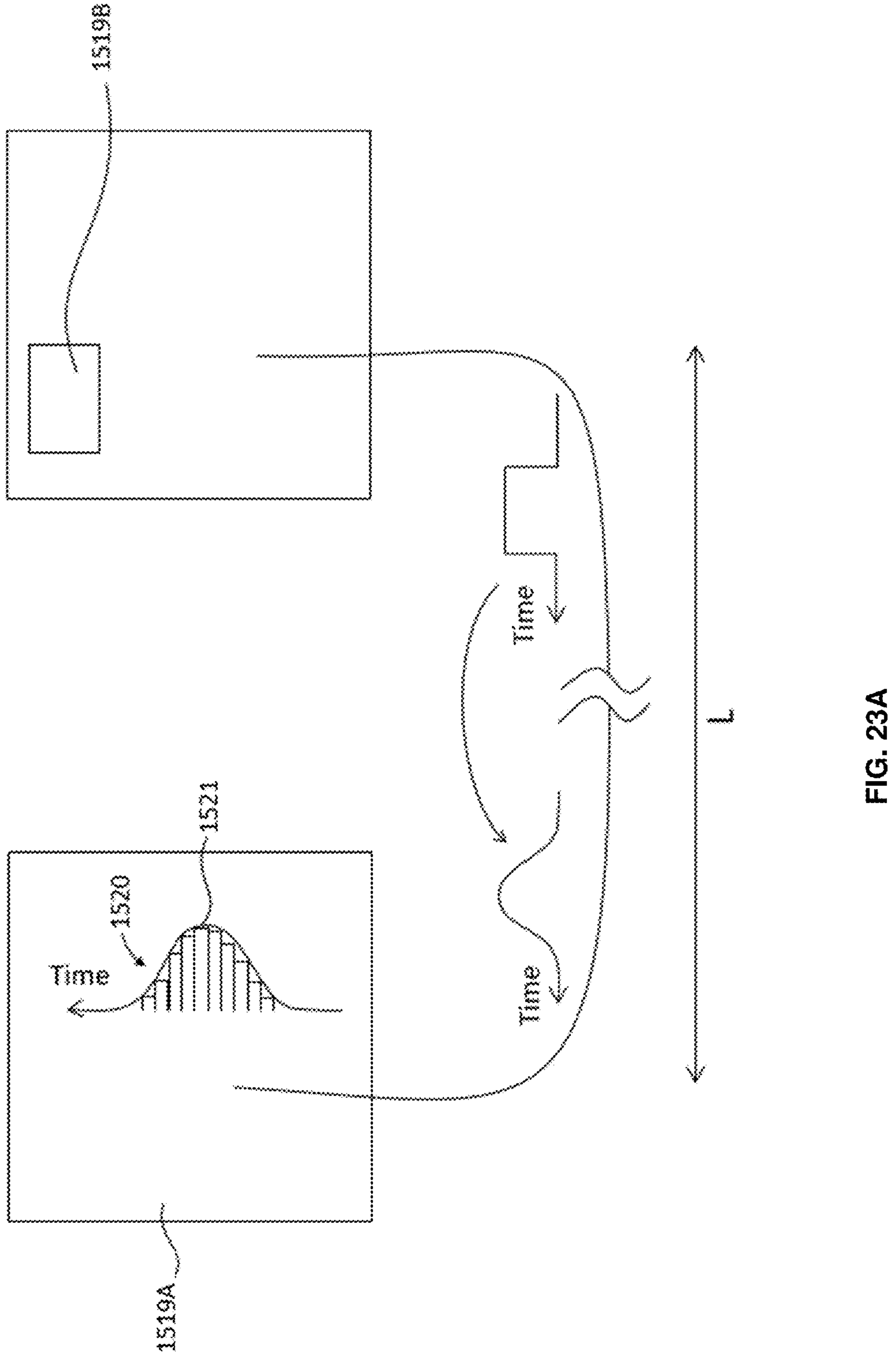
FIGS. 23A-23C are schematic diagrams of optical assemblies in optical communication via optical fibers in accordance with further embodiments.
Figure 23B:
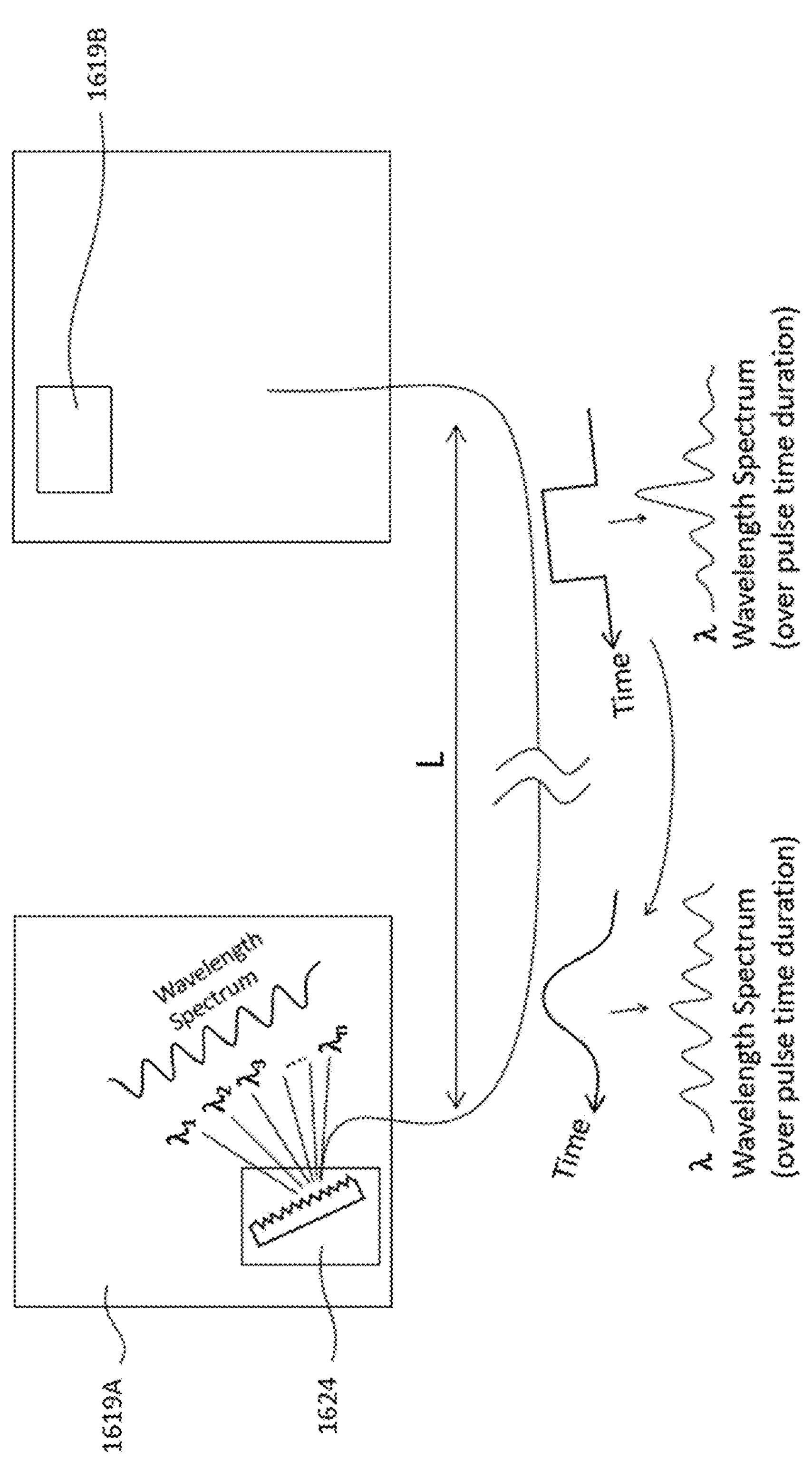
Figure 23C:
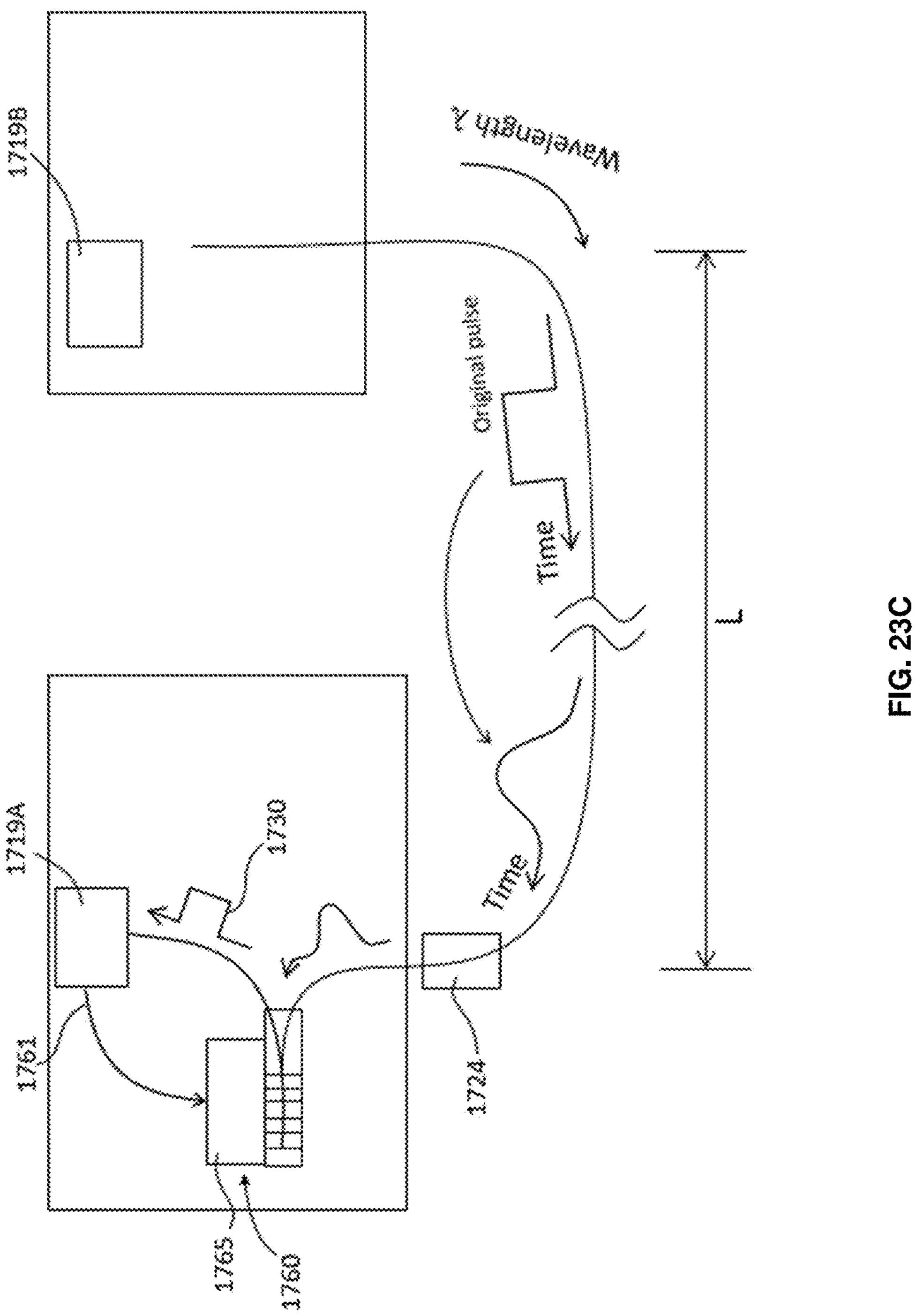

With reference to the examples of FIGS. 23A-23C, optical signals traveling along an optical length between optical transmission device or device portion of a transceiver of one optical assembly or other unit and an optical receiving device or device portion of a transceiver of another optical assembly or other unit are deformed along the optical length in the form of dispersion which may be measured by way of the arrangements described previously herein with respect to optical systems 1400, 1400A. In the example of FIG. 23A, an optical system otherwise like that of optical system 1400 employs transceivers 1519A, 1519B in place of transceivers 1419A, 1419B. In this example, the optical receiving device portion of transceiver 1519A and signal processing of an associated central processing and transmission unit, such as central processing and transmission units 1415A, 1415B, may provide a high speed signal detection and processing system with a sufficient sampling rate within the time domain of the optical signals to isolate peaks, such as peak 1521 exemplified in optical signal pulse-time plot 1520, of deformed optical signals received by first transceiver 1519A via travel of the optical signals along an optical path between transceivers first and second transceivers 1519A, 1519B. Such a signal detection and processing system enables direct determination by the central processing and transmission units of a time of travel 2t of optical signals generated by and routed from first transceiver 1519A to second transceiver 1519B and reflected back to the first transceiver as in the first setup described previously herein with respect to optical system 1400 and a time of travel t of optical signals generated by and routed from second transceiver 1519B and received by first transceiver 1519A as in the second setup as explained above with respect to optical system 1400 to compute a correct optical path length L. In the example of the first setup, first transceiver 1519A may be an optical time-domain reflectometer (OTDR) device. In alternative arrangements of the first setup, second transceiver 1519B may be replaced by a reflecting element to reflect an optical signal routed from first transceiver 1519A back to the first transceiver. In such an arrangement, the first transceiver may be an OTDR device. In alternative arrangements of the second setup, first transceiver 1519A may be replaced by merely an optical receiving device and second transceiver 1519B may be replaced by merely an optical transmission device.

In the example of FIG. 23B, optical filter 1624 is placed between an optical filter, such as optical filters 1424A-1424D, and transceiver 1619A in which such optical filter may be employed in an optical system otherwise like that of optical system 1400 but not limited to being within such an optical system. In this example, optical filter 1624 is a high-resolution wavelength-based splitter device, e.g., one using diffraction grating, to isolate one or more specific wavelengths and thus remove side bands formed by the dispersion of the light forming the optical signals. In some arrangements, power distribution changes within the wavelength domain are determined at a plurality of predetermined wavelengths from which the optical path length L is computed. In some other arrangements, a change in power at a single specific wavelength, which may be 1650 nm, may be determined in cases in which it may be confirmed that power loss is due solely to the optical path length L. The particular wavelengths chosen may be used on a "dark channel" that may not be utilized by optical carrier signals traversing the optical fiber extending between optical fiber and termination assembly and control units 1401A, 1401B, and thus such wavelength may be isolated from the optical carrier signals.

In the example of FIG. 23C, first transceiver 1719A lacks a sufficient signal detection device to allow for central processing and transmission units to compute a correct optical length L in view of the optical signal dispersion along the optical path length. Accordingly, dispersion compensation device 1760 that is or includes a tunable dispersion compensator as known to those skilled in the art may be inserted between an optical receiving device portion of first transceiver 1719A and optical filter 1724. First transceiver 1719A or a CPU in electrical communication with the transceiver may send instructions to tuning controller 1765 of or associated with dispersion compensation device 1760 to modify a portion of the optical path in order to adjust the optical signals received by the optical receiving device portion back to the original state of the signals when such signals were generated, e.g., back to substantially square wave 1730 as shown. In one example, dispersion compensation device 1760 may include a core element, which may be prepared in the form of a fiber Bragg grating, and a heating element, e.g., an electrical resistor, and optionally a cooling element, e.g., a fan, that may modify the temperature of or within the dispersion compensation device in order to alter the optical signals from optical filter 1724 as they pass through the dispersion compensation device and are routed to the optical receiving device portion of first transceiver 1719A. In the example shown, a central processing and transmission unit, such as central processing and transmission units 1415A, 1415B may be in electrical communication with first transceiver 1719A and with dispersion compensation device 1760 such that the central processing and transmission unit sends electrical control signals 1761 to tuning controller 1765 as needed to adjust a temperature of or within the dispersion compensation device to alter the optical signals received by first transceiver 1719A. Such alterations to the optical signals may continue to be made until the signals are at the desired state, e.g., substantially square wave 1730. Data associated with the temperature setting of dispersion compensation device 1760 may be reported by the central processing and transmission unit to a central office or a remote computing unit as described previously herein accessible by a central office to be compared against an acceptable range. In this manner, if the data associated with the temperature setting of dispersion compensation device 1760 is outside of the acceptable range, an alert may be issued for access by appropriate personnel such that the dispersion compensation device or other associated components, e.g., transceiver 1719A, optical filter 1724, or associated optical fiber cables may be further evaluated for remediation or replacement. In one example, first transceiver 1719A, dispersion compensation device 1760, and tuning controller 1765 may be used in place of first transceiver 1419A in an optical system like that of optical system 1400.

With reference again to FIG. 22B, optical signals introduced via control unit adapter 1428 and the optical fiber jumper cable may be routed from one optical fiber and termination assembly and control unit 1401C to another optical fiber and termination assembly and control unit 1401C. As such, the optical signals introduced in this manner also may be used to determine optical path length L as described previously herein with respect to each of FIGS. 22A-23C.

In these examples, the transceiver, e.g., any one of first and second transceivers 1419A-1419D, 1519A, 1519B, 1619A, 1619B, 1719A, 1719B may include data processing, machine learning, the CPU, and in some instances the dispersion compensation device, e.g., dispersion compensation device 1760, in a single device. In other arrangements, the central processing and transmission unit may be in communication with a remote computing unit as described previously herein in which the remote computing unit may include the data processing and machine learning for any of complex computations, larger data storage, and large-scale processing. With a properly determined optical path length, technicians can put power losses within an optical system into context. If a relatively shorter optical path length is determined but an optical power along the optical path length is determined to be low, then there is a signal loss that is not due to length. On the other hand, if an optical path length is determined to be relatively high, then the optical power may be reduced to save energy.

Figure 24:
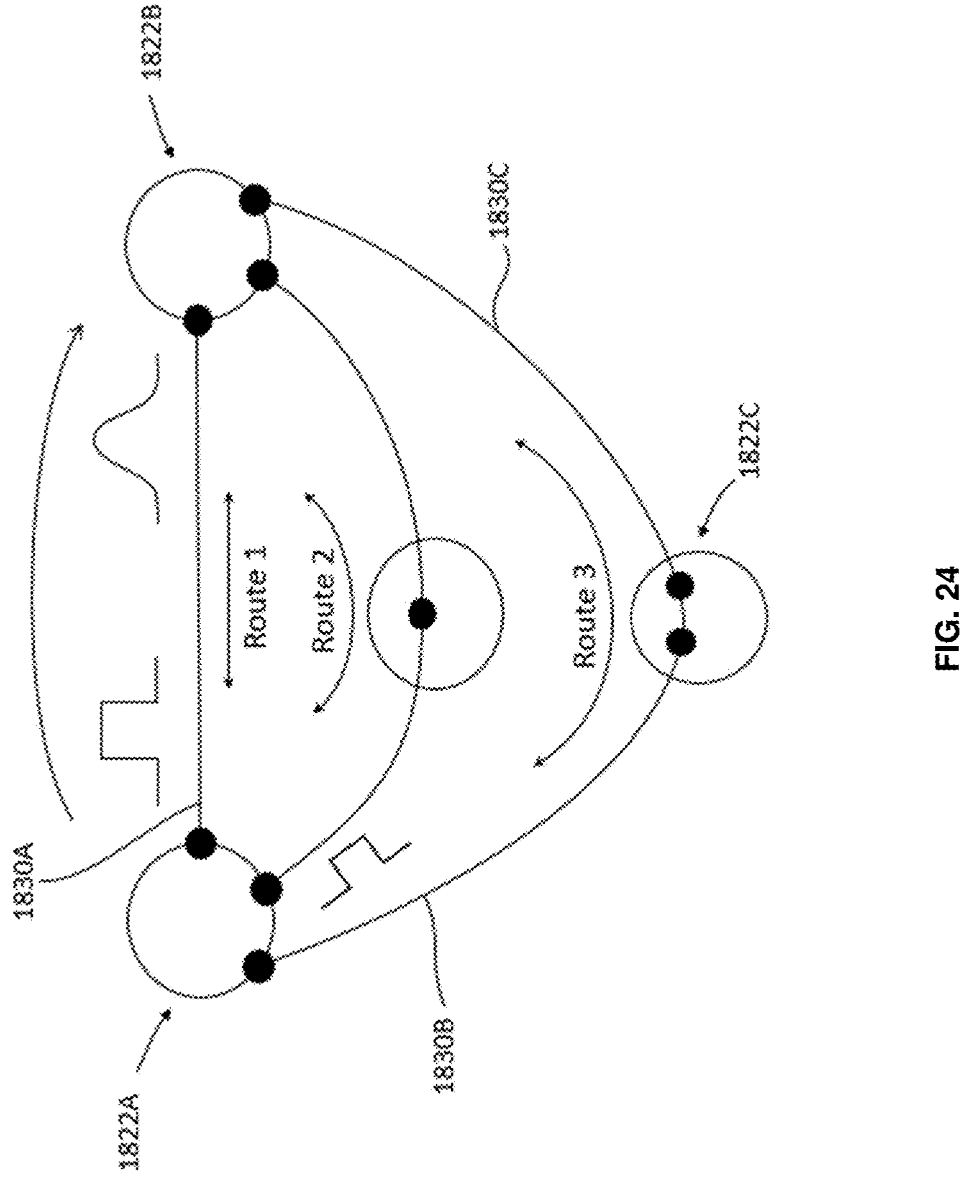
FIG. 24 is a schematic diagram to exemplify a latency comparison within an optical system in accordance with another embodiment.

Referring now to FIG. 24, the length determinations described above relative to FIGS. 22A-23C may be used to determine latency differences between two optical paths. In this example, a first optical path length corresponding to the optical path along Route 1 that includes first optical fiber 1830A is determined as described above relative to FIGS. 22A-23C between an optical receiving portion of first optical assembly 1822A and an optical transmission portion of second optical assembly 1822B and a second optical path length corresponding to the optical path that includes second optical fiber 1830B extending between the first optical assembly and third optical assembly 1822C and third optical fiber 1830C extending between the third optical assembly and the second optical assembly is determined in the same manner also between the optical receiving portion of the first optical assembly and the optical transmission portion of the second optical assembly. Each of optical assemblies 1822A-1822C may be one using any one of cassettes 1422A-1422D for example. In this manner, it may be determined that optical signals are routed more quickly from first optical assembly 1822A to second optical assembly 1822B via third optical assembly 1822C than directly from the first optical assembly to the third optical assembly or vice versa.

Figure 25:
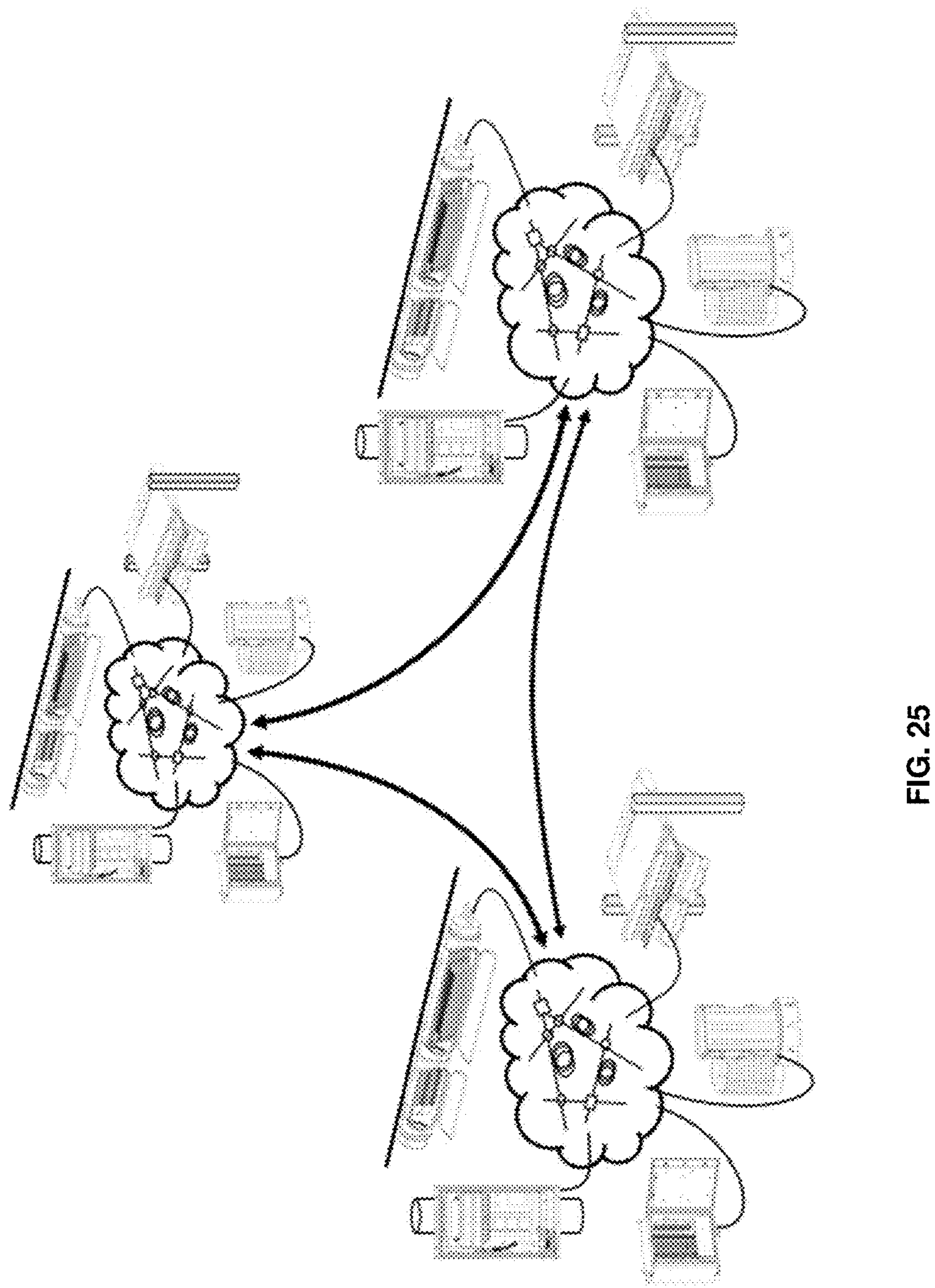
FIG. 25 is a schematic diagram of an optical fiber network in accordance with an embodiment.

With reference to FIG. 25, through such latency and other optical quality comparisons, an optical fiber connection map as shown that provides the layout of optical fiber termination units, e.g., optical fiber and termination assembly and control units 1401A, 1401B, and other optical units or central offices within an optical network may be prepared to show quality information along optical paths between such optical units and central offices. Such other quality information may include optical connection loss information identified through the use of splitters and photodetectors, e.g., photodiodes, as described previously herein with respect to FIGS. 1-8B, as well as connection engagement information derived from connection engagement sensing mechanisms, e.g., as shown in FIG. 13A-15, to provide an indication of physical connection quality and thus provide for remote inspection capability. In this manner, a map of physical connections of optical fibers with real-time quality information may be made even long after deployment of optical fibers without the need to physically inspect a site. Such a map may be utilized to deploy additional optical fibers or redeploy optical fibers to improve the overall speed of a fiber optic network or may be utilized as reference data for upper layer switches (e.g., layer 3 switches on an Open System Interconnection (OSI) model) data packet routing optimization.

Figure 26:
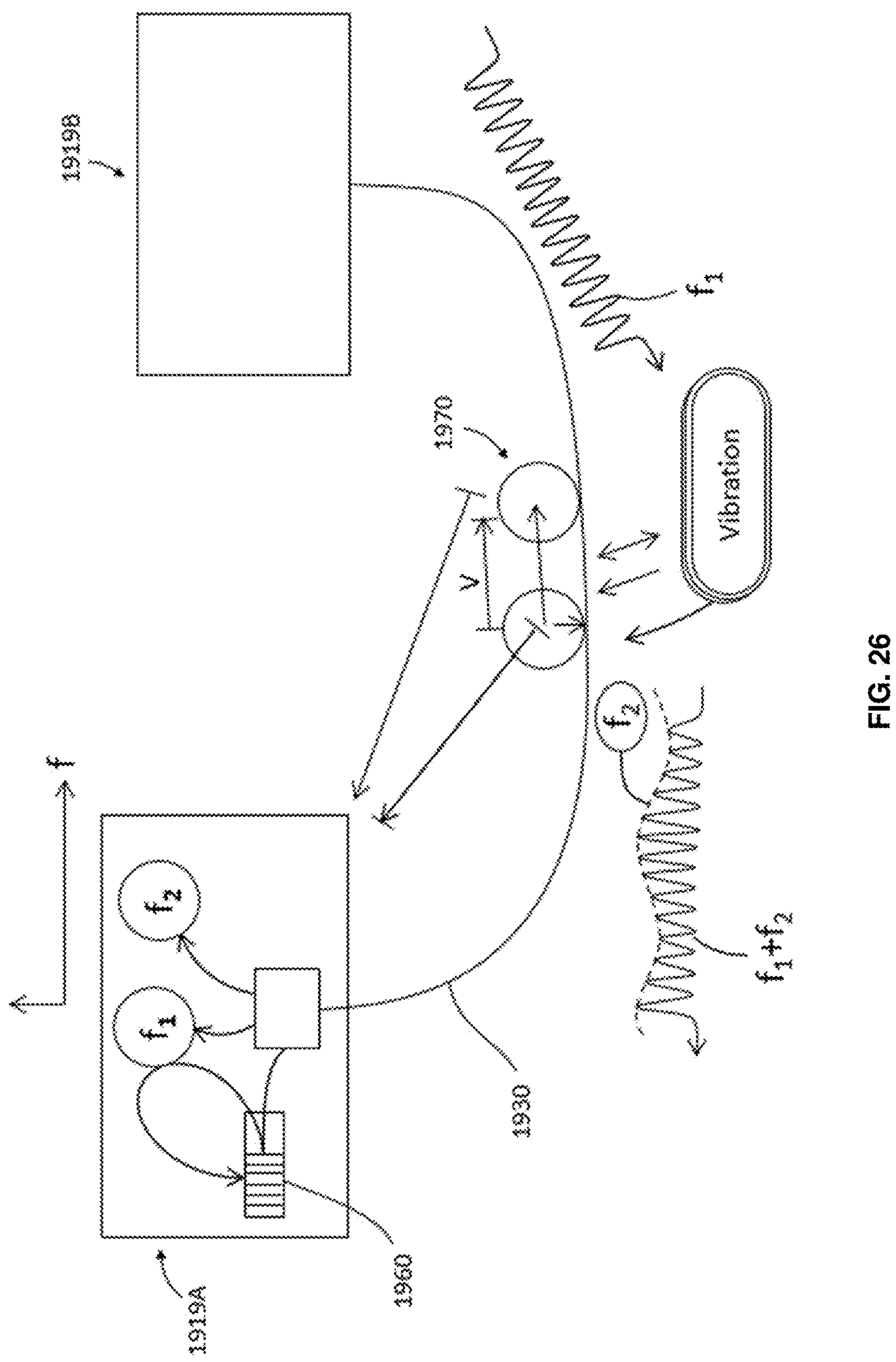
FIG. 26 is a schematic diagram of an optical system extending below a road system in accordance with an embodiment.

Referring now to FIG. 26, in one application of the systems for determining optical path length described previously herein, vehicles 1970 may impart external force inputs on optical fibers 1930 extending beneath roads and highways in which such force inputs may be in the form of a compression and decompression of the optical fibers. In this manner, the external force inputs of the vehicles may supply an input frequency f2 to modulate optical signals from an optical transmission device having a frequency f1 such that with the external force inputs, the optical signals received from the optical transmission device by an optical receiving device may have a frequency of f1+f2. Using transceivers 1919A, 1919B in the manner described with respect to any one of the systems described above with respect to FIGS. 23A-23C, such as through the use of dispersion compensation device 1960 as in the example shown, the optical path length extending between the transceivers may be determined. Then, by utilizing the time associated with peaks and valleys of the optical signals having frequency f2, locations and speeds of vehicle movement can be ascertained. Such information may be useful in traffic planning. In general, optical fibers may be utilized in this manner to detect local vibrations around the optical vibrations, which could be used in still further applications, such as to detect seismic movements to possibly provide a warning for an impending earthquake.

It is to be further understood that the disclosure set forth herein includes any possible combinations of the particular features set forth above, whether specifically disclosed herein or not. For example, where a particular feature is disclosed in the context of a particular aspect, arrangement, configuration, or embodiment, that feature can also be used, to the extent possible, in combination with and/or in the context of other particular aspects, arrangements, configurations, and embodiments of the technology, and in the technology generally.

Furthermore, although the technology herein has been described with reference to particular features, it is to be understood that these features are merely illustrative of the principles and applications of the present technology. It is therefore to be understood that numerous modifications, including changes in the sizes of the various features described herein, may be made to the illustrative embodiments and that other arrangements may be devised without departing from the spirit and scope of the present technology. In this regard, the present technology encompasses numerous additional features in addition to those specific features set forth in the paragraphs below. Moreover, the foregoing disclosure should be taken by way of illustration rather than by way of limitation as the present technology is defined by the paragraphs set forth below.

The invention claimed is:

1. An optical system comprising:

a first optical receiving device located in a first optical fiber and termination assembly and control unit, the first optical receiving device configured for receiving and detecting second optical signals;

a first optical filter located in the first optical fiber and termination assembly and control unit, the first optical filter configured for optical communication with the first optical receiving device;

a first optical transmission device located in a second optical fiber and termination assembly and control unit, configured for optical communication with the first optical receiving device via a path comprising an optical fiber extending between the first optical fiber and termination assembly and control unit and the second optical fiber and termination assembly and control unit, and configured for causing the generation of the second optical signals; and a first central processing and transmission unit in electrical communication with the first optical receiving device, the first central processing and transmission unit being configured for transmitting radio or electrical signals carrying data based on the second optical signals and specifying at least one of a value indicative of an optical path length for the optical fiber, a value indicative of an optical dispersion for the optical fiber, or a value indicative of an optical latency for the optical fiber, wherein the second optical signals have a second wavelength, are transmitted from the second optical fiber and termination assembly and control unit to the first optical fiber and termination assembly and control unit, and are distinct from first optical signals that are conveyed from the second optical fiber and termination assembly and control unit to the first optical fiber and termination assembly and control unit, the first optical signals having a first wavelength different from the second wavelength such that the second wavelength provides a dark channel by which the second optical signals are routed from the first optical filter to the first optical receiving device without the first optical signals being routed from the first optical filter to the first optical receiving device.

2. The optical system of claim 1, wherein the first optical transmission device generates optical signals different from the second optical signals, wherein the first central processing and transmission unit is in communication with the first optical transmission device and is further configured for receiving radio or electrical signals carrying data relating to optical signals generated by the first optical transmission device and thereby causing the generation of the second optical signals, or the optical system further comprising a second central processing and transmission unit, wherein the second central processing and transmission unit is in electrical communication with the first optical transmission device and is further configured for receiving radio or electrical signals carrying data relating to the optical signals generated by the first optical transmission device and thereby causing the generation of the second optical signals.

3. The optical system of claim 2, wherein the transmitted radio or electrical signals are carrying data relating to the one or both of the determined optical characteristics and the determined optical path characteristics, and wherein the one or both of the determined optical characteristics and the determined optical path characteristics are selected from the group comprising power loss, optical dispersion, and latency.

4. The optical system of claim 2, wherein the transmitted radio or electrical signals are carrying data relating to the one or both of the determined optical characteristics and the determined optical path characteristics, and wherein the first central processing and transmission unit is configured for computing and thereby determining the one or both of the determined optical characteristics and the determined optical path characteristics and is further configured for reporting the one or both of the determined optical and optical path characteristics to a central office configured for analyzing the determined optical and optical path characteristics or to a remote computing unit in communication with the first central processing and transmission unit accessible by the central office, or wherein the remote computing unit is configured for receiving the transmitted radio or electrical signals and for computing and thereby determining the one or both of the determined optical and the determined optical path characteristics, the remote computing unit being further configured for reporting the one or both of the determined optical characteristics and the determined optical path characteristics to the central office configured for analyzing the determined optical and optical path characteristics or the remote computing unit being accessible by the central office.

5. The optical system of claim 2, further comprising a cassette including a substrate, the first optical filter being mounted to the substrate of the cassette, and wherein the first optical receiving device is attached to a printed circuit board detached or detachable from the cassette.

6. The optical system of claim 2, wherein the transmitted radio or electrical signals are carrying data relating to the one or both of the determined optical characteristics and the determined optical path characteristics, wherein one of the one or both of the determined optical characteristics and the determined optical path characteristics is a determined optical path length corresponding to an actual length of an optical path taken by optical signals generated by the first optical transmission device, wherein the first optical receiving device determines a first time of conveyance of the optical signals generated by the first optical transmission device and received from the first optical receiving device as the second optical signals, and wherein the first central processing and transmission unit is configured for determining the determined optical path length based on the first time of conveyance.

7. The optical system of claim 2, wherein the transmitted radio or electrical signals are carrying data relating to the one or both of the determined optical characteristics and the determined optical path characteristics, wherein one of the one or both of the determined optical characteristics and the determined optical path characteristics is a determined optical dispersion value relating to a light dispersion generating the optical signals received by the first optical receiving device and routed from the first optical filter, and wherein the determined optical dispersion value corresponds to an optical path length of an optical path extending between the first optical receiving device and a remote optical unit.

8. The optical system of claim 7, wherein a stored optical dispersion value corresponding to an optical path length is stored in a memory of the first central processing and transmission unit or a remote computing unit in communication with the first central processing and transmission unit, and wherein the respective first central processing and transmission unit or the remote computing unit is further configured to determine the determined optical path length based on the stored optical dispersion value.

9. The optical system of claim 7, further comprising a tuning controller adjacent to the first optical filter that alters a temperature along a portion of the optical path length and thereby alters optical signals routed from the first optical filter into the second optical signals.

10. The optical system of claim 9, wherein the tuning controller is along a portion of the optical path, and wherein the first central processing and transmission unit continuously directs the tuning controller to alter the temperature of the tuning controller until the first optical receiving device receives the second optical signals routed from the first optical filter at a preset desired state.

11. The optical system of claim 9, further comprising a thermocouple or other temperature transducer in electrical communication with the first central processing and transmission unit and configured for measuring the local temperature along the optical path.

12. The optical system of claim 9, wherein the tuning controller includes a heat source for altering the temperature along the portion of the optical path.

13. The optical system of claim 2, wherein the first optical receiving device and the first optical transmission device are components of an optical transceiver, wherein the first central processing and transmission unit is in electrical communication with the first optical transmission device such that the first central processing and transmission unit directs the generation of optical signals by the first optical transmission device and thereby causes the generation of the second optical signals.

14. The optical system of claim 13, wherein the optical transceiver is an optical time-domain reflectometry (OTDR) device.

15. The optical system of claim 13, wherein the first optical signals include the second optical signals and third optical signals, the second optical signals having a first wavelength and the third optical signals having a second wavelength different from the first wavelength, and wherein only the third optical signals are routed from the first optical filter to the first receiving device.

16. The optical system of claim 2, wherein the first connector, the first optical filter, the first optical receiving device, and the first central processing and transmission unit form a first optical assembly, the optical system further comprising:

a second optical assembly comprising:

a second connector for routing third optical signals within and away from the second optical assembly, the second connector being in optical communication with the first connector via a first optical fiber such that optical signals routed from the first connector and from the second connector are received by the other of the first connector and the second connector;

a second optical filter configured for routing the third optical signals to and from the second connector; and a second optical receiving device configured for receiving fourth optical signals routed from the second optical filter, the third and fourth optical signals being formed from light conveyed from the second connector such that the second optical receiving device is configured for routing at least portions of optical signals routed by the second connector via the second optical filter along the first optical fiber or along another optical fiber to the first optical assembly.

17. The optical system of claim 16, wherein the first optical transmission device is a component of the second optical assembly.

18. The optical system of claim 16, further comprising a second central processing and transmission unit in electrical communication with the second optical receiving device, the second central processing and transmission unit being configured for transmitting radio or electrical signals carrying data relating to either the fourth optical signals or either one or both of determined optical characteristics and determined optical path characteristics based on the fourth optical signals.

19. The optical system of claim 18, wherein the second optical receiving device and the first optical transmission device are components of an optical transceiver of the second optical assembly, wherein the second central processing and transmission unit is in electrical communication with the first optical transmission device such that the second central processing and transmission unit directs the generation of optical signals by the first optical transmission device.

20. The optical system of claim 19, wherein the optical system further comprises a second optical transmission device configured for generating optical signals and thereby causing the generation of the first optical signals routed from the first optical filter and away from the first optical assembly via the first connector, the second optical transmission device being a component of the first optical assembly, wherein the optical signals generated by the second optical transmission device are synchronized with optical signals generated by the first optical transmission device and thereby causing the generation of the second optical signals.

21. The optical system of claim 16, wherein the second optical signals are formed from light conveyed from the second connector via the first optical fiber.

22. The optical system of claim 21, wherein the first optical receiving device and the first optical transmission device are components of an optical transceiver of the first optical assembly.

23. The optical system of claim 16, further comprising a second photodetector configured for receiving fifth optical signals from the second optical filter to confirm the second connector is receiving third optical signals.

24. The optical system of claim 16, further comprising:

a third optical assembly in optical communication with the first optical assembly via a second optical fiber such that optical signals are routed between the first optical assembly and the third optical assembly and in optical communication with the second optical assembly via a third optical fiber such that optical signals are routed between the second optical assembly and the third optical assembly, wherein the first central processing and transmission unit or a remote computing unit remote from the optical system compares the timing for receiving optical signals routed from the second optical assembly via the first optical fiber to the timing for receiving optical signals routed from the second optical assembly via the second optical fiber and the third optical fiber to determine a latency between a direct optical path extending between the first optical assembly and the second optical assembly and an optical path extending between the first optical assembly and the second optical assembly via the third optical assembly, or wherein the optical system further comprises a second central processing and transmission unit in electrical communication with the second optical receiving device, wherein the second central processing and transmission unit compares the timing for receiving optical signals routed from the first optical assembly via the first optical fiber to the timing for receiving optical signals routed from the third optical assembly via the second optical fiber and the third optical fiber to determine a latency between a direct optical path extending between the first optical assembly and the second optical assembly and an optical path extending between the first optical assembly and the second optical assembly via the third optical assembly.

25. The optical system of claim 24, wherein the first optical assembly further comprises a third connector, the second optical assembly further comprises a fourth connector, and the third optical assembly further comprises:

fifth and sixth connectors for routing optical signals within and away from the third optical assembly, the fifth connector being in optical communication with the third connector via the second optical fiber and the sixth connector being in optical communication with the fourth connector via the third optical fiber.

26. The optical system of claim 2, further comprising:

a first adapter in optical communication with the first optical transmission device;

a second adapter in optical communication with the first connector; and an optical fiber cable including a first cable connector on a first end of the optical fiber cable and insertable into the first adapter and a second cable connector on a second end of the optical fiber cable opposite the first end and insertable into the second adapter, wherein the first optical transmission device conveys the first optical signals, the first optical signals being routed along the optical fiber cable via the first adapter, the second adapter, and the first connector.

27. The optical system of claim 26, wherein the first optical signals are routed along the optical fiber cable via the first adapter to the second adapter and then to the first optical receiving device via the first connector, and wherein the first optical transmission device and the first optical receiving device are components of different optical transceivers.

28. The optical system of claim 26, further comprising:

one or more additional first connectors in optical communication with the first optical filter and the first optical receiving device, the first connector and the one or more additional first connectors defining a plurality of first connectors;

one or more additional second adapters in optical communication with a respective one of the one or more additional first connectors, the second adapter and the one or more additional second adapters defining a plurality of second adapters; and a plurality of optical fibers extending between respective ones of the plurality of first connectors and the plurality of second adapters, wherein the optical fiber cable is insertable into any one of the plurality of first connectors.

29. The optical system of claim 2, further comprising:

a cassette housing;

a first cassette inserted into or insertable into the cassette housing, wherein the first cassette includes the first connector; and a second cassette inserted into or insertable into the cassette housing, the second cassette including a second connector, wherein the first connector and the second connector are in optical communication via the first optical filter.

30. The optical system of claim 29, further comprising:

a control unit housing including a first control unit connector in optical communication with the first optical filter and a second control unit connector in optical communication with the first optical filter, wherein the first optical filter and the first optical receiving device are enclosed in the control unit housing;

a first adapter; and a second adapter, wherein the first cassette includes a first cassette connector in optical communication with the first connector and the second cassette includes a second cassette connector in optical communication with the second connector, wherein the first cassette connector and the first control unit connector are inserted into the first adapter and the second cassette connector and the second control unit connector are inserted into the second adapter, wherein the first and the second adapters extend through a rear portion of the cassette housing or a front portion of the control unit housing such that the first connector and the first optical filter are in optical communication via the first control unit connector and such that the second connector and the first optical filter are in optical communication via the second control unit connector.

31. The optical system of claim 30, wherein the first connector and the second connector are in optical communication via the first optical filter.

32. The optical system of claim 29, wherein the first cassette includes an additional first connector, wherein the second cassette includes an additional second connector, wherein the first cassette and the second cassette are insertable into the cassette housing and the first connector is configurable for optical communication via the first optical filter and optical fibers with each of the additional first connector, the second connector and the additional second connector.

33. The optical system of claim 32, wherein first connector is configurable for optical communication with only one of the additional first connector, the second connector, and the additional second connector at a given time.

* * * * *